(12) United States Patent
Sethi et al.

(10) Patent No.: US 10,767,091 B2
(45) Date of Patent: Sep. 8, 2020

(54) HEAT TRANSFER COMPOSITIONS, METHODS, AND SYSTEMS

(71) Applicant: HONEYWELL INTERNATIONAL INC., Morris Plains, NJ (US)

(72) Inventors: Ankit Sethi, Buffalo, NY (US); Samuel F. Yana Motta, East Amherst, NY (US); Gustavo Pottker, Getzville, NY (US); Yang Zou, Buffalo, NY (US); Elizabet del Carmen Vera Becerra, Amherst, NY (US); Gregory L. Smith, Niagara Falls (CA)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 16/206,624

(22) Filed: Nov. 30, 2018

(65) Prior Publication Data

US 2019/0161663 A1 May 30, 2019

Related U.S. Application Data

(60) Provisional application No. 62/593,295, filed on Dec. 1, 2017, provisional application No. 62/592,883, filed on Nov. 30, 2017.

(51) Int. Cl.
*C09K 5/04* (2006.01)

(52) U.S. Cl.
CPC ........ *C09K 5/045* (2013.01); *C09K 2205/122* (2013.01); *C09K 2205/126* (2013.01); *C09K 2205/22* (2013.01); *C09K 2205/43* (2013.01)

(58) Field of Classification Search
CPC .............. C09K 5/045; C09K 2205/126; C09K 2205/22

See application file for complete search history.

(56) References Cited

U.S. PATENT DOCUMENTS

| | | | |
|---|---|---|---|
| 7,569,170 B2 | 8/2009 | Minor | |
| 2009/0314015 A1 | 12/2009 | Minor et al. | |
| 2011/0219815 A1* | 9/2011 | Yana Motta | F25B 45/00 62/498 |
| 2013/0145778 A1* | 6/2013 | Yana Motta | C09K 5/045 62/77 |
| 2016/0024361 A1* | 1/2016 | Yana Motta | C09K 3/30 252/67 |
| 2018/0030325 A1* | 2/2018 | Petersen | C09K 5/045 |
| 2019/0085224 A1* | 3/2019 | Sethi | C09K 5/045 |
| 2019/0153283 A1* | 5/2019 | Yana Motta | F25B 41/062 |

* cited by examiner

*Primary Examiner* — John R Hardee
(74) *Attorney, Agent, or Firm* — Colleen D. Szuch

(57) ABSTRACT

The present invention relates to a refrigerant composition, including trifluoroiodomethane ($CF_3I$); 1,3,3,3-tetrafluoropropene (HFO-1234ze); difluoromethane (HFC-32), and pentafluoroethane (HFC-125) for use in a heat exchange system, including refrigeration applications and in particular aspects to the use of such compositions as a replacement of the refrigerant R-22 or R-404A for heating and cooling applications and to retrofitting heat exchange systems, including systems designed for use with R-22 or R-404A.

20 Claims, 5 Drawing Sheets

HEAT TRANSFER COMPOSITIONS, METHODS, AND SYSTEMS

CROSS REFERENCE TO RELATED APPLICATIONS

This application claims priority to U.S. Ser. No. 62/592,883 filed on Nov. 30, 2017 incorporated herein in its entirety. This application claims priority to U.S. Ser. No. 62/593,295 filed on Dec. 1, 2017 incorporated herein in its entirety.

FIELD OF THE INVENTION

This invention relates to compositions, methods, and systems having utility in refrigeration applications, with particular benefit in medium and low temperature refrigeration applications, and in particular aspects to refrigerant compositions for replacement of the refrigerant R-404A and/or R-22 for heating and cooling applications in medium and low temperature refrigerant systems, including systems designed for use with R-404A and/or R-22, and to retrofitting medium and low temperature refrigerant systems, including systems designed for use with R-404A and/or R-22.

BACKGROUND

Mechanical refrigeration systems, and related heat transfer devices such as heat pumps and air conditioners, using refrigerant liquids are well known in the art for industrial, commercial, and domestic uses. Several fluorocarbon-based fluids have found widespread use in many residential, commercial and industrial applications, including as the working fluid in systems such as air conditioning, heat pump and refrigeration systems. Because of certain suspected environmental problems, including the relatively high global warming potentials associated with the use of some hydrofluorocarbon ("HFC") based compositions that have heretofore been used in these applications, it has become increasingly desirable to use fluids having low global warming potentials ("GWP") in addition to low or zero ozone depletion potentials, such as hydrofluoroolefins (hereinafter "HFOs"). For example, a number of governments have signed the Kyoto Protocol to protect the global environment and setting forth a reduction of CO2 emissions (global warming). Thus, there is a need for alternatives to replace high global warming HFCs.

One important type of refrigeration system is known as a "low temperature refrigeration system." Such systems are particularly important to the food manufacture, distribution and retail industries in that they play a vital role in ensuring that food which reaches the consumer is both fresh and fit to eat. In such low temperature refrigeration systems, a commonly used refrigerant has been HFC-404A or R-404A (the combination of HFC-125:HFC-143a:HFC134a in an approximate 44:52:4 weight percent). R-404A has an estimated GWP of 3922.

It is generally considered important, however, with respect to heat transfer fluids, that any potential substitute must also possess those properties present in many of the most widely used HFC based fluids, such as excellent heat transfer properties, chemical stability, low- or no-toxicity, non-flammability, and lubricant compatibility, among others. In addition, any replacement or retrofit for R-404A would desirably be a good match for the operating conditions of R-404A in such systems order to avoid modification or redesign of the system.

With regard to efficiency in use, it is important to note that a loss in refrigerant thermodynamic performance or energy efficiency may have secondary environmental impacts through increased fossil fuel usage arising from an increased demand for electrical energy. In other words, a proposed new refrigerant that has an improved GWP and/or ODP relative to an existing fluid might nevertheless be less environmentally friendly than the fluid it is replacing if another characteristic of the proposed new fluid, such as efficiency in use, results in increased environmental emissions indirectly, such as by requiring higher fuel combustion to achieve the same level of refrigeration. It is thus seen that the selection of a replacement or retrofit fluid is a complicated, challenging endeavor that may not have predictable results.

Furthermore, it is generally considered desirable for HFC refrigerant substitutes to be effective without major engineering changes to conventional vapor compression technology currently used with HFC refrigerants.

Flammability is another important property for many applications. That is, it is considered either important or essential in some applications, including particularly in certain heat transfer applications, to use compositions that are non-flammable. One advantage of the use of non-flammable refrigerants in a heat transfer system is flame suppression equipment will not be required in such systems in order to mitigate possible risks associated with leakage of refrigerant from the system. This advantage is especially important in systems that would suffer from the secondary disadvantage of the increased system weight that would be associated with, for example, transport refrigeration systems.

As used herein, the term "non-flammable" refers to compounds or compositions which are determined to be non-flammable as determined in accordance with ASTM standard E-681-2009 Standard Test Method for Concentration Limits of Flammability of Chemicals (Vapors and Gases) at conditions described in ASHRAE Standard 34-2016 Designation and Safety Classification of Refrigerants and described in Appendix B1 to ASHRAE Standard 34-2016, which is incorporated herein by reference and referred to herein for convenience as "Non-Flammability Test". Unfortunately, many materials that might otherwise be desirable for use in refrigerant compositions are not non-flammable as that term is used herein. For example, fluoroalkane difluoroethane (HFC-152a) and fluoroalkene 1,1,1-trifluoropropene (HFO-1243zf) have flammability profiles which make them less preferred for use in some applications.

It is critical for maintenance of system efficiency and proper and reliable functioning of the compressor, that lubricant circulating in a vapor compression heat transfer system is returned to the compressor to perform its intended lubricating function. Otherwise, lubricant might accumulate and become lodged in the coils and piping of the system, including in the heat transfer components. Furthermore, when lubricant accumulates on the inner surfaces of the evaporator, it lowers the heat exchange efficiency of the evaporator, and thereby reduces the efficiency of the system. For these reasons, it is desirable for many systems that the refrigerant is miscible over at least the operating temperature range of the system with the lubricant that is used in the system.

Since R-404A is currently commonly used with polyol ester (POE) lubricating oils, a proposed R-404A replacement refrigerant is desirably miscible with POE lubricants over the temperature range in the system and for the concentrations of lubricant that are present in the system, particularly over the operating temperature ranges in the condenser and evaporator.

Since R-22 is currently commonly used with mineral oil (MO), alkyl benzene (AB) and polyol ester (POE) lubricating oils, a proposed R-22 replacement refrigerant is desirably miscible with each of MO, AB and POE lubricants over the temperature range in the system and for the concentrations of lubricant that are present in the system, particularly over the operating temperature ranges in the condenser and evaporator.

Applicants have thus come to appreciate a need for compositions, and particularly heat transfer compositions, that are highly advantageous in heating and cooling systems and methods, particularly medium and low temperature refrigeration systems, and even more particularly medium and low temperature refrigeration systems, including medium and low temperature transport refrigeration systems, that have been designed for use with or are suitable for use with R-404A and/or R-22.

SUMMARY OF THE INVENTION

Applicants have found that the compositions of the present invention satisfy in an exceptional and unexpected way the need for alternatives and/or replacements for refrigerants in such applications, particularly and preferably difluorochloromethane (HFC-22 or R-22) and HFC-404A or R-404A (the combination of HFC-125:HFC-143a:HFC134a in an approximate 44:52:4 weight percent), that at once have lower GWP values and provide substantially non-flammable, non-toxic fluids that have a close match in cooling efficiency and capacity to R-22 or R-404A in refrigeration applications in such systems.

The present invention relates to a refrigerant comprising at least about 98.5% by weight of the following four compounds, with each compound being present in the following relative percentages:
36.8 to 72% by weight trifluoroiodomethane ($CF_3I$);
2 to 36% by weight of tetrafluoropropene selected from trans-1,3,3,3-tetrafluoropropene (HFO-1234ze(E), 2,3,3,3-tetrafluoropropene (HFO-1234yf) and combinations of these;
15 to 31% by weight difluoromethane (HFC-32); and
1 to 4.5% by weight pentafluoroethane (HFC-125). Refrigerants as described in this paragraph are sometimes referred to for convenience as Refrigerant 1.

The present invention relates to a refrigerant comprising at least about 98.5% by weight of the following four compounds, with each compound being present in the following relative percentages:
36.8 to 64.8% by weight trifluoroiodomethane ($CF_3I$);
8 to 36% by weight of trans-1,3,3,3-tetrafluoropropene (HFO-1234ze(E);
17 to 31% by weight difluoromethane (HFC-32); and
1 to 4.2% by weight pentafluoroethane (HFC-125). Refrigerants as described in this paragraph are sometimes referred to for convenience as Refrigerant 2.

The present invention relates to a refrigerant comprising at least about 99.5% by weight of the following four compounds, with each compound being present in the following relative percentages:
36.8 to 64.8% by weight trifluoroiodomethane ($CF_3I$);
8 to 36 by weight trans-1,3,3,3-tetrafluoropropene (HFO-1234ze(E));
17 to 23% by weight difluoromethane (HFC-32); and
1 to 4.2% by weight pentafluoroethane (HFC-125). Refrigerants as described in this paragraph are sometimes referred to for convenience as Refrigerant 3.

The present invention relates to a refrigerant consisting essentially of the following four compounds, with each compound being present in the following relative percentages:
36.8 to 64.8% by weight trifluoroiodomethane ($CF_3I$);
8 to 36% by weight 1,3,3,3-tetrafluoropropene (HFO-1234ze);
17 to 23% by weight difluoromethane (HFC-32); and
1 to 4.2% by weight pentafluoroethane (HFC-125). Refrigerants as described in this paragraph are sometimes referred to for convenience as Refrigerant 4.

The present invention relates to a refrigerant consisting of the following four compounds, with each compound being present in the following relative percentages:
36.8 to 64.8% by weight trifluoroiodomethane ($CF_3I$);
8 to 36 by weight 1,3,3,3-tetrafluoropropene (HFO-1234ze);
17 to 23% by weight difluoromethane (HFC-32); and
1 to 4.2% by weight pentafluoroethane (HFC-125). Refrigerants as described in this paragraph are sometimes referred to for convenience as Refrigerant 5.

The present invention relates to a refrigerant which may comprise at least about 98.5% by weight of the following four compounds, with each compound being present in the following relative percentages:
about 42 to about 60% by weight trifluoroiodomethane ($CF_3I$);
about 12 to about 30% by weight trans-1,3,3,3-tetrafluoropropene (HFO-1234ze(E));
about 18 to about 20% by weight difluoromethane (HFC-32); and
2 to 4.2% by weight pentafluoroethane (HFC-125). Refrigerants as described in this paragraph are sometimes referred to for convenience as Refrigerant 6.

The present invention relates to a refrigerant consisting essentially of the following four compounds, with each compound being present in the following relative percentages:
about 42 to about 60% by weight trifluoroiodomethane ($CF_3I$);
about 12 to about 30% by weight trans-1,3,3,3-tetrafluoropropene (HFO-1234ze(E));
about 18 to about 20% by weight difluoromethane (HFC-32); and
2 to 4.2% by weight pentafluoroethane (HFC-125). Refrigerants as described in this paragraph are sometimes referred to for convenience as Refrigerant 7.

The present invention relates to a refrigerant consisting of the following four compounds, with each compound being present in the following relative percentages:
about 42 to about 60% by weight trifluoroiodomethane (CF3I);
about 12 to about 30% by weight trans-1,3,3,3-tetrafluoropropene (HFO-1234ze(E));
about 18 to about 20% by weight difluoromethane (HFC-32); and
2 to 4.2% by weight pentafluoroethane (HFC-125). Refrigerants as described in this paragraph are sometimes referred to for convenience as Refrigerant 8.

The present invention relates to a refrigerant which may comprise at least about 98.5 by weight of the following four compounds, with each compound being present in the following relative percentages:

about 58% by weight trifluoroiodomethane (CF$_3$I);
about 16% by weight 1,3,3,3-tetrafluoropropene (HFO-1234ze);
22±1% by weight difluoromethane (HFC-32); and
4±0.5% by weight pentafluoroethane (HFC-125). Refrigerants as described in this paragraph are sometimes referred to for convenience as Refrigerant 9.

The present invention relates to a refrigerant consisting essentially of the following four compounds, with each compound being present in the following relative percentages:
about 58% by weight trifluoroiodomethane (CF$_3$I);
about 16% by weight 1,3,3,3-tetrafluoropropene (HFO-1234ze);
22±1% by weight difluoromethane (HFC-32); and
4±0.5% by weight pentafluoroethane (HFC-125). Refrigerants as described in this paragraph are sometimes referred to for convenience as Refrigerant 10.

The present invention relates to a refrigerant consisting of the following four compounds, with each compound being present in the following relative percentages:
about 58% by weight trifluoroiodomethane (CF$_3$I);
about 16% by weight 1,3,3,3-tetrafluoropropene (HFO-1234ze);
22±1% by weight difluoromethane (HFC-32); and
4±0.5% by weight pentafluoroethane (HFC-125). Refrigerants as described in this paragraph are sometimes referred to for convenience as Refrigerant 11.

The present invention relates to a refrigerant consisting essentially of the following four compounds, with each compound being present in the following relative percentages:
about 42 to about 60% by weight trifluoroiodomethane (CF$_3$I);
about 12 to about 30% by weight trans-1,3,3,3-tetrafluoropropene (HFO-1234ze(E));
about 18 to about 20% by weight difluoromethane (HFC-32); and
2 to 4.2% by weight pentafluoroethane (HFC-125), wherein said refrigerant is non-flammable and has a GWP of 400 or less. Refrigerants as described in this paragraph are sometimes referred to for convenience as Refrigerant 12.

The present invention relates to a refrigerant comprising at least about 98.5% by weight of the following four compounds, with each compound being present in the following relative percentages:
46 to 72% by weight trifluoroiodomethane (CF$_3$I);
2 to 28% by weight 1,1,1,2-tetrafluoropropene (HFO-1234yf);
15 to 21.5% by weight difluoromethane (HFC-32); and
1 to 4.5% by weight pentafluoroethane (HFC-125). Refrigerants as described in this paragraph are sometimes referred to for convenience as Refrigerant 13.

The present invention relates to a refrigerant consisting essentially of the following four compounds, with each compound being present in the following relative percentages:
46 to 72% by weight trifluoroiodomethane (CF$_3$I);
2 to 28% by weight 1,1,1,2-tetrafluoropropene (HFO-1234yf);
15 to 21.5% by weight difluoromethane (HFC-32); and
1 to 4.5% by weight pentafluoroethane (HFC-125). Refrigerants as described in this paragraph are sometimes referred to for convenience as Refrigerant 14.

The present invention relates to a refrigerant consisting of the following four compounds, with each compound being present in the following relative percentages:
46 to 72% by weight trifluoroiodomethane (CF$_3$I);
2 to 28% by weight 1,1,1,2-tetrafluoropropene (HFO-1234yf);
15 to 21.5% by weight difluoromethane (HFC-32); and
1 to 4.5% by weight pentafluoroethane (HFC-125). Refrigerants as described in this paragraph are sometimes referred to for convenience as Refrigerant 15.

The present invention relates to a refrigerant comprising at least about 98.5% by weight of the following four compounds, with each compound being present in the following relative percentages:
about 50 to about 68% by weight trifluoroiodomethane (CF$_3$I);
about 6 to about 24% by weight 1,1,1,2-tetrafluoropropene (HFO-1234yf);
about 18 to about 21% by weight difluoromethane (HFC-32); and
2 to 4.5% by weight pentafluoroethane (HFC-125). Refrigerants as described in this paragraph are sometimes referred to for convenience as Refrigerant 16.

The present invention relates to a refrigerant consisting essentially of the following four compounds, with each compound being present in the following relative percentages:
about 50 to about 68% by weight trifluoroiodomethane (CF$_3$I);
about 6 to about 24% by weight 1,1,1,2-tetrafluoropropene (HFO-1234yf);
about 18 to about 21% by weight difluoromethane (HFC-32); and
2 to 4.5% by weight pentafluoroethane (HFC-125). Refrigerants as described in this paragraph are sometimes referred to for convenience as Refrigerant 17.

The present invention relates to a refrigerant consisting of the following four compounds, with each compound being present in the following relative percentages:
about 50 to about 68% by weight trifluoroiodomethane (CF$_3$I);
about 6 to about 24% by weight 1,1,1,2-tetrafluoropropene (HFO-1234yf);
about 18 to about 21% by weight difluoromethane (HFC-32); and
2 to 4.5% by weight pentafluoroethane (HFC-125). Refrigerants as described in this paragraph are sometimes referred to for convenience as Refrigerant 18.

The present invention relates to a refrigerant comprising at least about 98.5% by weight of the following four compounds, with each compound being present in the following relative percentages:
about 53% by weight trifluoroiodomethane (CF$_3$I);
about 23% by weight 1,1,1,2-tetrafluoropropene (HFO-1234yf);
20±1% by weight difluoromethane (HFC-32); and
4±0.5% by weight pentafluoroethane (HFC-125). Refrigerants as described in this paragraph are sometimes referred to for convenience as Refrigerant 19.

The present invention relates to a refrigerant consisting essentially of the following four compounds, with each compound being present in the following relative percentages:
about 53% by weight trifluoroiodomethane (CF$_3$I);
about 23% by weight 1,1,1,2-tetrafluoropropene (HFO-1234yf);
20±1% by weight difluoromethane (HFC-32); and
4±0.5% by weight pentafluoroethane (HFC-125). Refrigerants as described in this paragraph are sometimes referred to for convenience as Refrigerant 20.

The present invention relates to a refrigerant consisting of the following four compounds, with each compound being present in the following relative percentages:
about 53% by weight trifluoroiodomethane (CF$_3$I);
about 23% by weight 1,1,1,2-tetrafluoropropene (HFO-1234yf);
20±1% by weight difluoromethane (HFC-32); and
4±0.5% by weight pentafluoroethane (HFC-125). Refrigerants as described in this paragraph are sometimes referred to for convenience as Refrigerant 21.

The present invention relates to a refrigerant consisting essentially of the following four compounds, with each compound being present in the following relative percentages:
about 50 to about 68% by weight trifluoroiodomethane (CF$_3$I);
about 6 to about 24% by weight 1,1,1,2-tetrafluoropropene (HFO-1234yf);
about 18 to about 21% by weight difluoromethane (HFC-32); and
2 to 4.5% by weight pentafluoroethane (HFC-125), wherein said refrigerant is non-flammable and has a GWP of 400 or less. Refrigerants as described in this paragraph are sometimes referred to for convenience as Refrigerant 22.

DETAILED DESCRIPTION OF THE INVENTION

Definitions

Figure 1:
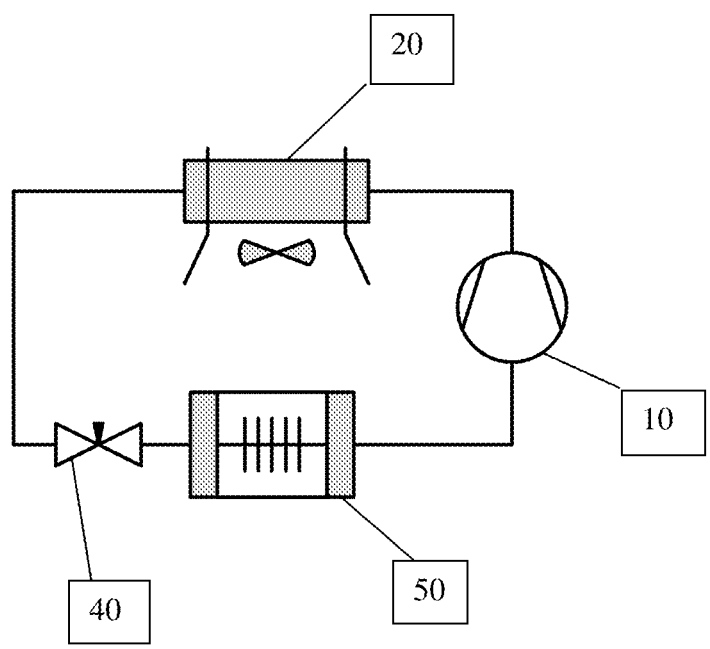
FIG. 1 is a schematic representation of an exemplary heat transfer system useful in air conditioning, low temperature refrigeration and medium temperature refrigeration.

For the purposes of this invention, the term "about" in relation to the amounts expressed in weight percent means that the amount of the component can vary by an amount of +/−2% by weight.

For the purposes of this invention, the term "about" in relation to temperatures in degrees centigrade (° C.) means that the stated temperature can vary by an amount of +/−5° C.

The term "capacity" is the amount of cooling provided, in BTUs/hr, by the refrigerant in the refrigeration system. This is experimentally determined by multiplying the change in enthalpy in BTU/lb, of the refrigerant as it passes through the evaporator by the mass flow rate of the refrigerant. The enthalpy can be determined from the measurement of the pressure and temperature of the refrigerant. The capacity of the refrigeration system relates to the ability to maintain an area to be cooled at a specific temperature. The capacity of a refrigerant represents the amount of cooling or heating that it provides and provides some measure of the capability of a compressor to pump quantities of heat for a given volumetric flow rate of refrigerant. In other words, given a specific compressor, a refrigerant with a higher capacity will deliver more cooling or heating power.

The phrase "coefficient of performance" (hereinafter "COP") is a universally accepted measure of refrigerant performance, especially useful in representing the relative thermodynamic efficiency of a refrigerant in a specific heating or cooling cycle involving evaporation or condensation of the refrigerant. In refrigeration engineering, this term expresses the ratio of useful refrigeration or cooling capacity to the energy applied by the compressor in compressing the vapor and therefore expresses the capability of a given compressor to pump quantities of heat for a given volumetric flow rate of a heat transfer fluid, such as a refrigerant. In other words, given a specific compressor, a refrigerant with a higher COP will deliver more cooling or heating power. One means for estimating COP of a refrigerant at specific operating conditions is from the thermodynamic properties of the refrigerant using standard refrigeration cycle analysis techniques (see for example, R. C. Downing, FLUOROCARBON REFRIGERANTS HANDBOOK, Chapter 3, Prentice-Hall, 1988 which is incorporated herein by reference in its entirety).

The phrase "discharge temperature" refers to the temperature of the refrigerant at the outlet of the compressor. The advantage of a low discharge temperature is that it permits the use of existing equipment without activation of the thermal protection aspects of the system which are preferably designed to protect compressor components and avoids the use of costly controls such as liquid injection to reduce discharge temperature.

The phrase "Global Warming Potential" (hereinafter "GWP") was developed to allow comparisons of the global warming impact of different gases. Specifically, it is a measure of how much energy the emission of one ton of a gas will absorb over a given period of time, relative to the emission of one ton of carbon dioxide. The larger the GWP, the more that a given gas warms the Earth compared to CO2 over that time period. The time period usually used for GWP is 100 years. GWP provides a common measure, which allows analysts to add up emission estimates of different gases. See http://www.protocolodemontreal.org.br/site/images/publicacoes/setor_manufatura_equipamentos_refrigeracao_arcondicionado/Como_calcular_el_Potencial_de_Calentamiento_Atmosferico_en_las_mezclas_de_refrigerantes.pdf The term "Occupational Exposure Limit (OEL)" is determined in accordance with ASHRAE Standard 34-2016 Designation and Safety Classification of Refrigerants.

The term "mass flow rate" is the mass of refrigerant passing through a conduit per unit of time.

As used herein, the term "replacement" means the use of a composition of the present invention in a heat transfer system that had been designed for use with, or is commonly used with, or is suitable for use with another refrigerant. By way of example, when a refrigerant or heat transfer composition of the present invention is used in a heat transfer system that was designed for use with R-404A, then the refrigerant or heat transfer composition of the present invention is a replacement for R-404A in said system. It will thus be understood that the term "replacement" includes the use of the refrigerants and heat transfer compositions of the present invention in both new and existing systems that had been designed for use with, are commonly used with, or are suitable for use with R-404A.

As used herein the terms "retrofit" and "retrofitting" mean and refer to system and methods which involve removing at least a portion of an refrigerant from an existing heat transfer system and introducing a different refrigerant into the system such that the system is operable without requiring substantial engineering modification of the existing system, particularly without modification of the condenser, the evaporator and/or the expansion valve.

The phrase "thermodynamic glide" applies to zeotropic refrigerant mixtures that have varying temperatures during phase change processes in the evaporator or condenser at constant pressure.

The term "low temperature refrigeration system" refers to heat transfer systems which operate with a condensing temperature of from about 20° C. to about 60° C. and evaporating temperature of from about −45° C. up to and including −12° C.

The term "medium temperature refrigeration system" refers to heat transfer systems which operate with a condensing temperature of from about 20° C. to about 60° C. and evaporating temperature of from −12° C. to about 0° C.

The term "medium temperature refrigeration system" refers to heat transfer systems which operate with a condensing temperature of from about 20° C. to about 60° C. and evaporating temperature of from −12° C. to about 0° C.

The term "residential air conditioning" as used herein refers to heat transfer systems to condition air (cooling or heating) which operate with a condensing temperature of from about 20° C. to about 70° C. and evaporating temperature of from about 0° C. to about 20° C.

The term "residential air-to-water heat pump" as used herein refers to heat transfer systems which transfer heat from outdoor air to water within the residence, which water is in turn used to condition the air in the residence and which operates with a condensing temperature of from about 20° C. to about 70° C. and evaporating temperature of from about −20° C. to about 3° C.

The term "air cooled chillers" as used herein refers to heat transfer systems which transfer heat to or from process water (typically used to cool or heat the inside of buildings) and reject or absorb heat from ambient air and which operate with a condensing temperature of from about 20° C. to about 70° C. and evaporating temperature of from about 0° C. to about 10° C.

The term "supermarket refrigeration" as used herein refers to commercial refrigeration systems that are used to maintain chilled or frozen food in both product display cases and storage refrigerators.

The term "transport refrigeration" as used herein refers to refrigeration system that are used in the transportation of chilled or frozen products by means of trucks, trailers, vans, intermodal containers and boxes. The term also includes the use of refrigeration and air conditioning on merchant, naval and fishing vessels above about 100 gross tonnes (GT) (over about 24 m in length).

Refrigerants and Heat Transfer Compositions

Applicants have found that the refrigerant of the present invention, including each of Refrigerants 1-22 as described herein, is capable of providing exceptionally advantageous properties including: heat transfer properties, low or no toxicity, non-flammability, near zero ozone depletion potential ("ODP"), and lubricant compatibility, including miscibility with POE lubricants over the operating temperature and concentration ranges used in low and medium temperature refrigeration systems, as well as low GWP, especially as a replacement and as a retrofit and/or replacement for R-404A and/or R-22 in in air conditioning systems (including residential air conditioning, chiller systems and air conditioning systems in trucks and buses), low temperature refrigeration systems and medium temperature refrigeration systems.

A particular advantage of the refrigerants of the present invention, including each of Refrigerants 1-22, is that they are non-flammable when tested in accordance with the Non-Flammability Test defined herein. It will be appreciated by the skilled person that the flammability of a refrigerant is an important characteristic for use in certain important heat transfer applications. Thus, it is a desire in the art to provide a refrigerant composition which can be used as a replacement and/or a retrofit for R-404A and/or R-22 which has excellent heat transfer properties, low or no toxicity, near zero ODP, and lubricant compatibility, including miscibility with POE lubricants over the operating temperature and concentration ranges used in in air conditioning systems (including residential air conditioning, chiller systems and air conditioning systems in trucks and buses), low temperature refrigeration systems and medium temperature refrigeration systems, and which maintains non-flammability in use. This desirable advantage can be achieved met by the refrigerants of the present invention.

Another particular advantage of the refrigerants of the present invention, including each of Refrigerants 1-22, is that exhibit an excellent match to the capacity and COP of R-404A and R-22 in air conditioning systems (including particularly residential air conditioning, air conditioning in trucks and buses and chiller systems), low temperature refrigeration systems and medium temperature which provided the unexpected advantage of excellent performance in retrofit applications, especially for R-22 systems.

Applicants have found that the refrigerant compositions of the invention, including each of Refrigerants 1-22, are capable of achieving a difficult to achieve combination of properties including particularly low GWP. Thus, the compositions of the invention have a GWP of 400 or less and preferably 300 or less.

In addition, the refrigerant compositions of the invention, including each of Refrigerants 1-22, have a low ODP. Thus, the compositions of the invention have an ODP of not greater than 0.05, preferably not greater than 0.02, and more preferably about zero.

In addition, the refrigerant compositions of the invention, including each of Refrigerants 1-22, show acceptable toxicity and preferably have an OEL of greater than about 400. As those skilled in the art are aware, a non-flammable refrigerant that has an OEL of greater than about 400 is advantageous since it results in the refrigerant being classified in the desirable Class A of ASHRAE standard 34.

Applicants have found that the heat transfer compositions of the present invention, including heat transfer compositions that include each of Refrigerants 1-22 as described herein, is capable of providing exceptionally advantageous properties including: heat transfer properties, chemical stability under the conditions of use, low or no toxicity, non-flammability, near zero ozone depletion potential ("ODP"), and lubricant compatibility, including miscibility with POE lubricants over the operating temperature and concentration ranges used in air conditioning systems (including particularly residential air conditioning, air conditioning in trucks and buses and chiller systems), and low and medium temperature refrigeration systems, as well as low GWP, especially as a replacement for R-404A and R-22 in air conditioning systems (including particularly residential air conditioning, air conditioning in trucks and buses and chiller systems) and low temperature refrigeration systems and, including in prior R-404A/R-22.

The heat transfer compositions can consist essentially of any refrigerant of the present invention, including each of Refrigerants 1-22.

The heat transfer compositions of the present invention can consist of any refrigerant of the present invention, including each of Refrigerants 1-22.

The heat transfer compositions of the invention may include other components for the purpose of enhancing or providing certain functionality to the compositions. Such other components may include one or more of lubricants, dyes, solubilizing agents, compatibilizers, stabilizers, antioxidants, corrosion inhibitors, extreme pressure additives and anti-wear additives.

Lubricants

The heat transfer composition of the invention particularly comprises a refrigerant as described herein, including each of Refrigerants 1-22, and a lubricant. Applicants have found that the heat transfer compositions of the present invention, including heat transfer compositions that include a lubricant, and particularly a POE lubricant and each of Refrigerants 1-22 as described herein, is capable of providing exceptionally advantageous properties including, in addition to the advantageous properties identified herein with respect to the refrigerant, excellent refrigerant/lubricant compatibility, including miscibility with POE lubricants over the operating temperature and concentration ranges used air conditioning systems (including particularly residential air conditioning, air conditioning in trucks and buses and chiller systems), especially as a replacement for and as a retrofit for R-404A/R-22 in air conditioning systems (including particularly residential air conditioning, air conditioning in trucks and buses and chiller systems).

In general, the heat transfer compositions of the present invention that include a lubricant comprise lubricant in amounts preferably of from about 0.1% by weight to about 5%, or from 0.1% by weight to about 1% by weight, or from 0.1% by weight to about 0.5% by weight, based on the weight of the heat transfer composition.

Commonly used refrigerant lubricants such as polyol esters (POEs), polyalkylene glycols (PAGs), silicone oils, mineral oil, alkylbenzenes (ABs), polyvinyl ethers (PVEs), polyethers (PEs) and poly(alpha-olefin) (PAO) that are used in refrigeration machinery may be used with the refrigerant compositions of the present invention.

Preferably the lubricants are selected from POEs, mineral oil, ABs, PVE, and PEs.

Preferably the lubricants are POEs.

In general, the heat transfer compositions of the present invention that include POE lubricant comprise POE lubricant in amounts preferably of from about 0.1% by weight to about 5%, or from 0.1% by weight to about 1% by weight, or from 0.1% by weight to about 0.5% by weight, based on the weight of the heat transfer composition.

Commercially available POEs that are preferred for use in the present heat transfer compositions include neopentyl glycol dipelargonate which is available as Emery 2917 (registered trademark) and Hatcol 2370 (registered trademark) and pentaerythritol derivatives including those sold under the trade designations Emkarate RL32-3MAF and Emkarate RL68H by CPI Fluid Engineering. Emkarate RL32-3MAF and Emkarate RL68H are preferred POE lubricants having the properties identified below:

| Property | RL32-3MAF | RL68H |
|---|---|---|
| Viscosity @ 40° C. (ASTM D445), cSt | about 31 | about 67 |
| Viscosity @ 100° C. (ASTM D445), cSt | about 5.6 | about 9.4 |
| Pour Point (ASTM D97), ° C. | about −40 | about −40 |

Commercially available polyvinyl ethers that are preferred for use in the present heat transfer compositions include those lubricants sold under the trade designations FVC32D and FVC68D, from Idemitsu.

Commercially available mineral oils that are preferred for use in the present heat transfer compositions include Witco LP 250 (registered trademark) from Witco, Suniso 3GS from Witco and Calumet R015 from Calumet. Commercially available alkylbenzene lubricants include Zerol 150 (registered trademark) and Zerol 300® from Shrieve Chemical.

A preferred heat transfer composition comprises Refrigerant 1 and POE lubricant.

A preferred heat transfer composition comprises Refrigerant 2 and POE lubricant.

A preferred heat transfer composition comprises Refrigerant 3 and POE lubricant.

A preferred heat transfer composition comprises Refrigerant 4 and POE lubricant.

A preferred heat transfer composition comprises Refrigerant 5 and POE lubricant.

A preferred heat transfer composition comprises Refrigerant 6 and POE lubricant.

A preferred heat transfer composition comprises Refrigerant 7 and POE lubricant.

A preferred heat transfer composition comprises Refrigerant 8 and POE lubricant.

A preferred heat transfer composition comprises Refrigerant 9 and POE lubricant.

A preferred heat transfer composition comprises Refrigerant 10 and POE lubricant.

A preferred heat transfer composition comprises Refrigerant 11 and POE lubricant.

A preferred heat transfer composition comprises Refrigerant 12 and POE lubricant.

A preferred heat transfer composition comprises Refrigerant 13 and POE lubricant.

A preferred heat transfer composition comprises Refrigerant 14 and POE lubricant.

A preferred heat transfer composition comprises Refrigerant 15 and POE lubricant.

A preferred heat transfer composition comprises Refrigerant 16 and POE lubricant.

A preferred heat transfer composition comprises Refrigerant 17 and POE lubricant.

A preferred heat transfer composition comprises Refrigerant 18 and POE lubricant.

A preferred heat transfer composition comprises Refrigerant 19 and POE lubricant.

A preferred heat transfer composition comprises Refrigerant 20 and POE lubricant.

A preferred heat transfer composition comprises Refrigerant 21 and POE lubricant.

A preferred heat transfer composition comprises Refrigerant 22 and POE lubricant.

A lubricant consisting essentially of a POE having a viscosity at 40° C. measured in accordance with ASTM D445 of from about 30 to about 70 is referred to herein as Lubricant 1.

A preferred heat transfer composition comprises Refrigerant 1 and Lubricant 1.

A preferred heat transfer composition comprises Refrigerant 2 and Lubricant 1.

A preferred heat transfer composition comprises Refrigerant 3 and Lubricant 1.

A preferred heat transfer composition comprises Refrigerant 4 and Lubricant 1.

A preferred heat transfer composition comprises Refrigerant 5 and Lubricant 1.

A preferred heat transfer composition comprises Refrigerant 6 and Lubricant 1

A preferred heat transfer composition comprises Refrigerant 7 and Lubricant 1.

A preferred heat transfer composition comprises Refrigerant 8 and Lubricant 1.

A preferred heat transfer composition comprises Refrigerant 9 and Lubricant 1.

A preferred heat transfer composition comprises Refrigerant 10 and Lubricant 1.

A preferred heat transfer composition comprises Refrigerant 11 and Lubricant 1.

A preferred heat transfer composition comprises Refrigerant 12 and Lubricant 1.

A preferred heat transfer composition comprises Refrigerant 13 and Lubricant 1.

A preferred heat transfer composition comprises Refrigerant 14 and Lubricant 1.

A preferred heat transfer composition comprises Refrigerant 15 and Lubricant 1.

A preferred heat transfer composition comprises Refrigerant 16 and Lubricant 1

A preferred heat transfer composition comprises Refrigerant 17 and Lubricant 1.

A preferred heat transfer composition comprises Refrigerant 18 and Lubricant 1.

A preferred heat transfer composition comprises Refrigerant 19 and Lubricant 1.

A preferred heat transfer composition comprises Refrigerant 20 and Lubricant 1.

A preferred heat transfer composition comprises Refrigerant 21 and Lubricant 1.

A preferred heat transfer composition comprises Refrigerant 22 and Lubricant 1.

A lubricant consisting essentially of a POE having a viscosity at 40° C. measured in accordance with ASTM D445 of from about 30 to about 70 and which is present in an amount of from about 0.1% to about 1% based on the weight of the heat transfer composition, is referred to herein as Lubricant 2.

A preferred heat transfer composition comprises Refrigerant 1 and Lubricant 2.

A preferred heat transfer composition comprises Refrigerant 2 and Lubricant 2.

A preferred heat transfer composition comprises Refrigerant 3 and Lubricant 2.

A preferred heat transfer composition comprises Refrigerant 4 and Lubricant 2.

A preferred heat transfer composition comprises Refrigerant 5 and Lubricant 2.

A preferred heat transfer composition comprises Refrigerant 6 and Lubricant 2.

A preferred heat transfer composition comprises Refrigerant 7 and Lubricant 2.

A preferred heat transfer composition comprises Refrigerant 8 and Lubricant 2.

A preferred heat transfer composition comprises Refrigerant 9 and Lubricant 2.

A preferred heat transfer composition comprises Refrigerant 10 and Lubricant 2.

A preferred heat transfer composition comprises Refrigerant 11 and Lubricant 2.

A preferred heat transfer composition comprises Refrigerant 12 and Lubricant 2.

A preferred heat transfer composition comprises Refrigerant 13 and Lubricant 2.

A preferred heat transfer composition comprises Refrigerant 14 and Lubricant 2.

A preferred heat transfer composition comprises Refrigerant 15 and Lubricant 2.

A preferred heat transfer composition comprises Refrigerant 16 and Lubricant 2.

A preferred heat transfer composition comprises Refrigerant 17 and Lubricant 2.

A preferred heat transfer composition comprises Refrigerant 18 and Lubricant 2.

A preferred heat transfer composition comprises Refrigerant 19 and Lubricant 2.

A preferred heat transfer composition comprises Refrigerant 20 and Lubricant 2.

A preferred heat transfer composition comprises Refrigerant 21 and Lubricant 2.

A preferred heat transfer composition comprises Refrigerant 22 and Lubricant 2.

A preferred heat transfer composition comprises a refrigerant of the present invention, including each of Refrigerants 1-22, and from about 0.1% to about 5%, or from about 0.1% to about 1%, or from about 0.1% to about 0.5%, of a lubricant, wherein said percentage is based on the weight of the lubricant in the heat transfer composition.

A preferred heat transfer composition comprises a refrigerant of the present invention, including each of Refrigerants 1-22, and from about 0.1% to about 5%, or from about 0.1% to about 1%, or from about 0.1% to about 0.5%, of a POE lubricant, wherein said percentage is based on the weight of the lubricant in the heat transfer composition.

A preferred heat transfer composition comprises a refrigerant of the present invention, including each of Refrigerants 1-22, and from about 0.1% to about 5% or from about 0.1% to about 1% of a Lubricant 1, wherein said percentage is based on the weight of the lubricant in the heat transfer composition.

A lubricant consisting essentially of a POE having a viscosity at 40° C. measured in accordance with ASTM D445 of from about 30 to about 70 and which is present in an amount of from about 0.1% to about 0.5% based on the weight of the heat transfer composition, is referred to herein as Lubricant 3.

A preferred heat transfer composition comprises a refrigerant of the present invention, including each of Refrigerants 1-22, and Lubricant 3.

A lubricant consisting essentially of a POE having a viscosity at 40° C. measured in accordance with ASTM D445 of from about 30 to about 70 and which is present in an amount of from about 0.1% to about 0.5% based on the weight of the heat transfer composition, is referred to herein as Lubricant 4.

A preferred heat transfer composition comprises a refrigerant of the present invention, including each of Refrigerants 1-22, and Lubricant 4.

Stabilizers

The heat transfer composition of the invention particularly comprises a refrigerant as discussed herein, including each of Refrigerants 1-22, and a stabilizer. Applicants have found that the heat transfer compositions of the present invention, including heat transfer compositions that include a stabilizer and each of Refrigerants 1-22 as described herein, is capable of providing exceptionally advantageous properties including, in addition to the advantageous properties identified herein with respect to the refrigerant, chemical stability over the operating temperature and concentration ranges used in residential air conditioning. low and medium temperature refrigeration systems, especially as a replacement for R-404A/R-22 in air conditioning systems (including particularly residential air conditioning, air conditioning in trucks and buses and chiller systems).

In preferred embodiments the stabilizer comprises one or more of alkylated naphthalene compounds, diene-based compounds, phenol-based compounds and isobutylene. Other compounds that may be used in the stabilizer include phosphorus-based compounds, nitrogen-based compounds and epoxide compounds. Preferred compounds within each of these groups are described below.

Alkylated Naphthalenes

Applicants have surprisingly and unexpectedly found that alkylated Naphthalenes are highly effective as stabilizers for the heat transfer compositions of the present invention. As used herein, the term "alkylated naphthalene" refers to compounds having the following structure:

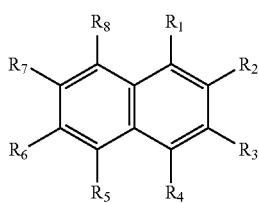

where each $R_1$-$R_8$ is independently selected from linear alkyl group, a branched alkyl group and hydrogen. The particular length of the alkyl chains and the mixtures or branched and straight chains and hydrogens can vary within the scope of the present invention, and it will be appreciated and understood by those skilled in the art that such variation is reflected the physical properties of the alkylated naphthalene, including in particular the viscosity of the alkylated compound, and producers of such materials frequently define the materials by reference to one or more of such properties as an alternative the specification of the particular R groups.

Applicants have found unexpected, surprising and advantageous results are associated with the use of alkylated naphthalene as a stabilizer according to the present invention having the following properties, and alkylated naphthalene compounds having the indicated properties are referred to for convenience herein as Alkylated Naphthalene 1-Alkylated Naphthalene 5 as indicated respectively in rows 1-5 in the Alkylated Naphthalene Property Table 1 below:

| Property | ALKYLATED NAPHTHALENE PROPERTY TABLE 1 | | | | |
|---|---|---|---|---|---|
| | Alkylated Naphthalene 1 (AN1) | Alkylated Naphthalene 2 (AN2) | Alkylated Naphthalene 3 (AN3) | Alkylated Naphthalene 4 (AN4) | Alkylated Naphthalene 5 (AN5) |
| Viscosity @ 40° C. (ASTM D445), cSt | 20-200 | 20-100 | 20-50 | 30-40 | about 36 |
| Viscosity @ 100° C. (ASTM D445), cSt | 3-20 | 3-10 | 3-8 | 5-7 | about 5.6 |
| Pour Point (ASTM D97), ° C. | −50 to −20 | −45 to −25 | −40 to −30 | −35 to −30 | about −33 |

As used herein in connection with viscosity at 40° C. measured according to ASTM D445, the term "about" means+/−4 cSt.

As used herein in connection with viscosity at 100° C. measured according to ASTM D445, the term "about" means+/−0.4 cSt.

As used herein in connection with pour point as measured according to ASTM D97, the term "about" means+/−5° C.

Applicants have also found that unexpected, surprising and advantageous results are associated with the use of alkylated naphthalene as a stabilizer according to the present invention having the following properties, and alkylated naphthalene compounds having the indicated properties are referred to for convenience herein as Alkylated Naphthalene 6-Alkylated Naphthalene 10 as indicated respectively in rows 6-10 in the Alkylated Naphthalene Property Table 2 below:

| Property | ALKYLATED NAPHTHALENE PROPERTY TABLE 2 | | | | |
|---|---|---|---|---|---|
| | Alkylated Naphthalene 6 (AN6) | Alkylated Naphthalene 7 (AN7) | Alkylated Naphthalene 8 (AN8) | Alkylated Naphthalene 9 (AN9) | Alkylated Naphthalene 10 (AN10) |
| Viscosity @ 40° C. (ASTM D445), cSt | 20-200 | 20-100 | 20-50 | 30-40 | about 36 |
| Viscosity @ 100° C. (ASTM D445), cSt | 3-20 | 3-10 | 3-8 | 5-7 | about 5.6 |
| Aniline Point (ASTM D611), ° C. | 40-110 | 50-90 | 50-80 | 60-70 | about 36 |
| Noack Volatility CEC L40 (ASTM D6375), wt % | 1-50 | 5-30 | 5-15 | 10-15 | about 12 |

ALKYLATED NAPHTHALENE PROPERTY TABLE 2

| Property | Alkylated Naphthalene 6 (AN6) | Alkylated Naphthalene 7 (AN7) | Alkylated Naphthalene 8 (AN8) | Alkylated Naphthalene 9 (AN9) | Alkylated Naphthalene 10 (AN10) |
|---|---|---|---|---|---|
| Pour Point (ASTM D97), ° C. | −50 to −20 | −45 to −25 | −40 to −30 | −35 to −30 | About −33 |
| Flash Point (ASTM D92)), ° C. | 200-300 | 200-270 | 220-250 | 230-240 | about 236 |

Examples of alkylated naphthalenes within the meaning of Alkylated Naphthalene 1 through Alkylated Naphthalene 6 include those sold by King Industries under the trade designations NA-LUBE KR-007A; KR-008, KR-009; KR-015; KR-019; KR-005FG; KR-015FG; and KR-029FG.

Examples of alkylated Naphthalenes within the meaning of Alkylated Naphthalene 2 and Alkylated Naphthalene 7 include those sold by King Industries under the trade designations NA-LUBE KR-007A; KR-008, KR-009; and KR-005FG.

An example of an alkylated naphthalene that is within the meaning of Alkylated Naphthalene 5 and Alkylated Naphthalene 10 includes the product sold by King Industries under the trade designation NA-LUBE KR-008.

The alkylated naphthalene is preferably in the heat transfer compositions of the present invention that include a refrigerant of the present invention, including each of Refrigerants 1-22, wherein the alkylated naphthalene is present in an amount of from 0.01% to about 10%, or from about 1.5% to about 4.5%, or from about 2.5% to about 3.5%, where amounts are in percent by weight based on the amount of alkylated naphthalene plus refrigerant.

Diene-Based Compounds

The diene-based compounds can include C3 to C15 dienes and to compounds formed by reaction of any two or more C3 to C4 dienes. Preferably, the diene-based compounds are selected from the group consisting of allyl ethers, propadiene, butadiene, isoprene, and terpenes. The diene-based compounds are preferably terpenes, which include but are not limited to terebene, retinal, geraniol, terpinene, delta-3 carene, terpinolene, phellandrene, fenchene, myrcene, farnesene, pinene, nerol, citral, camphor, menthol, limonene, nerolidol, phytol, carnosic acid, and vitamin A1. Preferably, the stabilizer is farnesene. Preferred terpene stabilizers are disclosed in U.S. Provisional Patent Application No. 60/638,003 filed on Dec. 12, 2004, published as US 2006/0167044A1, which is incorporated herein by reference. In addition, the diene-based compounds can be provided in the heat transfer composition in an amount greater than 0 and preferably from 0.0001% by weight to about 5% by weight, preferably 0.001% by weight to about 2.5% by weight, and more preferably from 0.01% to about 1% by weight. In each case, percentage by weight refers to the weight of the diene-based compound(s) plus refrigerant in the heat transfer composition.

Phenol-Based Compounds

The phenol-based compound can be one or more compounds selected from 4,4'-methylenebis(2,6-di-tert-butylphenol); 4,4'-bis(2,6-di-tert-butylphenol); 2,2- or 4,4-biphenyldiols, including 4,4'-bis(2-methyl-6-tert-butylphenol); derivatives of 2,2- or 4,4-biphenyldiols; 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tertbutylphenol; 2,6-di-tert-alpha-dimethylamino-p-cresol; 2,6-di-tert-butyl-4(N,N'-dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone, and preferably BHT.

The phenol compounds can be provided in the heat transfer composition in an amount of greater than 0 and preferably from 0.0001% by weight to about 5% by weight, preferably 0.001% by weight to about 2.5% by weight, and more preferably from 0.01% to about 1% by weight. In each case, percentage by weight refers to the weight of the phenol-based compound(s) plus refrigerant in the heat transfer composition.

The Phosphorus-Based Compounds

The phosphorus compound can be a phosphite or a phosphate compound. For the purposes of this invention, the phosphite compound can be a diaryl, dialkyl, triaryl and/or trialkyl phosphite, and/or a mixed aryl/alkyl di- or tri-substituted phosphite, in particular one or more compounds selected from hindered phosphites, tris-(di-tert-butylphenyl) phosphite, di-n-octyl phophite, iso-octyl diphenyl phosphite, iso-decyl diphenyl phosphite, tri-iso-decyl phosphate, triphenyl phosphite and diphenyl phosphite, particularly diphenyl phosphite. The phosphate compounds can be a triaryl phosphate, trialkyl phosphate, alkyl mono acid phosphate, aryl diacid phosphate, amine phosphate, preferably triaryl phosphate and/or a trialkyl phosphate, particularly tri-n-butyl phosphate.

The phosphorus compounds can be provided in the heat transfer composition in an amount of greater than 0 and preferably from 0.0001% by weight to about 5% by weight, preferably 0.001% by weight to about 2.5% by weight, and more preferably from 0.01% to about 1% by weight. In each case, by weight refers to weight of the phosphorous-based compound(s) plus refrigerant in the heat transfer composition.

The Nitrogen Compound

When the stabilizer includes a nitrogen compound, the stabilizer may comprise an amine based compound such as one or more secondary or tertiary amines selected from diphenylamine, p-phenylenediamine, triethylamine, tributylamine, diisopropylamine, triisopropylamine and triisobutylamine. The amine based compound can be an amine antioxidant such as a substituted piperidine compound, i.e. a derivative of an alkyl substituted piperidyl, piperidinyl, piperazinone, or alkyoxypiperidinyl, particularly one or more amine antioxidants selected from 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6,6-tetramethyl-4-hydroxy-piperidyl succinate; alkylated paraphenylenediamines such as N-phenyl-N'-(1,3-dimethylbutyl)-p-phenylenediamine or N,N'-di-sec-butyl-p-phenylenediamine and hydroxylamines such as tallow amines, methyl bis tallow amine and bis tallow amine, or phenol-alpha-napththylamine or Tinuvin®765 (Ciba), BLS®1944 (Mayzo Inc) and BLS® 1770 (Mayzo Inc). For the purposes of this invention, the amine based compound also can be an alkyldiphenyl amine such as bis (nonylphenyl amine), dialkylamine such as (N-(1-methylethyl)-2-propylamine, or one or more of phenyl-alpha-naphthyl amine (PANA), alkyl-phenyl-alpha-naphthyl-amine (APANA), and bis (nonylphenyl) amine. Preferably the amine based compound is one or more of phenyl-alpha-naphthyl amine (PANA), alkyl-phenyl-alpha-naphthyl-amine (APANA) and bis (nonylphenyl) amine, and more preferably phenyl-alpha-naphthyl amine (PANA).

Alternatively, or in addition to the nitrogen compounds identified above, one or more compounds selected from dinitrobenzene, nitrobenzene, nitromethane, nitrosobenzene, and TEMPO [(2,2,6,6-tetramethylpiperidin-1-yl)oxyl] may be used as the stabilizer.

The nitrogen compounds can be provided in the heat transfer composition in an amount of greater than 0 and from 0.0001% by weight to about 5% by weight, preferably 0.001% by weight to about 2.5% by weight, and more preferably from 0.01% to about 1% by weight. In each case, percentage by weight refers to the weight of the nitrogen-based compound(s) plus refrigerant in the heat transfer composition.

Isobutylene

Isobutylene can be provided in the heat transfer composition in an amount of greater than 0 and from 0.0001% by weight to about 5% by weight, preferably from 0.001% by weight to about 2.5% by weight, and more preferably from 0.01% to about 1% by weight. In each case, percentage by weight refers to the weight of the isobutylene plus refrigerant in the heat transfer composition.

Epoxides and Others

Useful epoxides include aromatic epoxides, alkyl epoxides, and alkyenyl epoxides.

Combinations of Stabilizers

Preferably, the heat transfer composition comprises a refrigerant of the present invention, including each of Refrigerants 1-22, and a stabilizer composition comprising a diene-based compound and an alkylated naphthalene. A stabilizer as described in this paragraph is referred to herein as Stabilizer 1.

The heat transfer composition of the invention can preferably comprise Refrigerant 1 and Stabilizer 1.

The heat transfer composition of the invention can preferably comprise Refrigerant 2 and Stabilizer 1.

The heat transfer composition of the invention can preferably comprise Refrigerant 3 and Stabilizer 1.

The heat transfer composition of the invention can preferably comprise Refrigerant 4 and Stabilizer 1.

The heat transfer composition of the invention can preferably comprise Refrigerant 5 and Stabilizer 1.

The heat transfer composition of the invention can preferably comprise Refrigerant 6 and Stabilizer 1.

The heat transfer composition of the invention can preferably comprise Refrigerant 7 and Stabilizer 1.

The heat transfer composition of the invention can preferably comprise Refrigerant 8 and Stabilizer 1.

The heat transfer composition of the invention can preferably comprise Refrigerant 9 and Stabilizer 1.

The heat transfer composition of the invention can preferably comprise Refrigerant 10 and Stabilizer 1.

The heat transfer composition of the invention can preferably comprise Refrigerant 11 and Stabilizer 1.

The heat transfer composition of the invention can preferably comprise Refrigerant 12 and Stabilizer 1.

The heat transfer composition of the invention can preferably comprise Refrigerant 13 and Stabilizer 1.

The heat transfer composition of the invention can preferably comprise Refrigerant 14 and Stabilizer 1.

The heat transfer composition of the invention can preferably comprise Refrigerant 15 and Stabilizer 1.

The heat transfer composition of the invention can preferably comprise Refrigerant 16 and Stabilizer 1.

The heat transfer composition of the invention can preferably comprise Refrigerant 17 and Stabilizer 1.

The heat transfer composition of the invention can preferably comprise Refrigerant 18 and Stabilizer 1.

The heat transfer composition of the invention can preferably comprise Refrigerant 19 and Stabilizer 1.

The heat transfer composition of the invention can preferably comprise Refrigerant 20 and Stabilizer 1.

The heat transfer composition of the invention can preferably comprise Refrigerant 21 and Stabilizer 1.

The heat transfer composition of the invention can preferably comprise Refrigerant 22 and Stabilizer 1.

Preferably, the heat transfer composition comprises a refrigerant of the present invention, including each of Refrigerants 1-22, and a stabilizer composition comprising a diene-based compound, an alkylated naphthalene selected from Alkylated Napthalene 1, and a phenol-based compound. A stabilizer as described in this paragraph is referred to herein as Stabilizer 2.

The heat transfer composition of the invention can preferably comprise Refrigerant 1 and Stabilizer 2.

The heat transfer composition of the invention can preferably comprise Refrigerant 2 and Stabilizer 2.

The heat transfer composition of the invention can preferably comprise Refrigerant 3 and Stabilizer 2.

The heat transfer composition of the invention can preferably comprise Refrigerant 4 and Stabilizer 2.

The heat transfer composition of the invention can preferably comprise Refrigerant 5 and Stabilizer 2.

The heat transfer composition of the invention can preferably comprise Refrigerant 6 and Stabilizer 2.

The heat transfer composition of the invention can preferably comprise Refrigerant 7 and Stabilizer 2.

The heat transfer composition of the invention can preferably comprise Refrigerant 8 and Stabilizer 2.

The heat transfer composition of the invention can preferably comprise Refrigerant 9 and Stabilizer 2.

The heat transfer composition of the invention can preferably comprise Refrigerant 10 and Stabilizer 2.

The heat transfer composition of the invention can preferably comprise Refrigerant 11 and Stabilizer 2.

The heat transfer composition of the invention can preferably comprise Refrigerant 12 and Stabilizer 2.

The heat transfer composition of the invention can preferably comprise Refrigerant 13 and Stabilizer 2.

The heat transfer composition of the invention can preferably comprise Refrigerant 14 and Stabilizer 2.

The heat transfer composition of the invention can preferably comprise Refrigerant 15 and Stabilizer 2.

The heat transfer composition of the invention can preferably comprise Refrigerant 16 and Stabilizer 2.

The heat transfer composition of the invention can preferably comprise Refrigerant 17 and Stabilizer 2.

The heat transfer composition of the invention can preferably comprise Refrigerant 18 and Stabilizer 2.

The heat transfer composition of the invention can preferably comprise Refrigerant 19 and Stabilizer 2.

The heat transfer composition of the invention can preferably comprise Refrigerant 20 and Stabilizer 2.

The heat transfer composition of the invention can preferably comprise Refrigerant 21 and Stabilizer 2.

The heat transfer composition of the invention can preferably comprise Refrigerant 22 and Stabilizer 2.

Preferably, the heat transfer composition comprises a refrigerant of the present invention, including each of Refrigerants 1-22, and a stabilizer composition comprising farnesene, and Alkylated Naphthalene 4 and BHT. A stabilizer as described in this paragraph is referred to herein as Stabilizer 3.

The heat transfer composition of the invention can preferably comprise Refrigerant 1 and Stabilizer 3.

The heat transfer composition of the invention can preferably comprise Refrigerant 2 and Stabilizer 3.

The heat transfer composition of the invention can preferably comprise Refrigerant 3 and Stabilizer 3.

The heat transfer composition of the invention can preferably comprise Refrigerant 4 and Stabilizer 3.

The heat transfer composition of the invention can preferably comprise Refrigerant 5 and Stabilizer 3.

The heat transfer composition of the invention can preferably comprise Refrigerant 6 and Stabilizer 3.

The heat transfer composition of the invention can preferably comprise Refrigerant 7 and Stabilizer 3.

The heat transfer composition of the invention can preferably comprise Refrigerant 8 and Stabilizer 3.

The heat transfer composition of the invention can preferably comprise Refrigerant 9 and Stabilizer 3.

The heat transfer composition of the invention can preferably comprise Refrigerant 10 and Stabilizer 3.

The heat transfer composition of the invention can preferably comprise Refrigerant 11 and Stabilizer 3.

The heat transfer composition of the invention can preferably comprise Refrigerant 12 and Stabilizer 3.

The heat transfer composition of the invention can preferably comprise Refrigerant 13 and Stabilizer 3.

The heat transfer composition of the invention can preferably comprise Refrigerant 14 and Stabilizer 3.

The heat transfer composition of the invention can preferably comprise Refrigerant 15 and Stabilizer 3.

The heat transfer composition of the invention can preferably comprise Refrigerant 16 and Stabilizer 3.

The heat transfer composition of the invention can preferably comprise Refrigerant 17 and Stabilizer 3.

The heat transfer composition of the invention can preferably comprise Refrigerant 18 and Stabilizer 3.

The heat transfer composition of the invention can preferably comprise Refrigerant 19 and Stabilizer 3.

The heat transfer composition of the invention can preferably comprise Refrigerant 20 and Stabilizer 3.

The heat transfer composition of the invention can preferably comprise Refrigerant 21 and Stabilizer 3.

The heat transfer composition of the invention can preferably comprise Refrigerant 22 and Stabilizer 3.

The heat transfer composition can comprises a refrigerant of the present invention, including each of Refrigerants 1-22, and a stabilizer composition comprising farnesene, and alkylated naphthalene selected from Alkylated Naphthalene 1, and BHT. A stabilizer as described in this paragraph is referred to herein as Stabilizer 4.

The heat transfer composition can comprises a refrigerant of the present invention, including each of Refrigerants 1-22, and a stabilizer composition consists essentially of farnesene, Alkylated Naphthalene 5, and BHT. A stabilizer as described in this paragraph is referred to herein as Stabilizer 5.

The heat transfer composition can comprises a refrigerant of the present invention, including each of Refrigerants 1-22, and a stabilizer composition consists of farnesene, Alkylated Naphthalene 5, and BHT. A stabilizer as described in this paragraph is referred to herein as Stabilizer 6.

The heat transfer composition can comprises a refrigerant of the present invention, including each of Refrigerants 1-22, and a stabilizer composition comprising isobutylene and an alkylated naphthalene selected from Alkylated Naphthalenes 1. A stabilizer as described in this paragraph is referred to herein as Stabilizer 7.

The heat transfer composition can comprises a refrigerant of the present invention, including each of Refrigerants 1-22, and a stabilizer composition comprising isobutylene, Alkylated Naphthalene 5 and BHT. A stabilizer as described in this paragraph is referred to herein as Stabilizer 8.

The heat transfer composition can comprises a refrigerant of the present invention, including each of Refrigerants 1-22, and a stabilizer composition consists essentially of isobutylene, Alkylated Naphthalene 5, and BHT. A stabilizer as described in this paragraph is referred to herein as Stabilizer 9.

The heat transfer composition can comprises a refrigerant of the present invention, including each of Refrigerants 1-22, and a stabilizer composition consisting of isobutylene, Alkylated Naphthalene 5 and BHT. A stabilizer as described in this paragraph is referred to herein as Stabilizer 10.

The heat transfer composition of the invention can comprise a refrigerant of the present invention, including each of Refrigerants 1-22, and a stabilizer composition comprising Alkylated Naphthalene 4, wherein the alkylated naphthalene is present in an amount of from 0.0001% by weight to about 5% by weight based on the weight of the heat transfer composition. A stabilizer as described in this paragraph within the indicated amounts in a heat transfer composition is referred to herein as Stabilizer 11.

The heat transfer composition of the invention can preferably comprise a refrigerant of the present invention, including each of Refrigerants 1-22, and a stabilizer composition comprising Alkylated Naphthalene 5, wherein the alkylated naphthalene is present in an amount of from 0.0001% by weight to about 5% by weight based on the weight of the heat transfer composition. A stabilizer as described in this paragraph within the indicated amounts in a heat transfer composition is referred to herein as Stabilizer 12.

The heat transfer composition of the invention can preferably comprise a refrigerant of the present invention, including each of Refrigerants 1-22, and a stabilizer composition comprising BHT, wherein said BHT is present in an amount of from about 0.0001% by weight to about 5% by weight based on the weight of heat transfer composition. A stabilizer as described in this paragraph within the indicated amounts in a heat transfer composition is referred to herein as Stabilizer 13.

The heat transfer composition of the invention can preferably comprise a refrigerant of the present invention, including each of Refrigerants 1-22, and a stabilizer composition comprising farnesene, Alkylated Naphthalene 4 and BHT, wherein the farnesene is provided in an amount of from about 0.0001% by weight to about 5% by weight, the Alkylated Naphthalene 4 is provided in an amount of from about 0.0001% by weight to about 10% by weight, and the BHT is provided in an amount of from about 0.0001% by weight to about 5% by weight, with the percentages being based on the weight of the heat transfer composition. A stabilizer as described in this paragraph within the indicated amounts in a heat transfer composition is referred to herein as Stabilizer 14.

The heat transfer composition of the invention can comprise a refrigerant of the present invention, including each of Refrigerants 1-22, and a stabilizer composition comprising farnesene, Alkylated Naphthalene 4 and BHT, wherein the farnesene is provided in an amount of from 0.001% by weight to about 2.5% by weight, the Alkylated Naphthalene 4 is provided in an amount of from 0.001% by weight to about 10% by weight, and the BHT is provided in an amount of from 0.001% by weight to about 2.5% by weight, with the percentages being based on the weight of the heat transfer composition. A stabilizer as described in this paragraph within the indicated amounts in a heat transfer composition is referred to herein as Stabilizer 15.

The heat transfer composition of the invention can more preferably comprise any refrigerant of the present invention, including each of Refrigerants 1-22, and a stabilizer composition comprising farnesene, Alkylated Naphthalene 4 and BHT, wherein the farnesene is provided in an amount of from 0.001% by weight to about 2.5% by weight, the Alkylated Naphthalene 4 is provided in an amount of from 1.5% by weight to about 4.5% by weight, and the BHT is provided in an amount of from 0.001% by weight to about 2.5% by weight, with the percentages being based on the weight of the heat transfer composition. A stabilizer as described in this paragraph within the indicated amounts in a heat transfer composition is referred to herein as Stabilizer 16.

The heat transfer composition of the invention can more preferably comprise any a refrigerant of the present invention, including each of Refrigerants 1-22, and a stabilizer composition comprising farnesene, Alkylated Naphthalene 5 and BHT, wherein the farnesene is provided in an amount of from 0.001% by weight to about 2.5% by weight, the Alkylated Naphthalene 5 is provided in an amount of from 2.5% by weight to 3.5% by weight, and the BHT is provided in an amount of from 0.001% by weight to about 2.5% by weight, with the percentages being based on the weight of heat transfer composition. A stabilizer as described in this paragraph within the indicated amounts in a heat transfer composition is referred to herein as Stabilizer 17.

Heat Transfer Compositions Comprising Refrigerant, Lubricant and Stabilizer

The heat transfer composition of the invention can comprise any of the refrigerants of the present invention, including each of Refrigerants 1-22, and any lubricant of the invention, including each of Lubricants 1-3, and a stabilizer of the present invention, including each of Stabilizers 1-17.

The heat transfer composition of the invention can comprise any of the refrigerants of the present invention, including each of Refrigerants 1-22, POE lubricant and Stabilizer 1.

The heat transfer composition of the invention can comprise any of the refrigerants of the present invention, including each of Refrigerants 1-22, Lubricant 1 and Stabilizer 1.

The heat transfer composition of the invention can comprise any of the refrigerants of the present invention, including each of Refrigerants 1-22, Lubricant 2 and Stabilizer 1.

The heat transfer composition of the invention can comprise any of the refrigerants of the present invention, including each of Refrigerants 1-22, Lubricant 3 and Stabilizer 1.

The heat transfer composition of the invention can comprise any of the refrigerants of the present invention, including each of Refrigerants 1-22, POE lubricant and Stabilizer 2.

The heat transfer composition of the invention can comprise any of the refrigerants of the present invention, including each of Refrigerants 1-22, Lubricant 1 and Stabilizer 2.

The heat transfer composition of the invention can comprise any of the refrigerants of the present invention, including each of Refrigerants 1-22, Lubricant 2 and Stabilizer 2.

The heat transfer composition of the invention can comprise any of the refrigerants of the present invention, including each of Refrigerants 1-22, Lubricant 3 and Stabilizer 2.

The heat transfer composition of the invention can comprise any of the refrigerants of the present invention, including each of Refrigerants 1-22, POE lubricant and Stabilizer 3.

The heat transfer composition of the invention can comprise any of the refrigerants of the present invention, including each of Refrigerants 1-22, Lubricant 1 and Stabilizer 3.

The heat transfer composition of the invention can comprise any of the refrigerants of the present invention, including each of Refrigerants 1-22, Lubricant 2 and Stabilizer 3.

The heat transfer composition of the invention can comprise any of the refrigerants of the present invention, including each of Refrigerants 1-22, Lubricant 3 and Stabilizer 3.

The heat transfer composition of the invention can comprise any of the refrigerants of the present invention, including each of Refrigerants 1-22, and Lubricant 1, and Stabilizer 14.

The heat transfer composition of the invention can comprise any of the refrigerants of the present invention, including each of Refrigerants 1-22, Lubricant 1 and Stabilizer 14.

The heat transfer composition of the invention can comprise any of the refrigerants of the present invention, including each of Refrigerants 1-22, Lubricant 2 and Stabilizer 14.

The heat transfer composition of the invention can comprise any of the refrigerants of the present invention, including each of Refrigerants 1-22, Lubricant 3 and Stabilizer 14.

The heat transfer composition of the invention can comprise Refrigerant 1, Stabilizer 1, and Lubricant 1.

The heat transfer composition of the invention can comprise Refrigerant 2, Stabilizer 1, and Lubricant 1.

The heat transfer composition of the invention can comprise Refrigerant 3, Stabilizer 1, and Lubricant 1.

The heat transfer composition of the invention can comprise Refrigerant 4, Stabilizer 1, and Lubricant 1.

The heat transfer composition of the invention can comprise Refrigerant 5, Stabilizer 1, and Lubricant 1.

The heat transfer composition of the invention can comprise Refrigerant 6, Stabilizer 1, and Lubricant 1.

The heat transfer composition of the invention can comprise Refrigerant 7, Stabilizer 1, and Lubricant 1.

The heat transfer composition of the invention can comprise Refrigerant 8, Stabilizer 1, and Lubricant 1.

The heat transfer composition of the invention can comprise Refrigerant 9, Stabilizer 1, and Lubricant 1.

The heat transfer composition of the invention can comprise Refrigerant 10, Stabilizer 1, and Lubricant 1.

The heat transfer composition of the invention can comprise Refrigerant 11, Stabilizer 1, and Lubricant 1.

The heat transfer composition of the invention can comprise Refrigerant 12, Stabilizer 1, and Lubricant 1.

The heat transfer composition of the invention can comprise Refrigerant 13, Stabilizer 1, and Lubricant 1.

The heat transfer composition of the invention can comprise Refrigerant 14, Stabilizer 1, and Lubricant 1.

The heat transfer composition of the invention can comprise Refrigerant 15, Stabilizer 1, and Lubricant 1.

The heat transfer composition of the invention can comprise Refrigerant 16, Stabilizer 1, and Lubricant 1.

The heat transfer composition of the invention can comprise Refrigerant 17, Stabilizer 1, and Lubricant 1.

The heat transfer composition of the invention can comprise Refrigerant 18, Stabilizer 1, and Lubricant 1.

The heat transfer composition of the invention can comprise Refrigerant 19, Stabilizer 1 and Lubricant 1.

The heat transfer composition of the invention can comprise Refrigerant 20, Stabilizer 1, and Lubricant 1.

The heat transfer composition of the invention can comprise Refrigerant 21, Stabilizer 1, and Lubricant 1.

The heat transfer composition of the invention can comprise Refrigerant 22, Stabilizer 1, and Lubricant 1.

The heat transfer composition of the invention can comprise Refrigerant 1, POE lubricant, and stabilizer selected from Stabilizer 1, Stabilizer 2, Stabilizer 3, Stabilizer 7, and Stabilizer 14.

The heat transfer composition of the invention can comprise Refrigerant 1, Lubricant 1, and stabilizer selected from Stabilizer 1, Stabilizer 2, Stabilizer 3, Stabilizer 7, and Stabilizer 14.

The heat transfer composition of the invention can comprise Refrigerant 1, Lubricant 2, and stabilizer selected from Stabilizer 1, Stabilizer 2, Stabilizer 3, Stabilizer 7, and Stabilizer 14.

The heat transfer composition of the invention can comprise Refrigerant 6, POE lubricant, and stabilizer selected from Stabilizer 1, Stabilizer 2, Stabilizer 3, Stabilizer 7, and Stabilizer 14.

The heat transfer composition of the invention can comprise Refrigerant 6, Lubricant 1, and stabilizer selected from Stabilizer 1, Stabilizer 2, Stabilizer 3, Stabilizer 7, and Stabilizer 14.

The heat transfer composition of the invention can comprise Refrigerant 6, Lubricant 2, and stabilizer selected from Stabilizer 1, Stabilizer 2, Stabilizer 3, Stabilizer 7, and Stabilizer 14.

The heat transfer composition of the invention can comprise Refrigerant 9, POE lubricant, and stabilizer selected from Stabilizer 1, Stabilizer 2, Stabilizer 3, Stabilizer 7, and Stabilizer 14.

The heat transfer composition of the invention can comprise Refrigerant 9, Lubricant 1, and stabilizer selected from Stabilizer 1, Stabilizer 2, Stabilizer 3, Stabilizer 7, and Stabilizer 14.

The heat transfer composition of the invention can comprise Refrigerant 9, Lubricant 2, and stabilizer selected from Stabilizer 1, Stabilizer 2, Stabilizer 3, Stabilizer 7, and Stabilizer 14.

The heat transfer composition of the invention can comprise Refrigerant 16, POE lubricant, and stabilizer selected from Stabilizer 1, Stabilizer 2, Stabilizer 3, Stabilizer 7, and Stabilizer 14.

The heat transfer composition of the invention can comprise Refrigerant 16, Lubricant 1, and stabilizer selected from Stabilizer 1, Stabilizer 2, Stabilizer 3, Stabilizer 7, and Stabilizer 14.

The heat transfer composition of the invention can comprise Refrigerant 16, Lubricant 2, and stabilizer selected from Stabilizer 1, Stabilizer 2, Stabilizer 3, Stabilizer 7, and Stabilizer 14.

The heat transfer composition of the invention can comprise Refrigerant 19, POE lubricant, and stabilizer selected from Stabilizer 1, Stabilizer 2, Stabilizer 3, Stabilizer 7, and Stabilizer 14.

The heat transfer composition of the invention can comprise Refrigerant 19, Lubricant 1, and stabilizer selected from Stabilizer 1, Stabilizer 2, Stabilizer 3, Stabilizer 7, and Stabilizer 14.

The heat transfer composition of the invention can comprise Refrigerant 19, Lubricant 2, and stabilizer selected from Stabilizer 1, Stabilizer 2, Stabilizer 3, Stabilizer 7, and Stabilizer 14.

Other additives not mentioned herein can also be included by those skilled in the art in view of the teaching contained herein without departing from the novel and basic features of the present invention.

Combinations of surfactants and solubilizing agents may also be added to the present compositions to aid oil solubility as disclosed in U.S. Pat. No. 6,516,837, the disclosure of which is incorporated by reference in its entirety.

Methods, Uses and Systems

The refrigerants and heat transfer compositions as disclosed herein are provided for use in air conditioning applications, including: mobile air conditioning (including air conditioning in buses and trains); stationary air conditioning, including residential air conditioning (including particularly residential air conditioning and in particular ducted split or a ductless split air conditioning system); industrial air conditioning (including chiller systems); commercial air conditioning systems (including particularly chiller systems, packaged rooftop units and a variable refrigerant flow (VRF) systems).

The refrigerants and heat transfer compositions as disclosed herein are provided for use in heat pumps, including: mobile heat pumps (including electrical vehicle heat pumps); residential heat pumps (including air residential air to water heat pump/hydronic systems); and commercial air source, water source or ground source heat pump systems.

The refrigerants and heat transfer compositions as disclosed herein are provided for use in chillers, including particularly positive displacement chillers, air cooled or water cooled direct expansion chillers (which can be either modular or conventionally singularly packaged), The refrigerants and heat transfer compositions as disclosed herein are provided for use in heat transfer applications, including low temperature refrigeration systems, including low temperature commercial refrigeration systems (including low temperature super market refrigeration systems) and low temperature transportation systems).

The refrigerants and heat transfer compositions as disclosed herein are provided for use in medium temperature refrigeration systems, including medium temperature commercial refrigeration systems (including medium temperature super market refrigeration systems and medium temperature transportation systems).

The compositions of the invention may be employed in systems which are suitable for use with R-404 refrigerant, such as new and existing heat transfer systems.

The compositions of the invention may be employed in systems which are suitable for use with R-22, such as new and existing heat transfer systems.

Any reference to the heat transfer composition of the invention refers to each and any of the heat transfer compositions as described herein. Thus, for the foregoing or following discussion of the uses or applications of the composition of the invention, the heat transfer composition may comprise or consist essentially of, or consist of any of the refrigerants described herein in combination with the stabilizers and lubricants discussed herein, including: (i) each of Refrigerants 1-22; (ii) any combination of each of Refrigerants 1-22 and each of Stabilizers 1-19; (iii) any combination of each of Refrigerants 1-22 and any lubricant, including POE lubricants and Lubricants 1-2; and (iv) and any combination of each of Refrigerants 1-22 and each of Stabilizers 1-19 and any lubricant, including POE lubricant and Lubricants 1-2.

For heat transfer systems of the present invention that include a compressor and lubricant for the compressor in the system, the system can comprises a loading of refrigerant and lubricant such that the lubricant loading in the system is from about 5% to 60% by weight, or from about 10% to about 60% by weight, or from about 20% to about 50% by weight, or from about 20% to about 40% by weight, or from about 20% to about 30% by weight, or from about 30% to about 50% by weight, or from about 30% to about 40% by weight. As used herein, the term "lubricant loading" refers to the total weight of lubricant contained in the system as a percentage of total of lubricant and refrigerant contained in the system. Such systems may also include a lubricant loading of from about 5% to about 10% by weight, or about 8% by weight of the heat transfer composition.

The present invention provides heat transfer systems that include a refrigerant of the present invention, including each of Refrigerants 1-22, lubricant of the invention and alkylated naphthalene present in an amount of from 0.1% to about 20%, or from about 5% to about a 15%, or from about 8% to about 12%, where amounts are in percent by weight based on the amount of alkylated naphthalene plus lubricant in the system.

The present invention provides heat transfer systems that include a refrigerant of the present invention, including each of Refrigerants 1-22, Lubricant 1 and alkylated naphthalene in an amount of from 0.1% to about 20%, or from about 5% to about a 15%, or from about 8% to about 12%, where amounts are in percent by weight based on the amount of alkylated naphthalene plus lubricant in the system.

The present invention provides heat transfer systems that include a refrigerant of the present invention, including each of Refrigerants 1-22, Lubricant 2 and alkylated naphthalene in an amount of from 0.1% to about 20%, or from about 5% to about a 15%, or from about 8% to about 12%, where amounts are in percent by weight based on the amount of alkylated naphthalene plus lubricant in the system.

Exemplary Heat Transfer Systems

As described in detail below, the preferred systems of the present invention comprise a compressor, a condenser, an expansion device and an evaporator, all connected in fluid communication using piping, valving and control systems such that the refrigerant and associated components of the heat transfer composition can flow through the system in known fashion to complete the refrigeration cycle. An exemplary schematic of such a basic system is illustrated in FIG. 1. In particular, the system schematically illustrated in FIG. 1 shows a compressor 10, which provides compressed refrigerant vapor to condenser 20. The compressed refrigerant vapor is condensed to produce a liquid refrigerant which is then directed to an expansion device 40 that produces refrigerant at reduced temperature pressure, which in turn is then provided to evaporator 50. In evaporator 50 the liquid refrigerant absorbs heat from the body or fluid being cooled, thus producing a refrigerant vapor which is then provided to the suction line of the compressor.

Figure 2:
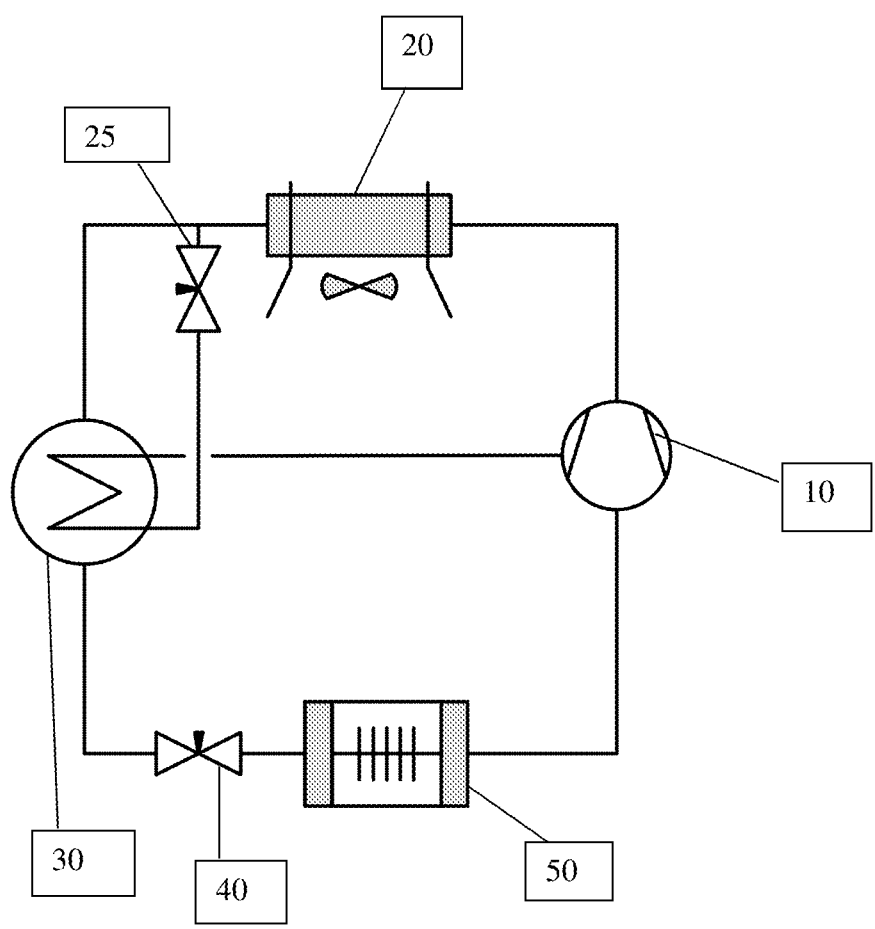
FIG. 2 is a schematic representation of an exemplary heat transfer system useful in low and medium temperature refrigeration and which includes a vapor injector.

The refrigeration system illustrated in FIG. 2 is the same as described above in connection with FIG. 1 except that it includes a vapor injection system including heat exchanger 30 and bypass expansion valve 25. The bypass expansion device 25 diverts a portion of the refrigerant flow at the condenser outlet through the device and thereby provides liquid refrigerant to heat exchanger 30 at a reduced pressure, and hence at a lower temperature, to heat exchanger 30. This relatively cool liquid refrigerant is then exchanges heat with the remaining, relatively high temperature liquid from the condenser. This operation produces a subcooled liquid to the main expansion device 40 and evaporator 50 and returns a relatively cool refrigerant vapor to the compressor 10. In this way the injection of the cooled refrigerant vapor into the suction side of the compressor serves to maintain compressor discharge temperatures in acceptable limits, which can be especially advantageous in low temperature systems that utilize high compression ratios.

Figure 3:
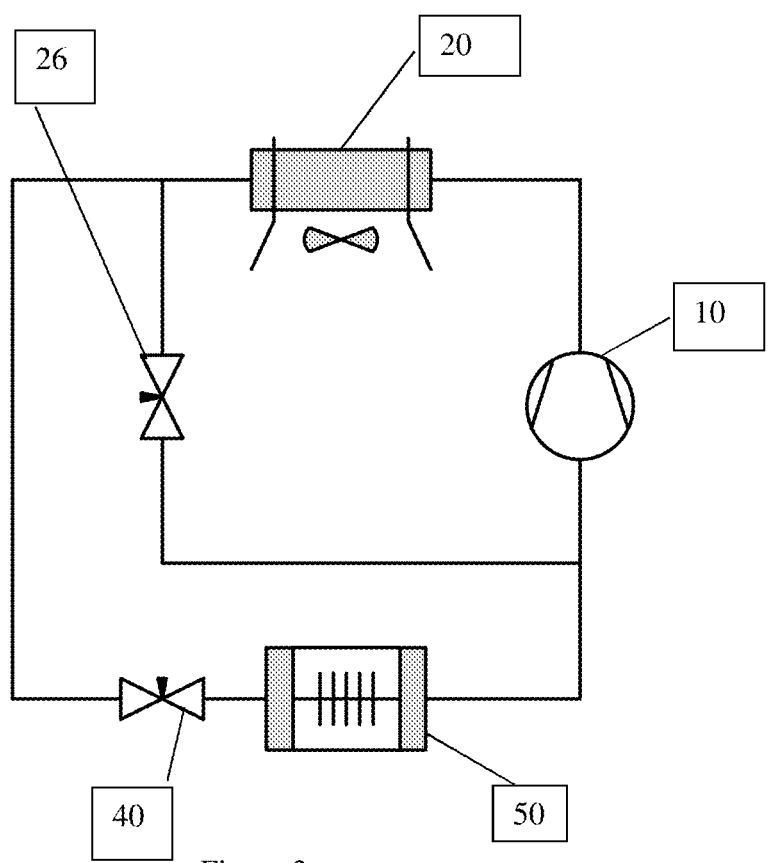
FIG. 3 is a schematic representation of an exemplary heat transfer system useful in low and medium temperature refrigeration and which includes a liquid injector.

The refrigeration system illustrated in FIG. 3 is the same as described above in connection with FIG. 1 except that it includes a liquid injection system including bypass valve 26. The bypass valve 26 diverts a portion of the liquid refrigerant exiting the condenser to the compressor, preferably to a liquid injection port in the compressor 10. In this way the injection of liquid refrigerant into the suction side of the compressor serves to maintain compressor discharge temperatures in acceptable limits, which can be especially advantageous in low temperature systems that utilize high compression ratios.

Figure 4:
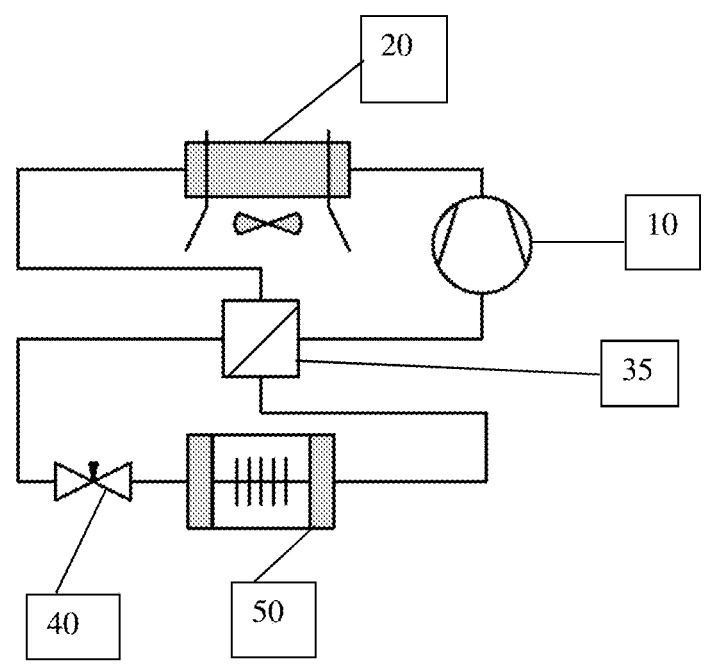
FIG. 4 is a schematic representation of an exemplary heat transfer system useful in low and medium temperature refrigeration and which includes a suction line/liquid line heat exchanger.

The refrigeration system illustrated in FIG. 4 is the same as described above in connection with FIG. 1 except that it includes a liquid line/suction line heat exchanger 35. The valve 25 diverts a portion of the of the refrigerant flow at the condenser outlet to the liquid line/suction line heat exchanger, where heat is transferred from the liquid refrigerant to the refrigerant vapor leaving evaporator 50.

Figure 5:
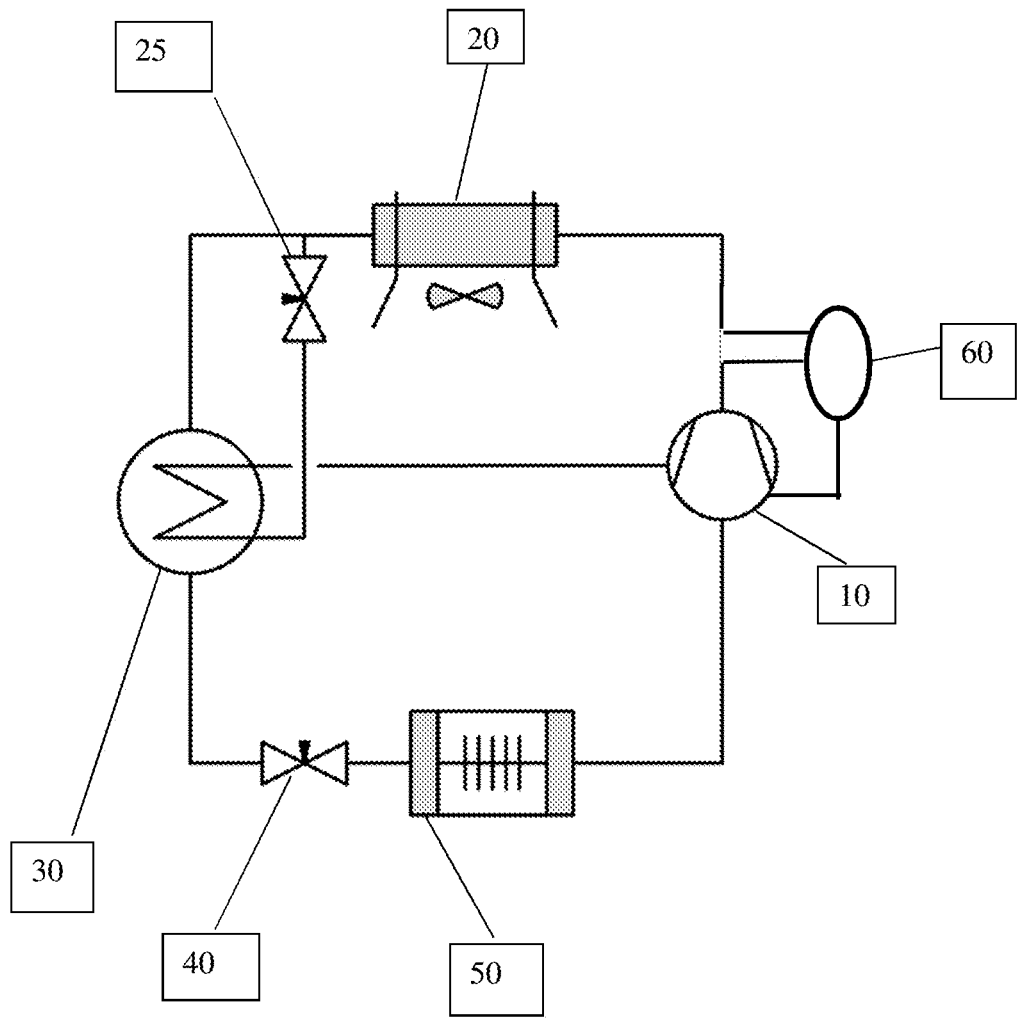
FIG. 5 is a schematic representation of an exemplary heat transfer system useful in low and medium temperature refrigeration and which includes a vapor injector and an oil seperator.

The refrigeration system illustrated in FIG. 5 is the same as described above in connection with FIG. 1 except that it includes an oil separator 60 connected to the outlet of the compressor 10. As is known to those skilled in the art, some amount of compressor lubricant will typically be carried over into the compressor discharge refrigerant vapor, and the oil separator is included to provide means to disengage the lubricant liquid from the refrigerant vapor, and a result refrigerant vapor which has a reduced lubricant oil content, proceeds to the condenser inlet and liquid lubricant is then returned to the lubricant reservoir for use in lubricating the compressor, such as a lubricant receiver. In preferred embodiments, the oil separator includes the sequestration materials described herein, preferably in the form of a filter or solid core.

It will be appreciated by those skilled in the art that the different equipment/configuration options shown separately in each of FIGS. 2-5 can be combined and used together as deemed advantageous for any particular application.

Systems with Sequestration Materials

The heat transfer system according to the present invention can comprise a compressor, an evaporator, a condenser and an expansion device, in communication with each other, a refrigerant of the present invention, including any one of Refrigerants 1-22, a lubricant, including POE Lubricant and Lubricants 1-2, and a sequestration material in the system, wherein said sequestration material preferably comprises:

i. copper or a copper alloy, or
ii. activated alumina, or
iii. a zeolite molecular sieve comprising copper, silver, lead or a combination thereof, or
iv. an anion exchange resin, or
v. a moisture-removing material, preferably a moisture-removing molecular sieve, or
vi. a combination of two or more of the above.

Preferred materials from each of the categories (i)-(v) above is described below.

a. Copper/Copper Alloy Sequestration Material

The sequestration material may be copper, or a copper alloy, preferably copper. The copper alloy may comprise, in addition to copper, one or more further metals, such as tin, aluminum, silicon, nickel or a combination thereof. Alternatively, or in addition, the copper alloy may comprise one or more non-metal elements, e.g. carbon, nitrogen, silicon, oxygen or a combination thereof.

It will be appreciated that the copper alloy may comprise varying amounts of copper. For example, the copper alloy may comprise at least about 5 wt %, at least about 15 wt %, at least about 30 wt %, at least about 50 wt %, at least about 70 wt % or at least about 90 wt % of copper, based on the total weight of the copper alloy. It will also be appreciated that the copper alloy may comprise from about 5 wt % to about 95 wt %, from about 10 wt % to about 90 wt %, from about 15 wt % to about 85 wt %, from about 20 wt % to about 80 wt %, from about 30 wt % to about 70 wt %, or from about 40 wt % to about 60 wt % of copper, based on the total weight of the copper alloy.

Alternatively, copper may be used as a sequestration material. The copper metal may contain impurity levels of other elements or compounds. For example, the copper metal may contain at least about 99 wt %, more preferably at least about 99.5 wt %, more preferably at least about 99.9 wt % of elemental copper.

The copper or copper alloy may be in any form which allows the refrigerant to contact the surface of the copper or copper alloy. Preferably, the form of the copper or copper alloy is selected to maximize the surface area of the copper or copper alloy (i.e. to maximize the area which is in contact with the refrigerant).

For example, the metal may be in the form of a mesh, wool, spheres, cones, cylinders etc. The term "sphere" refers to a three dimensional shape where the difference between the largest diameter and the smallest diameter is about 10% or less of the largest diameter.

The copper or copper alloy may have a BET surface area of at least about 10 m$^2$/g, at least about 20 m$^2$/g, at least about 30 m$^2$/g, at least about 40 m$^2$/g or at least about 50 m$^2$/g. The BET-surface area may be measured in accordance with ASTM D6556-10.

When the sequestration material comprises copper or a copper alloy, the BET surface area of the copper or copper alloy may be from about 0.01 to about 1.5 m$^2$ per kg of refrigerant, preferably from about 0.02 to about 0.5 m$^2$ per kg of refrigerant.

For example, the copper or copper alloy may have a surface area of about 0.08 m$^2$ per kg of refrigerant.

b. Zeolite Molecular Sieve Sequestration Material

The sequestration material may comprise a zeolite molecular sieve. The zeolite molecular sieve can comprise copper, silver, lead or a combination thereof, preferably at least silver.

In preferred embodiments, the zeolite molecular sieve contains an amount of metal, and preferably in certain embodiments silver, of from about 1% to about 30% by weight, or preferably from about 5% to about 20% by weight, based on the total weight of the zeolite.

The metal (i.e. copper, silver and/or lead) may be present in a single oxidation state, or in a variety of oxidation states (e.g. a copper zeolite may comprise both Cu(I) and Cu(II)).

The zeolite molecular sieve may comprise metals other than silver, lead, and/or copper.

The zeolite may have openings which have a size across their largest dimension of from about 5 to 40 Å (Angstroms). For example, the zeolite may have openings which have a size across their largest dimension of about 35 Å (Angstroms) or less. Preferably, the zeolite has openings which have a size across their largest dimension of from about 15 to about 35 Å (Angstroms). Zeolite such as IONSIV D7310-C has activated sites that applicants have found to effectively remove specific decomposition products in accordance with the present invention.

When the sequestration material comprises a zeolite molecular sieve comprising copper, silver, lead or a combination thereof, the molecular sieve (e.g. zeolite) may be present in an amount of from about 1 wt % to about 30 wt %, such as from about 2 wt % to about 25 wt % relative to the total amount of molecular sieve (e.g., zeolite), refrigerant and lubricant (if present) in the heat transfer system.

In preferred embodiments, the sequestration material comprises a zeolite molecular sieve comprising silver, and in such embodiments the molecular sieve may be present in an amount of at least 5% parts by weight (pbw), preferably from about 5 pbw to about 30 pbw, or from about 5 pbw to about 20 pbw, per 100 parts by weight of lubricant (pphl) based on the total amount of molecular sieve (e.g., zeolite) and lubricant in the heat transfer system being treated. The preferred embodiments as described in this paragraph have been found to have exceptional ability to remove fluoride from heat transfer compositions as described herein. Furthermore in such preferred embodiments as described in this paragraph, the amount of the silver present in the molecular sieve is from about 1% to about 30% by weight, or preferably from about 5% to about 20% by weight, based on the total weight of the zeolite.

In preferred embodiments, the sequestration material comprises a zeolite molecular sieve comprising silver, and in such embodiments the molecular sieve (e.g., zeolite) may be present in an amount of at least about 10 pphl, preferably from about 10 pphl to about 30 pphl, or from about 10 pphl to about 20 pphl by weight relative to the total amount of molecular sieve (e.g., zeolite), and lubricant in the heat transfer system being treated. The preferred embodiments as described in this paragraph have been found to have exceptional ability to remove iodide from heat transfer compositions as described herein. Furthermore, in such preferred embodiments as described in this paragraph, the amount of the silver present in the molecular sieve is from about 1% to about 30% by weight, or preferably from about 5% to about 20% by weight, based on the total weight of the zeolite.

In preferred embodiments, the sequestration material comprises a zeolite molecular sieve comprises silver, and in such embodiments the molecular sieve may be present in an amount of at least pphl, preferably from about 15 pphl to about 30 pphl, or from about 15 pphl to about 20 pphl by weight relative to the total amount of molecular sieve, and lubricant in the heat transfer system being treated. The preferred embodiments as described in this paragraph have been found to have exceptional ability to reduce TAN levels in the heat transfer compositions as described herein. Furthermore, in such preferred embodiments as described in this paragraph, the amount of the silver present in the molecular sieve is from about 1% to about 30% by weight, or preferably from about 5% to about 20% by weight, based on the total weight of the zeolite.

Preferably, the zeolite molecular sieve is present in an amount of at least about 15 pphl, or at least about 18 pphl relative to the total amount of molecular sieve and lubricant in the system. Therefore, the molecular sieve may be present in an amount of from about 15 pphl to about 30 pphl, or from about 18 pphl to about 25 pphl relative to the total amount of molecular sieve and lubricant present in the system.

It will be appreciated that the zeolite may be present in an amount of about 5 pphl or about 21 pphl relative to the total amount of molecular sieve, and lubricant in the system.

The amount of zeolite molecular sieve described herein refers to the dry weight of the molecular sieve. As used herein, the term "dry weight" of the sequestration materials means that the material has 50 ppm or less of moisture.

c. Anion Exchange Resins

The sequestration material may comprise an anion exchange resin.

Preferably, the anion exchange resin is a strongly basic anion exchange resin. The strongly basic anion exchange resin may be a type 1 resin or a type 2 resin. Preferably, the anion exchange resin is a type 1 strongly basic anion exchange resin.

The anion exchange resin generally comprises a positively charged matrix and exchangeable anions. The exchangeable anions may be chloride anions ($Cl^-$) and/or hydroxide anions ($OH^-$).

The anion exchange resin may be provided in any form. For example, the anion exchange resin may be provided as beads. The beads may have a size across their largest dimension of from about 0.3 mm to about 1.2 mm, when dry.

When the sequestration material comprises an anion exchange resin, the anion exchange resin may be present in an amount of from about 1 pphl to about 60 pphl, or from about 5 pphl to about 60 pphl, or from about 20 pphl to about 50 pphl, or from about 20 pphl to about 30 pphl, or from about 1 pphl to about 25 pphl, such as from about 2 pphl to about 20 pphl based on the total amount of anion exchange resin and lubricant in the system.

Preferably, the anionic exchange resin is present in an amount of at least about 10 pphl, or at least about 15 pphl relative to the total amount of anionic exchange resin and lubricant in the system. Therefore, the anion exchange resin may be present in an amount of from about 10 pphl to about 25 pphl, or from about 15 pphl to about 20 pphl relative to the total amount of anion exchange resin and lubricant in the system.

It will be appreciated that the anion exchange resin may be present in an amount of about 4 pphl or about 16 pphl based on the total amount of anion exchange resin and lubricant present in the system.

Applicants have found an unexpectedly advantageous ability of industrial grade weakly base anion exchange adsorbent resins, including in particular the material sold under the trade designation Amberlyst A21 (Free Base) to act as a sequestration material. As used herein, the term weak base anion resin refers to resins in the free base form, which are preferably e functionalized with a tertiary amine (uncharged). Tertiary amine contains a free lone pair of electrons on the nitrogen, which results in it being readily protonated in presence of an acid. In preferred embodiments, the ion exchange resin as used according to the present invention is protonated by the acid, then attracts and binds the anionic counter ion for full acid removal, without contributing any additional species back into solution.

Amberlyst A21 is a preferred material in that applicants have found it to be advantageous because it provides a macroporous structure makes it physically very stable and resistant to breakage, and applicants have found that it can withstand high flow rates of the refrigeration system over relatively long periods of time, including preferably over the lifetime of the system.

The amount of anion exchange resin described herein refers to the dry weight of the anion exchange resin. As used herein, the term "dry weight" of the sequestration materials means that the material has 50 ppm or less of moisture.

As used herein, pphl of a particular sequestration material means the parts per hundred of the particular sequestration material by weight based on the total weight of that particular sequestration material and lubricant in the system.

d. Moisture Removing Material

A preferred sequestration material is a moisture removing material. In preferred embodiments the moisture removing material comprises, consists essentially of or consists of a moisture-removing molecular sieve. Preferred moisture-removing molecular sieves include those commonly known as sodium aluminosilicate molecular sieves, and such materials are preferably crystalline metal aluminosilicates having a three dimensional interconnecting network of silica and alumina tetrahedra. Applicants have found that such materials are effective in the systems of the present invention to remove moisture and are most preferably classified according to pore size as types 3A, 4A, 5A and 13X.

The amount that the moisture removing material, and particularly the moisture-removing molecular sieve, and even more preferably sodium aluminosilicate molecular sieve, is preferably from about 15 pphl to about 60 pphl by weight, and even more preferably from about 30 pphl to 45 pphl by weight.

e. Activated Alumina

Examples of activated alumina that applicants have found to be effective according to the present invention and commercially available include those sodium activated aluminas sold under the trade designation F200 by BASF and by Honeywell/UOP under the trade designation CLR-204. Applicants have found that activated alumina in general and the above-mentioned sodium activated aluminas in particular are especially effective for sequestering the types of acidic detrimental materials that are produced in connection with the refrigerant compositions and heat transfer methods and systems of the present invention.

When the sequestration material comprises activated alumina, the activated alumina may be present in an amount of from about 1 pphl to about 60 pphl, or from about 5 pphl to about 60 pphl by weight.

f. Combinations of Sequestration Materials

When a combination of sequestration materials is present, the materials may be provided in any ratio relative to each other.

For example, when the sequestration material comprises an anion exchange resin and a molecular sieve (e.g. a zeolite), the weight ratio (when dry) of anion exchange resin to molecular sieve (e.g. zeolite) is preferably in the range of from about 10:90 to about 90:10, from about 20:80 to about 80:20, from about 25:75 to about 75:25, from about 30:70 to about 70:30, or from about 60:40 to about 40:60. Exemplary weight ratios of anion exchange resin to metal zeolite include about 25:75, about 50:50 and about 75:25.

For the purpose of convenience, a heat transfer system that includes at least one of sequestration materials (i)-(v) is referred to herein for convenience as Sequestration Material 1.

For the purpose of convenience, a heat transfer system that includes sequestration materials from at least two of the (i)-(v) categories, such a material is referred to herein for convenience as Sequestration Material 2.

For the purpose of convenience, a heat transfer system that includes sequestration materials from at least two of the (ii)-(v) categories, such a material is referred to herein for convenience as Sequestration Material 3.

For the purpose of convenience, a heat transfer system that includes sequestration materials from at least three of the (ii)-(v) categories, such a material is referred to herein for convenience as Sequestration Material 4.

For the purpose of convenience, when a heat transfer system includes sequestration material from each of categories (ii)-(v), such a material is referred to herein for convenience as Sequestration Material 5.

For the purpose of convenience, when a heat transfer system includes a sequestration material that includes a material from each of categories (ii)-(v), and wherein the material from category (iii) comprises silver, such a material is referred to herein for convenience as Sequestration Material 6.

The heat transfer systems according to the present invention can comprise a compressor, an evaporator, a condenser and an expansion device, in fluid communication with each other, a refrigerant of the invention, including each of Refrigerants 1-22, a lubricant, and a Sequestration Material 1.

The heat transfer systems according to the present invention can comprise a compressor, an evaporator, a condenser and an expansion device, in fluid communication with each other, a refrigerant of the present invention, including each of Refrigerants 1-22, a lubricant, and a Sequestration Material 2.

The heat transfer systems according to the present invention can comprise a compressor, an evaporator, a condenser and an expansion device, in fluid communication with each other, a refrigerant of the present invention, including each of Refrigerants 1-22, a lubricant, and a Sequestration Material 3.

The heat transfer systems according to the present invention can comprise a compressor, an evaporator, a condenser and an expansion device, in fluid communication with each other, a refrigerant of the present invention, including each of Refrigerants 1-22, a lubricant, and a Sequestration Material 4.

The heat transfer systems according to the present invention can comprise a compressor, an evaporator, a condenser and an expansion device, in fluid communication with each other, a refrigerant of the present invention, including each of Refrigerants 1-22, a lubricant, and a Sequestration Material 5.

The heat transfer systems according to the present invention can comprise a compressor, an evaporator, a condenser and an expansion device, in fluid communication with each other, a refrigerant of the present invention, including each of Refrigerants 1-22, a lubricant, and a Sequestration Material 6.

The heat transfer systems according to the present invention can comprise a compressor, an evaporator, a condenser and an expansion device, in fluid communication with each other, a refrigerant of the present invention, including each of Refrigerants 1-22, a lubricant, including each of POE lubricants, Lubricant 1 and Lubricant 2, a sequestration material, including each of Sequestration Materials 1-6, and a stabilizer, including each of Stabilizers 1-13.

The heat transfer systems according to the present invention can comprise a compressor, an evaporator, a condenser and an expansion device, in fluid communication with each other, Refrigerant 1, POE lubricant, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 1, Lubricant 1, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 1, Lubricant 2, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 6, POE lubricant, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 6, Lubricant 1, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 6, Lubricant 2, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 9, POE lubricant, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 9, Lubricant 1, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 9, Lubricant 2, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 16, POE lubricant, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 16, Lubricant 1, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 16, Lubricant 2, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 19, POE lubricant, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 19, Lubricant 1, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 19, Lubricant 2, Stabilizer 1 and a sequestration material, including each of Sequestration Materials 1-6.

The heat transfer systems according to the present invention can comprise a compressor, an evaporator, a condenser and an expansion device, in fluid communication with each other, Refrigerant 1, POE lubricant, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 1, Lubricant 1, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 1, Lubricant 2, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 6, POE lubricant, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 6, Lubricant 1, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 6, Lubricant 2, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 9 POE lubricant, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 9, Lubricant 1, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 9, Lubricant 2, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 16, POE lubricant, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 16, Lubricant 1, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 16, Lubricant 2, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 19 POE lubricant, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 19, Lubricant 1, Stabilizer 3 and a sequestration material, including each of Sequestration Materials 1-6.

The heat transfer systems according to the present invention can comprise a compressor, an evaporator, a condenser and an expansion device, in fluid communication with each other, Refrigerant 19, Lubricant 2, Stabilizer 3 and a sequestration material, including each of Sequestration Materials 1-6.

The heat transfer systems of the present invention include systems which include an oil separator downstream of the compressor, and such systems preferably include one or more sequestration materials of the present invention, including each of Sequestration Materials 1-6, wherein said sequestration materials are located inside the oil separator, or in some cases outside but downstream of the oil separator, such that the liquid lubricant is in contact with the sequestration material(s).

The present invention also includes one or more of the sequestration materials, including Sequestration Materials 1-6, being located in the refrigerant liquid that exits the condenser.

The present invention also includes methods for transferring heat of the type comprising evaporating refrigerant liquid to produce a refrigerant vapor, compressing in a compressor at least a portion of the refrigerant vapor and condensing refrigerant vapor, said method comprising:

(a) providing a refrigerant according to the present invention, including each of Refrigerants 1-22;
(b) optionally but preferably providing lubricant for said compressor; and
(c) exposing at least a portion of said refrigerant and/or at least a portion of said lubricant to Sequestration Material 1.

The present invention also includes methods for transferring heat of the type comprising evaporating refrigerant liquid to produce a refrigerant vapor, compressing in a compressor at least a portion of the refrigerant vapor and condensing refrigerant vapor, said method comprising:
(a) providing a refrigerant according to the present invention, including each of Refrigerants 1-22;
(b) optionally but preferably providing lubricant for said compressor; and
(c) exposing at least a portion of said refrigerant and/or at least a portion of said lubricant to Sequestration Material 3.

The present invention also includes methods for transferring heat of the type comprising evaporating refrigerant liquid to produce a refrigerant vapor, compressing in a compressor at least a portion of the refrigerant vapor and condensing refrigerant vapor, said method comprising:
(a) providing a refrigerant according to the present invention, including each of Refrigerants 1-22;
(b) optionally but preferably providing lubricant for said compressor; and
(c) exposing at least a portion of said refrigerant and/or at least a portion of said lubricant to Sequestration Material 5.

The present invention also includes heat transfer methods according to any of the preceding four paragraphs wherein said exposing temperature is preferably above about 10° C.

In other aspects of the present invention, at least two materials are included together in a filter element. As the term is used herein, "filter element" refers to any device, system, article or container in which each of the sequestration materials are located in close physical proximity, and preferably at essentially the same location within the system.

In other aspects of the present invention, Sequestration Material 2 is used in the present heat transfer systems and the present heat transfer methods is configured such that each of the at least two materials are included together in a solid core. As the term is used herein, "solid core" refers to relatively porous solid which contains and/or has embedded therein two or more of sequestration materials such that such materials are accessible to fluids passing through said any solid core. In preferred embodiments the one or more sequestration materials are substantially homogeneously distributed throughout the solid core.

In preferred embodiments, the solid core of the present invention is included in or comprises a filter element.

In preferred embodiments, Sequestration Material 2 is configured such that each of the at least two materials are included in a solid core.

In preferred embodiments, Sequestration Material 3 is configured such that each of the at least two materials are included together in a filter element.

In preferred embodiments, Sequestration Material 3 is configured such that all of materials are included in a solid core.

In preferred embodiments, Sequestration Material 5 is configured such that each of the at least two materials are included together in a filter element.

In preferred embodiments, Sequestration Material 5 is configured such that all of materials are included in a solid core.

In preferred embodiments, Sequestration Material 6 is configured such that each of the at least two materials are included together in a filter element.

In preferred embodiments, Sequestration Material 6 is configured such that all of materials are included in a solid core.

With respect to sequestration materials, the systems of the present invention preferably include a sequestration material, including each of Sequestration Materials 1-6, in contact with at least a portion of a refrigerant according to the present invention, including each of Refrigerants 1-22, and/or with at least a portion of the lubricant, including each of POE lubricant and Lubricants 1-2, wherein the temperature of said sequestration material and/or the temperature of said refrigerant and/or the temperature of the lubricant when in said contact are at a temperature that is preferably at least about 10° C. Any and all of the refrigerants and any and all of the sequestration materials as described herein can be used in the systems of the present invention.

As used in this application, the term "in contact with at least a portion" is intended in its broad sense to include each of said sequestration materials and any combination of sequestration materials as described herein being in contact with the same or separate portions of the refrigerant and/or the lubricant in the system and is intended to include but not necessarily limited to embodiments in which each type or specific sequestration material is: (i) located physically together with each other type or specific material, if present; (ii) is located physically separate from each other type or specific material, if present, and (iii) combinations in which two or more materials are physically together and at least one sequestration material is physically separate from at least one other sequestration material.

Residential Air Conditioning Systems

The heat transfer systems according to the present invention include residential air conditioning systems that comprise a compressor, an evaporator, a condenser and an expansion device, in fluid communication with each other, a refrigerant of the invention, including each of Refrigerants 1-22 and a lubricant, including each of POE lubricant and Lubricant 1-2.

The heat transfer systems according to the present invention include residential air conditioning systems that comprise a compressor, an evaporator, a condenser and an expansion device, in fluid communication with each other, a refrigerant of the invention, including each of Refrigerants 1-22, a lubricant, including each of POE lubricant and Lubricant 1-2 and a sequestration material, including each of Sequestration Materials 1-6.

The heat transfer systems according to the present invention include residential air conditioning systems that comprise a compressor, an evaporator, a condenser and an expansion device, in fluid communication with each other, a refrigerant of the invention, including each of Refrigerants 1-22, a lubricant, including each of POE lubricant and Lubricant 1-2, and a stabilizer, including each of Stabilizers 1-17.

The heat transfer systems according to the present invention include residential air conditioning systems that comprise a compressor, an evaporator, a condenser and an expansion device, in fluid communication with each other, a refrigerant of the invention, including each of Refrigerants 1-22, a lubricant, including each of POE lubricant and Lubricant 1-2, and a stabilizer, including each of Stabilizers 1-17 and a sequestration material, including each of Sequestration Materials 1-6.

The heat transfer systems according to the present invention include residential air conditioning systems that comprise a compressor, an evaporator, a condenser and an expansion device, in fluid communication with each other, Refrigerant 1, POE lubricant, and stabilizer, including each of Stabilizers 1-17.

The heat transfer systems according to the present invention include residential air conditioning systems that comprise a compressor, an evaporator, a condenser and an expansion device, in fluid communication with each other, Refrigerant 1, POE lubricant, Stabilizer 1, and sequestration material selected from Sequestration Materials 1-6.

The heat transfer systems according to the present invention include residential air conditioning systems that comprise a compressor, an evaporator, a condenser and an expansion device, Refrigerant 1, a POE lubricant and Stabilizer 1.

The heat transfer systems according to the present invention include residential air conditioning refrigeration systems that comprise a compressor, an evaporator having an evaporator operating temperature of about −20° C. to about 20° C., a condenser and an expansion device, Refrigerant 1, a POE lubricant and Stabilizer 1.

The heat transfer systems according to the present invention include residential air conditioning refrigeration systems operating in the cooling mode that comprise a compressor, an evaporator having an evaporator operating temperature of about 0° C. to about 20° C., a condenser and an expansion device, Refrigerant 1, a POE lubricant and Stabilizer 1.

The heat transfer systems according to the present invention include residential air conditioning refrigeration systems operating in the cooling mode that comprise a compressor, an evaporator having an evaporator operating temperature of about 0° C. to about 10° C., a condenser and an expansion device, Refrigerant 1, a POE lubricant and Stabilizer 1.

The heat transfer systems according to the present invention include residential air conditioning refrigeration systems operating in the cooling mode that comprise a compressor, an evaporator having an evaporator operating temperature of about 7° C., a condenser and an expansion device, Refrigerant 1, a POE lubricant and Stabilizer 1.

The heat transfer systems according to the present invention include residential air conditioning refrigeration systems operating in the heating mode that comprise a compressor, an evaporator having an evaporator operating temperature of about −20° C. to about 3° C., a condenser and an expansion device, Refrigerant 1, a POE lubricant and Stabilizer 1.

The heat transfer systems according to the present invention include residential air conditioning refrigeration systems operating in the heating mode that comprise a compressor, an evaporator having an evaporator operating temperature of about 0.5° C., a condenser and an expansion device, Refrigerant 1, a POE lubricant and Stabilizer 1.

The heat transfer systems according to the present invention include residential air conditioning systems that comprise a compressor, an evaporator, a condenser and an expansion device, in fluid communication with each other, Refrigerant 6, POE lubricant, and stabilizer, including each of Stabilizers 1-17.

The heat transfer systems according to the present invention include residential air conditioning systems that comprise a compressor, an evaporator, a condenser and an expansion device, in fluid communication with each other, Refrigerant 6, POE lubricant, Stabilizer 1, and sequestration material selected from Sequestration Materials 1-6.

The heat transfer systems according to the present invention include residential air conditioning systems that comprise a compressor, an evaporator, a condenser and an expansion device, Refrigerant 6, a POE lubricant and Stabilizer 1.

The heat transfer systems according to the present invention include residential air conditioning refrigeration systems that comprise a compressor, an evaporator having an evaporator operating temperature of about −20° C. to about 20° C., a condenser and an expansion device, Refrigerant 6, a POE lubricant and Stabilizer 1.

The heat transfer systems according to the present invention include residential air conditioning refrigeration systems operating in the cooling mode that comprise a compressor, an evaporator having an evaporator operating temperature of about 0° C. to about 20° C., a condenser and an expansion device, Refrigerant 6, a POE lubricant and Stabilizer 1.

The heat transfer systems according to the present invention include residential air conditioning refrigeration systems operating in the cooling mode that comprise a compressor, an evaporator having an evaporator operating temperature of about 0° C. to about 10° C., a condenser and an expansion device, Refrigerant 6, a POE lubricant and Stabilizer 1.

The heat transfer systems according to the present invention include residential air conditioning refrigeration systems operating in the cooling mode that comprise a compressor, an evaporator having an evaporator operating temperature of about 7° C., a condenser and an expansion device, Refrigerant 6, a POE lubricant and Stabilizer 1.

The heat transfer systems according to the present invention include residential air conditioning refrigeration systems operating in the heating mode that comprise a compressor, an evaporator having an evaporator operating temperature of about −20° C. to about 3° C., a condenser and an expansion device, Refrigerant 6, a POE lubricant and Stabilizer 1.

The heat transfer systems according to the present invention include residential air conditioning refrigeration systems operating in the heating mode that comprise a compressor, an evaporator having an evaporator operating temperature of about −20° C. to about 3° C., a condenser and an expansion device, Refrigerant 6, a POE lubricant and Stabilizer 1.

The heat transfer systems according to the present invention include residential air conditioning systems that comprise a compressor, an evaporator, a condenser and an expansion device, in fluid communication with each other, Refrigerant 9, POE lubricant, and stabilizer, including each of Stabilizers 1-17.

The heat transfer systems according to the present invention include residential air conditioning systems that comprise a compressor, an evaporator, a condenser and an expansion device, in fluid communication with each other, Refrigerant 9 POE lubricant, Stabilizer 1, and sequestration material selected from Sequestration Materials 1-6.

The heat transfer systems according to the present invention include residential air conditioning systems that comprise a compressor, an evaporator, a condenser and an expansion device, Refrigerant 9, a POE lubricant and Stabilizer 1.

The heat transfer systems according to the present invention include residential air conditioning refrigeration systems that comprise a compressor, an evaporator having an evaporator operating temperature of about −20° C. to about 20° C., a condenser and an expansion device, Refrigerant 9, a POE lubricant and Stabilizer 1.

The heat transfer systems according to the present invention include residential air conditioning refrigeration systems operating in the cooling mode that comprise a compressor, an evaporator having an evaporator operating temperature of about 0° C. to about 20° C., a condenser and an expansion device, Refrigerant 9, a POE lubricant and Stabilizer 1.

The heat transfer systems according to the present invention include residential air conditioning refrigeration systems operating in the cooling mode that comprise a compressor, an evaporator having an evaporator operating temperature of about 0° C. to about 10° C., a condenser and an expansion device, Refrigerant 9, a POE lubricant and Stabilizer 1.

The heat transfer systems according to the present invention include residential air conditioning refrigeration systems operating in the cooling mode that comprise a compressor, an evaporator having an evaporator operating temperature of about 7° C., a condenser and an expansion device, Refrigerant 9, a POE lubricant and Stabilizer 1.

The heat transfer systems according to the present invention include residential air conditioning refrigeration systems operating in the heating mode that comprise a compressor, an evaporator having an evaporator operating temperature of about −20° C. to about 3° C., a condenser and an expansion device, Refrigerant 9, a POE lubricant and Stabilizer 1.

The heat transfer systems according to the present invention include residential air conditioning refrigeration systems operating in the heating mode that comprise a compressor, an evaporator having an evaporator operating temperature of about −20° C. to about 3° C., a condenser and an expansion device, Refrigerant 9, a POE lubricant and Stabilizer 1.

The heat transfer systems according to the present invention include residential air conditioning systems that comprise a compressor, an evaporator, a condenser and an expansion device, in fluid communication with each other, Refrigerant 16, POE lubricant, and stabilizer, including each of Stabilizers 1-17.

The heat transfer systems according to the present invention include residential air conditioning systems that comprise a compressor, an evaporator, a condenser and an expansion device, in fluid communication with each other, Refrigerant 16, POE lubricant, Stabilizer 1, and sequestration material selected from Sequestration Materials 1-6.

The heat transfer systems according to the present invention include residential air conditioning systems that comprise a compressor, an evaporator, a condenser and an expansion device, Refrigerant 16, a POE lubricant and Stabilizer 1.

The heat transfer systems according to the present invention include residential air conditioning refrigeration systems that comprise a compressor, an evaporator having an evaporator operating temperature of about −20° C. to about 20° C., a condenser and an expansion device, Refrigerant 16, a POE lubricant and Stabilizer 1.

The heat transfer systems according to the present invention include residential air conditioning refrigeration systems operating in the cooling mode that comprise a compressor, an evaporator having an evaporator operating temperature of about 0° C. to about 20° C., a condenser and an expansion device, Refrigerant 16, a POE lubricant and Stabilizer 1.

The heat transfer systems according to the present invention include residential air conditioning refrigeration systems operating in the cooling mode that comprise a compressor, an evaporator having an evaporator operating temperature of about 0° C. to about 10° C., a condenser and an expansion device, Refrigerant 16, a POE lubricant and Stabilizer 1.

The heat transfer systems according to the present invention include residential air conditioning refrigeration systems operating in the cooling mode that comprise a compressor, an evaporator having an evaporator operating temperature of about 7° C., a condenser and an expansion device, Refrigerant 16, a POE lubricant and Stabilizer 1.

The heat transfer systems according to the present invention include residential air conditioning refrigeration systems operating in the heating mode that comprise a compressor, an evaporator having an evaporator operating temperature of about −20° C. to about 3° C., a condenser and an expansion device, Refrigerant 16, a POE lubricant and Stabilizer 1.

The heat transfer systems according to the present invention include residential air conditioning refrigeration systems operating in the heating mode that comprise a compressor, an evaporator having an evaporator operating temperature of about −20° C. to about 3° C., a condenser and an expansion device, Refrigerant 16, a POE lubricant and Stabilizer 1.

The heat transfer systems according to the present invention include residential air conditioning systems that comprise a compressor, an evaporator, a condenser and an expansion device, in fluid communication with each other, Refrigerant 19, POE lubricant, and stabilizer, including each of Stabilizers 1-17.

The heat transfer systems according to the present invention include residential air conditioning systems that comprise a compressor, an evaporator, a condenser and an expansion device, in fluid communication with each other, Refrigerant 19 POE lubricant, Stabilizer 1, and sequestration material selected from Sequestration Materials 1-6.

The heat transfer systems according to the present invention include residential air conditioning systems that comprise a compressor, an evaporator, a condenser and an expansion device, Refrigerant 19, a POE lubricant and Stabilizer 1.

The heat transfer systems according to the present invention include residential air conditioning refrigeration systems that comprise a compressor, an evaporator having an evaporator operating temperature of about −20° C. to about 20° C., a condenser and an expansion device, Refrigerant 19, a POE lubricant and Stabilizer 1.

The heat transfer systems according to the present invention include residential air conditioning refrigeration systems operating in the cooling mode that comprise a compressor, an evaporator having an evaporator operating temperature of about 0° C. to about 20° C., a condenser and an expansion device, Refrigerant 19, a POE lubricant and Stabilizer 1.

The heat transfer systems according to the present invention include residential air conditioning refrigeration systems operating in the cooling mode that comprise a compressor, an evaporator having an evaporator operating temperature of about 0° C. to about 10° C., a condenser and an expansion device, Refrigerant 19, a POE lubricant and Stabilizer 1.

The heat transfer systems according to the present invention include residential air conditioning refrigeration systems operating in the cooling mode that comprise a compressor, an evaporator having an evaporator operating temperature of about 7° C., a condenser and an expansion device, Refrigerant 19, a POE lubricant and Stabilizer 1.

The heat transfer systems according to the present invention include residential air conditioning refrigeration systems operating in the heating mode that comprise a compressor, an evaporator having an evaporator operating temperature of about −20° C. to about 3° C., a condenser and an expansion device, Refrigerant 19, a POE lubricant and Stabilizer 1.

The heat transfer systems according to the present invention include residential air conditioning refrigeration systems operating in the heating mode that comprise a compressor, an evaporator having an evaporator operating temperature of about −20° C. to about 3° C., a condenser and an expansion device, Refrigerant 19, a POE lubricant and Stabilizer 1.

For each of the residential air conditioning systems described herein operating in the cooling mode, the condenser preferably operates with a condensing temperature in the range of from about 40° C. to about 70° C.

For each of the residential air conditioning systems described herein operating in the heating mode, the condenser preferably operates with a condensing temperature in the range of from about 35° C. to about 50° C.

For each of the residential air conditioning systems described herein operating in the cooling mode, the system preferably provides cool air (said air having a temperature of for example, about 10° C. to about 17° C., particularly about 12° C.) to buildings for example, in the summer.

For each of the residential air conditioning systems described herein operating in the heating mode, that is, as a heat pump, the system preferably provides warm air, with the supplied warm air having a temperature of for example, about 18° C. to about 24° C., particularly about 21° C., to buildings in the winter. It is usually the same system as the residential air-conditioning system that operates in the cooling mode; however, while operating in the heat pump mode the refrigerant flow is reversed and the indoor coil becomes a condenser and the outdoor coil becomes an evaporator.

Air Cooled Chiller Systems

The heat transfer systems according to the present invention include air cooled chiller systems that comprise a compressor, an evaporator, a condenser and an expansion device, in fluid communication with each other, a refrigerant of the invention, including each of Refrigerants 1-22 and a lubricant, including each of POE lubricant and Lubricant 1-2.

The heat transfer systems according to the present invention include air cooled chiller systems that comprise a compressor, an evaporator, a condenser and an expansion device, in fluid communication with each other, a refrigerant of the invention, including each of Refrigerants 1-22, a lubricant, including each of POE lubricant and Lubricant 1-2 and a sequestration material, including each of Sequestration Materials 1-6.

The heat transfer systems according to the present invention include air cooled chiller systems that comprise a compressor, an evaporator, a condenser and an expansion device, in fluid communication with each other, a refrigerant of the invention, including each of Refrigerants 1-22, a lubricant, including each of POE lubricant and Lubricant 1-2, and a stabilizer, including each of Stabilizers 1-17.

The heat transfer systems according to the present invention include air cooled chiller systems that comprise a compressor, an evaporator, a condenser and an expansion device, in fluid communication with each other, a refrigerant of the invention, including each of Refrigerants 1-22, a lubricant, including each of POE lubricant and Lubricant 1-2, and a stabilizer, including each of Stabilizers 1-17 and a sequestration material, including each of Sequestration Materials 1-6.

The heat transfer systems according to the present invention include air cooled chiller systems that comprise a compressor, an evaporator, a condenser and an expansion device, in fluid communication with each other, Refrigerant 1, POE lubricant, and stabilizer, including each of Stabilizers 1-17.

The heat transfer systems according to the present invention include air cooled chiller systems that comprise a compressor, an evaporator, a condenser and an expansion device, in fluid communication with each other, Refrigerant 1, POE lubricant, Stabilizer 1, and sequestration material selected from Sequestration Materials 1-6.

The heat transfer systems according to the present invention include air cooled chiller systems that comprise a compressor, an evaporator, a condenser and an expansion device, Refrigerant 1, a POE lubricant and Stabilizer 1.

The heat transfer systems according to the present invention include air cooled chiller systems that comprise a compressor, an evaporator having an evaporator operating temperature of about 0° C. to about 10° C., a condenser and an expansion device, Refrigerant 1, a POE lubricant and Stabilizer 1.

The heat transfer systems according to the present invention include air cooled chiller systems that comprise a compressor, an evaporator having an evaporator operating temperature of about 4.5° C., a condenser and an expansion device, Refrigerant 1, a POE lubricant and Stabilizer 1.

The heat transfer systems according to the present invention include air cooled chiller systems that comprise a compressor, an evaporator having an evaporator operating temperature of about 0° C. to about 10° C., a condenser and an expansion device, Refrigerant 1, a POE lubricant, Stabilizer 1 and sequestration material selected from Sequestration Materials 1-6.

The heat transfer systems according to the present invention include air cooled chiller systems that comprise a compressor, an evaporator having an evaporator operating temperature of about 4.5° C., a condenser and an expansion device, Refrigerant 1, a POE lubricant, Stabilizer 1 and sequestration material selected from Sequestration Materials 1-6.

The heat transfer systems according to the present invention include air cooled chiller systems that comprise a compressor, an evaporator, a condenser and an expansion device, in fluid communication with each other, Refrigerant 6, POE lubricant, and stabilizer, including each of Stabilizers 1-17.

The heat transfer systems according to the present invention include air cooled chiller systems that comprise a compressor, an evaporator, a condenser and an expansion device, in fluid communication with each other, Refrigerant 6, POE lubricant, Stabilizer 1, and sequestration material selected from Sequestration Materials 1-6.

The heat transfer systems according to the present invention include air cooled chiller systems that comprise a compressor, an evaporator, a condenser and an expansion device, Refrigerant 6, a POE lubricant and Stabilizer 1.

The heat transfer systems according to the present invention include air cooled chiller systems that comprise a compressor, an evaporator having an evaporator operating temperature of about 0° C. to about 10° C., a condenser and an expansion device, Refrigerant 6, a POE lubricant and Stabilizer 1.

The heat transfer systems according to the present invention include air cooled chiller systems that comprise a compressor, an evaporator having an evaporator operating temperature of about 4.5° C., a condenser and an expansion device, Refrigerant 6, a POE lubricant and Stabilizer 1.

The heat transfer systems according to the present invention include air cooled chiller systems that comprise a compressor, an evaporator having an evaporator operating temperature of about 0° C. to about 10° C., a condenser and an expansion device, Refrigerant 6, a POE lubricant, Stabilizer 1 and sequestration material selected from Sequestration Materials 1-6.

The heat transfer systems according to the present invention include air cooled chiller systems that comprise a compressor, an evaporator having an evaporator operating temperature of about 4.5° C., a condenser and an expansion device, Refrigerant 6, a POE lubricant, Stabilizer 1 and sequestration material selected from Sequestration Materials 1-6.

The heat transfer systems according to the present invention include air cooled chiller systems that comprise a compressor, an evaporator, a condenser and an expansion device, in fluid communication with each other, Refrigerant 9, POE lubricant, and stabilizer, including each of Stabilizers 1-17.

The heat transfer systems according to the present invention include air cooled chiller systems that comprise a compressor, an evaporator, a condenser and an expansion device, in fluid communication with each other, Refrigerant 9, POE lubricant, Stabilizer 1, and sequestration material selected from Sequestration Materials 1-6.

The heat transfer systems according to the present invention include air cooled chiller systems that comprise a compressor, an evaporator, a condenser and an expansion device, Refrigerant 9, a POE lubricant and Stabilizer 1.

The heat transfer systems according to the present invention include air cooled chiller systems that comprise a compressor, an evaporator having an evaporator operating temperature of about 0° C. to about 10° C., a condenser and an expansion device, Refrigerant 9, a POE lubricant and Stabilizer 1.

The heat transfer systems according to the present invention include air cooled chiller systems that comprise a compressor, an evaporator having an evaporator operating temperature of about 4.5° C., a condenser and an expansion device, Refrigerant 9, a POE lubricant and Stabilizer 1.

The heat transfer systems according to the present invention include air cooled chiller systems that comprise a compressor, an evaporator having an evaporator operating temperature of about 0° C. to about 10° C., a condenser and an expansion device, Refrigerant 9, a POE lubricant, Stabilizer 1 and sequestration material selected from Sequestration Materials 1-6.

The heat transfer systems according to the present invention include air cooled chiller systems that comprise a compressor, an evaporator having an evaporator operating temperature of about 4.5° C., a condenser and an expansion device, Refrigerant 9, a POE lubricant, Stabilizer 1 and sequestration material selected from Sequestration Materials 1-6.

The heat transfer systems according to the present invention include air cooled chiller systems that comprise a compressor, an evaporator, a condenser and an expansion device, in fluid communication with each other, Refrigerant 16, POE lubricant, and stabilizer, including each of Stabilizers 1-17.

The heat transfer systems according to the present invention include air cooled chiller systems that comprise a compressor, an evaporator, a condenser and an expansion device, in fluid communication with each other, Refrigerant 16, POE lubricant, Stabilizer 1, and sequestration material selected from Sequestration Materials 1-6.

The heat transfer systems according to the present invention include air cooled chiller systems that comprise a compressor, an evaporator, a condenser and an expansion device, Refrigerant 16, a POE lubricant and Stabilizer 1.

The heat transfer systems according to the present invention include air cooled chiller systems that comprise a compressor, an evaporator having an evaporator operating temperature of about 0° C. to about 10° C., a condenser and an expansion device, Refrigerant 16, a POE lubricant and Stabilizer 1.

The heat transfer systems according to the present invention include air cooled chiller systems that comprise a compressor, an evaporator having an evaporator operating temperature of about 4.5° C., a condenser and an expansion device, Refrigerant 16, a POE lubricant and Stabilizer 1.

The heat transfer systems according to the present invention include air cooled chiller systems that comprise a compressor, an evaporator having an evaporator operating temperature of about 0° C. to about 10° C., a condenser and an expansion device, Refrigerant 16, a POE lubricant, Stabilizer 1 and sequestration material selected from Sequestration Materials 1-6.

The heat transfer systems according to the present invention include air cooled chiller systems that comprise a compressor, an evaporator having an evaporator operating temperature of about 4.5° C., a condenser and an expansion device, Refrigerant 16, a POE lubricant, Stabilizer 1 and sequestration material selected from Sequestration Materials 1-6.

The heat transfer systems according to the present invention include air cooled chiller systems that comprise a compressor, an evaporator, a condenser and an expansion device, in fluid communication with each other, Refrigerant 19, POE lubricant, and stabilizer, including each of Stabilizers 1-17.

The heat transfer systems according to the present invention include air cooled chiller systems that comprise a compressor, an evaporator, a condenser and an expansion device, in fluid communication with each other, Refrigerant 19, POE lubricant, Stabilizer 1, and sequestration material selected from Sequestration Materials 1-6.

The heat transfer systems according to the present invention include air cooled chiller systems that comprise a compressor, an evaporator, a condenser and an expansion device, Refrigerant 19, a POE lubricant and Stabilizer 1.

The heat transfer systems according to the present invention include air cooled chiller systems that comprise a compressor, an evaporator having an evaporator operating temperature of about 0° C. to about 10° C., a condenser and an expansion device, Refrigerant 19, a POE lubricant and Stabilizer 1.

The heat transfer systems according to the present invention include air cooled chiller systems that comprise a compressor, an evaporator having an evaporator operating temperature of about 4.5° C., a condenser and an expansion device, Refrigerant 19, a POE lubricant and Stabilizer 1.

The heat transfer systems according to the present invention include air cooled chiller systems that comprise a compressor, an evaporator having an evaporator operating temperature of about 0° C. to about 10° C., a condenser and an expansion device, Refrigerant 19, a POE lubricant, Stabilizer 1 and sequestration material selected from Sequestration Materials 1-6.

The heat transfer systems according to the present invention include air cooled chiller systems that comprise a compressor, an evaporator having an evaporator operating temperature of about 4.5° C., a condenser and an expansion device, Refrigerant 19, a POE lubricant, Stabilizer 1 and sequestration material selected from Sequestration Materials 1-6.

For each of the of the chiller systems described herein, including operating in a commercial air conditioning system, the chiller preferably provides chilled water, preferably at a temperature of for example, about 5° C. to about 10° C., particularly about 7° C.) to large buildings such as offices and hospitals, etc. Depending on the application, the chiller system may be running all year long. The chiller system may be air-cooled or water-cooled. In the air-cooled systems, the condenser exchanges heat with (i.e., rejects heat) to ambient air. In the water-cooled systems, the condenser exchanges heat with (i.e., rejects heat) with water, for example, from cooling tower or lake, sea and other natural resource.

For each of the chiller systems described herein, the condenser preferably operates with a condensing temperature in the range of from about 40° C. to about 70° C.

Residential Air to Water Heat Pump Hydronic System

The heat transfer systems according to the present invention include residential air to water heat pumps that comprise a compressor, an evaporator, a condenser and an expansion device, in fluid communication with each other, a refrigerant of the invention, including each of Refrigerants 1-22 and a lubricant, including each of POE lubricant and Lubricant 1-2.

The heat transfer systems according to the present invention include residential air to water heat pumps that comprise a compressor, an evaporator, a condenser and an expansion device, in fluid communication with each other, a refrigerant of the invention, including each of Refrigerants 1-22, a lubricant, including each of POE lubricant and Lubricant 1-2 and a sequestration material, including each of Sequestration Materials 1-6.

The heat transfer systems according to the present invention include residential air to water heat pumps that comprise a compressor, an evaporator, a condenser and an expansion device, in fluid communication with each other, a refrigerant of the invention, including each of Refrigerants 1-22, a lubricant, including each of POE lubricant and Lubricant 1-2, and a stabilizer, including each of Stabilizers 1-17.

The heat transfer systems according to the present invention include residential air to water heat pumps that comprise a compressor, an evaporator, a condenser and an expansion device, in fluid communication with each other, a refrigerant of the invention, including each of Refrigerants 1-22, a lubricant, including each of POE lubricant and Lubricant 1-2, and a stabilizer, including each of Stabilizers 1-17 and a sequestration material, including each of Sequestration Materials 1-6.

The heat transfer systems according to the present invention include residential air to water heat pumps that comprise a compressor, an evaporator, a condenser and an expansion device, in fluid communication with each other, Refrigerant 1, POE lubricant, and stabilizer, including each of Stabilizers 1-17.

The heat transfer systems according to the present invention include residential air to water heat pumps that comprise a compressor, an evaporator, a condenser and an expansion device, in fluid communication with each other, Refrigerant 1, POE lubricant, Stabilizer 1, and sequestration material selected from Sequestration Materials 1-6.

The heat transfer systems according to the present invention include residential air to water heat pumps that comprise a compressor, an evaporator, a condenser and an expansion device, Refrigerant 1, a POE lubricant and Stabilizer 1.

The heat transfer systems according to the present invention include residential air to water heat pumps systems that comprise a compressor, an evaporator having an evaporator operating temperature of about −30° C. to about 5° C., a condenser and an expansion device, Refrigerant 1, a POE lubricant and Stabilizer 1.

The heat transfer systems according to the present invention include residential air to water heat pumps systems that comprise a compressor, an evaporator having an evaporator operating temperature of about −20° C. to about 3° C., a condenser and an expansion device, Refrigerant 1, a POE lubricant and Stabilizer 1.

The heat transfer systems according to the present invention include residential air to water heat pumps that comprise a compressor, an evaporator having an evaporator operating temperature of about 0.5° C., a condenser and an expansion device, Refrigerant 1, a POE lubricant and Stabilizer 1.

The heat transfer systems according to the present invention include residential air to water heat pumps that comprise a compressor, an evaporator, a condenser and an expansion device, in fluid communication with each other, Refrigerant 6, POE lubricant, and stabilizer, including each of Stabilizers 1-17.

The heat transfer systems according to the present invention include residential air to water heat pumps that comprise a compressor, an evaporator, a condenser and an expansion device, in fluid communication with each other, Refrigerant 6, POE lubricant, Stabilizer 1, and sequestration material selected from Sequestration Materials 1-6.

The heat transfer systems according to the present invention include residential air to water heat pumps that comprise a compressor, an evaporator, a condenser and an expansion device, Refrigerant 6, a POE lubricant and Stabilizer 1.

The heat transfer systems according to the present invention include residential air to water heat pumps systems that comprise a compressor, an evaporator having an evaporator operating temperature of about −30° C. to about 5° C., a condenser and an expansion device, Refrigerant 6, a POE lubricant and Stabilizer 1.

The heat transfer systems according to the present invention include residential air to water heat pumps systems that comprise a compressor, an evaporator having an evaporator operating temperature of about −20° C. to about 3° C., a condenser and an expansion device, Refrigerant 6, a POE lubricant and Stabilizer 1.

The heat transfer systems according to the present invention include residential air to water heat pumps that comprise a compressor, an evaporator having an evaporator operating temperature of about 0.5° C., a condenser and an expansion device, Refrigerant 6, a POE lubricant and Stabilizer 1.

The heat transfer systems according to the present invention include residential air to water heat pumps that comprise a compressor, an evaporator, a condenser and an expansion device, in fluid communication with each other, Refrigerant 9, POE lubricant, and stabilizer, including each of Stabilizers 1-17.

The heat transfer systems according to the present invention include residential air to water heat pumps that comprise a compressor, an evaporator, a condenser and an expansion device, in fluid communication with each other, Refrigerant 9, POE lubricant, Stabilizer 1, and sequestration material selected from Sequestration Materials 1-6.

The heat transfer systems according to the present invention include residential air to water heat pumps that comprise a compressor, an evaporator, a condenser and an expansion device, Refrigerant 9, a POE lubricant and Stabilizer 1.

The heat transfer systems according to the present invention include residential air to water heat pumps systems that comprise a compressor, an evaporator having an evaporator operating temperature of about −30° C. to about 5° C., a condenser and an expansion device, Refrigerant 9, a POE lubricant and Stabilizer 1.

The heat transfer systems according to the present invention include residential air to water heat pumps systems that comprise a compressor, an evaporator having an evaporator operating temperature of about −20° C. to about 3° C., a condenser and an expansion device, Refrigerant 9, a POE lubricant and Stabilizer 1.

The heat transfer systems according to the present invention include residential air to water heat pumps that comprise a compressor, an evaporator having an evaporator operating temperature of about 0.5° C., a condenser and an expansion device, Refrigerant 9, a POE lubricant and Stabilizer 1.

The heat transfer systems according to the present invention include residential air to water heat pumps that comprise a compressor, an evaporator, a condenser and an expansion device, in fluid communication with each other, Refrigerant 16, POE lubricant, and stabilizer, including each of Stabilizers 1-17.

The heat transfer systems according to the present invention include residential air to water heat pumps that comprise a compressor, an evaporator, a condenser and an expansion device, in fluid communication with each other, Refrigerant 16, POE lubricant, Stabilizer 1, and sequestration material selected from Sequestration Materials 1-6.

The heat transfer systems according to the present invention include residential air to water heat pumps that comprise a compressor, an evaporator, a condenser and an expansion device, Refrigerant 6, a POE lubricant and Stabilizer 1.

The heat transfer systems according to the present invention include residential air to water heat pumps systems that comprise a compressor, an evaporator having an evaporator operating temperature of about −30° C. to about 5° C., a condenser and an expansion device, Refrigerant 16, a POE lubricant and Stabilizer 1.

The heat transfer systems according to the present invention include residential air to water heat pumps systems that comprise a compressor, an evaporator having an evaporator operating temperature of about −20° C. to about 3° C., a condenser and an expansion device, Refrigerant 16, a POE lubricant and Stabilizer 1.

The heat transfer systems according to the present invention include residential air to water heat pumps that comprise a compressor, an evaporator having an evaporator operating temperature of about 0.5° C., a condenser and an expansion device, Refrigerant 16, a POE lubricant and Stabilizer 1.

The heat transfer systems according to the present invention include residential air to water heat pumps that comprise a compressor, an evaporator, a condenser and an expansion device, in fluid communication with each other, Refrigerant 19, POE lubricant, and stabilizer, including each of Stabilizers 1-17.

The heat transfer systems according to the present invention include residential air to water heat pumps that comprise a compressor, an evaporator, a condenser and an expansion device, in fluid communication with each other, Refrigerant 19, POE lubricant, Stabilizer 1, and sequestration material selected from Sequestration Materials 1-6.

The heat transfer systems according to the present invention include residential air to water heat pumps that comprise a compressor, an evaporator, a condenser and an expansion device, Refrigerant 19, a POE lubricant and Stabilizer 1.

The heat transfer systems according to the present invention include residential air to water heat pumps systems that comprise a compressor, an evaporator having an evaporator operating temperature of about −30° C. to about 5° C., a condenser and an expansion device, Refrigerant 19, a POE lubricant and Stabilizer 1.

The heat transfer systems according to the present invention include residential air to water heat pumps systems that comprise a compressor, an evaporator having an evaporator operating temperature of about −20° C. to about 3° C., a condenser and an expansion device, Refrigerant 19, a POE lubricant and Stabilizer 1.

The heat transfer systems according to the present invention include residential air to water heat pumps that comprise a compressor, an evaporator having an evaporator operating temperature of about 0.5° C., a condenser and an expansion device, Refrigerant 19, a POE lubricant and Stabilizer 1.

For each of the residential air to water heat pumps described herein, the system preferably provides hot water, with the water preferably having a temperature of for example about 50° C. or about 55° C., to buildings for floor heating or similar applications in the winter.

For each of the residential air to water heat pumps described herein, the condenser preferably operates with a condensing temperature in the range of from about 50° C. to about 90° C.

Low Temperature Systems

The heat transfer systems according to the present invention include low temperature heat transfer systems that comprise a compressor, an evaporator, a condenser and an expansion device, in fluid communication with each other, a refrigerant of the invention, including each of Refrigerants 1-22 and a lubricant, including each of POE lubricant and Lubricant 1-2.

The heat transfer systems according to the present invention include low temperature heat transfer systems that comprise a compressor, an evaporator, a condenser and an expansion device, in fluid communication with each other, a refrigerant of the invention, including each of Refrigerants 1-22, a lubricant, including each of POE lubricant and Lubricant 1-2 and a sequestration material, including each of Sequestration Materials 1-6.

The heat transfer systems according to the present invention include low temperature heat transfer systems that comprise a compressor, an evaporator, a condenser and an expansion device, in fluid communication with each other, a refrigerant of the invention, including each of Refrigerants 1-22, a lubricant, including each of POE lubricant and Lubricant 1-2, and a stabilizer, including each of Stabilizers 1-17.

The heat transfer systems according to the present invention include low temperature heat transfer systems that comprise a compressor, an evaporator, a condenser and an expansion device, in fluid communication with each other, a refrigerant of the invention, including each of Refrigerants 1-22, a lubricant, including each of POE lubricant and Lubricant 1-2, and a stabilizer, including each of Stabilizers 1-17 and a sequestration material, including each of Sequestration Materials 1-6.

The heat transfer systems according to the present invention include low temperature heat transfer systems that comprise a compressor, an evaporator, a condenser and an expansion device, in fluid communication with each other, Refrigerant 1, POE lubricant, and stabilizer, including each of Stabilizers 1-17.

The heat transfer systems according to the present invention include low temperature heat transfer systems that comprise a compressor, an evaporator, a condenser and an expansion device, in fluid communication with each other, Refrigerant 1, POE lubricant, Stabilizer 1, and sequestration material selected from Sequestration Materials 1-6.

Medium Temperature Systems

The heat transfer systems according to the present invention include medium temperature heat transfer systems that comprise a compressor, an evaporator, a condenser and an expansion device, in fluid communication with each other, a refrigerant of the invention, including each of Refrigerants 1-22 and a lubricant, including each of POE lubricant and Lubricant 1-2.

The heat transfer systems according to the present invention include medium temperature heat transfer systems that comprise a compressor, an evaporator, a condenser and an expansion device, in fluid communication with each other, a refrigerant of the invention, including each of Refrigerants 1-22, a lubricant, including each of POE lubricant and Lubricant 1-2 and a sequestration material, including each of Sequestration Materials 1-6.

The heat transfer systems according to the present invention include medium temperature heat transfer systems that comprise a compressor, an evaporator, a condenser and an expansion device, in fluid communication with each other, a refrigerant of the invention, including each of Refrigerants 1-22, a lubricant, including each of POE lubricant and Lubricant 1-2, and a stabilizer, including each of Stabilizers 1-17.

The heat transfer systems according to the present invention include medium temperature heat transfer systems that comprise a compressor, an evaporator, a condenser and an expansion device, in fluid communication with each other, a refrigerant of the invention, including each of Refrigerants 1-22, a lubricant, including each of POE lubricant and Lubricant 1-2, and a stabilizer, including each of Stabilizers 1-17 and a sequestration material, including each of Sequestration Materials 1-6.

The heat transfer systems according to the present invention include medium temperature heat transfer systems that comprise a compressor, an evaporator, a condenser and an expansion device, in fluid communication with each other, Refrigerant 1, POE lubricant, and stabilizer, including each of Stabilizers 1-17.

Cooling Methods

The present invention includes methods for providing cooling comprising:

(a) evaporating a refrigerant according to the present invention (including any refrigerant selected from each of Refrigerants 1-22), in the vicinity of the body or article or fluid to be cooled at a temperature of from about −40° C. to about +10° C. to produce a refrigerant vapor;

(b) compressing said refrigerant vapor to produce a refrigerant at discharge temperature of less than about 135° C.; and (c) condensing the refrigerant from said compressor at a temperature of from about 20° C. to about 70° C. to produce a refrigerant vapor.

Particular cooling methods are described in more detail below.

Residential Air Conditioning The present invention includes methods of providing residential air conditioning in the cooling mode, said method comprising:

(a) evaporating a refrigerant according to the present invention (including any refrigerant selected from each of Refrigerants 1-22), at a temperature of from about 0° C. to about 10° C. to produce a refrigerant vapor;

(b) compressing said refrigerant vapor to produce a refrigerant at discharge temperature of less than about 135° C.; and (c) condensing the refrigerant from said compressor at a temperature of from about 40° C. to about 70° C. to produce a refrigerant vapor.

The present invention includes methods of providing residential air conditioning in the cooling mode, said method comprising:

(a) evaporating a refrigerant according to the present invention (including any refrigerant selected from each of Refrigerants 1-22), at a temperature of from about 0° C. to about 10° C. to produce a refrigerant vapor and cooled air at a temperature of from about 10° C. to about 17° C.;

(b) compressing said refrigerant vapor to produce a refrigerant at discharge temperature of less than about 135° C.; and (c) condensing the refrigerant from said compressor at a temperature of from about 40° C. to about 70° C. to produce a refrigerant vapor.

The present invention includes methods of providing residential air conditioning in the cooling mode, said method comprising:

(a) evaporating a refrigerant according to the present invention (including any refrigerant selected from each of Refrigerants 1-22), at a temperature of from about 0° C. to about 10° C. to produce a refrigerant vapor and cooled air at a temperature of from about 10° C. to about 17° C.;

(b) compressing said refrigerant vapor in a compressor lubricated with POE lubricant to produce a refrigerant at discharge temperature of less than about 135° C.;

(c) condensing the refrigerant from said compressor at a temperature of from about 40° C. to about 70° C. to produce a refrigerant vapor; and (d) exposing at least a portion of said refrigerant and/or at least a portion of said lubricant to a sequestration material of the present invention, including any of Sequestration Materials 1-6.

Chillers

The present invention includes methods of providing chilled water to provide air conditioning in the cooling mode, said method comprising:

(a) evaporating a refrigerant according to the present invention (including any refrigerant selected from each of Refrigerants 1-22), at a temperature of from about 0° C. to about 10° C. to produce a refrigerant vapor;

(b) compressing said refrigerant vapor to produce a refrigerant at discharge temperature of less than about 135° C.; and (c) condensing the refrigerant from said compressor at a temperature of from about 40° C. to about 70° C. to produce a refrigerant vapor.

The present invention includes methods of providing residential air conditioning in the cooling mode, said method comprising:

(a) evaporating a refrigerant according to the present invention (including any refrigerant selected from each of Refrigerants 1-22), at a temperature of from about 0° C. to about 10° C. to produce a refrigerant vapor and chilled water at a temperature of from about 5° C. to about 10° C.;

(b) compressing said refrigerant vapor to produce a refrigerant at discharge temperature of less than about 135° C.; and (c) condensing the refrigerant from said compressor at a temperature of from about 40° C. to about 70° C. to produce a refrigerant vapor.

The present invention includes methods of providing residential air conditioning in the cooling mode, said method comprising:

(a) evaporating a refrigerant according to the present invention (including any refrigerant selected from each of Refrigerants 1-22), at a temperature of from about 0° C. to about 10° C. to produce a refrigerant vapor and chilled water at a temperature of from about 5° C. to about 10° C.;

(b) compressing said refrigerant vapor in a compressor lubricated with POE lubricant to produce a refrigerant at discharge temperature of less than about 135° C.;

(c) condensing the refrigerant from said compressor at a temperature of from about 40° C. to about 70° C. to produce a refrigerant vapor; and (d) exposing at least a portion of said refrigerant and/or at least a portion of said lubricant to a sequestration material of the present invention, including any of Sequestration Materials 1-6.

Low Temperature Cooling Methods

The present invention also includes low temperature refrigeration methods for transferring heat, said method comprising:

(a) evaporating a refrigerant according to the present invention (including any refrigerant selected from each of Refrigerants 1-22), at a temperature of from about −40° C. to about −12° C. to produce a refrigerant vapor;

(b) compressing said refrigerant vapor to produce a refrigerant at discharge temperature of less than about 135° C.; and (c) condensing the refrigerant from said compressor at a temperature of from about 20° C. to about 60° C. to produce a refrigerant vapor.

Medium Temperature Cooling Methods

The present invention also includes medium temperature refrigeration methods for transferring heat, said method comprising:

(a) evaporating a refrigerant according to the present invention (including any refrigerant selected from each of Refrigerants 1-22), at a temperature of from −12° C. to about 0° C. to produce a refrigerant vapor;

(b) compressing said refrigerant vapor to produce a refrigerant at discharge temperature of less than about 135° C.; and (c) condensing the refrigerant from said compressor at a temperature of from about 20° C. to about 60° C. to produce a refrigerant vapor.

Heating Methods

The present invention includes methods for providing heating comprising:

(a) evaporating a refrigerant according to the present invention (including any refrigerant selected from each of Refrigerants 1-22) at a temperature of from about −30° C. to about +5° C. to produce a refrigerant vapor;

(b) compressing said refrigerant vapor to produce a refrigerant at discharge temperature of less than about 135° C.; and (c) condensing the refrigerant from said compressor in the vicinity of the body or article or fluid to be heated, said condensing occurring at a temperature of from about 40° C. to about 70° C. to produce a refrigerant vapor.

Particular heating methods are described in more detail below.

Residential Air Conditioning

The present invention includes methods of providing residential air conditioning in the heating mode, said method comprising:

(a) evaporating a refrigerant according to the present invention (including any refrigerant selected from each of Refrigerants 1-22), at a temperature of from about −20° C. to about 3° C. to produce a refrigerant vapor;

(b) compressing said refrigerant vapor to produce a refrigerant at discharge temperature of less than about 135° C.; and (c) condensing the refrigerant from said compressor at a temperature of from about 40° C. to about 70° C. to produce a refrigerant vapor.

The present invention includes methods of providing residential air conditioning in the heating mode, said method comprising:

(a) evaporating a refrigerant according to the present invention (including any refrigerant selected from each of Refrigerants 1-22), at a temperature of from about 0.5° C. to produce a refrigerant vapor;

(b) compressing said refrigerant vapor to produce a refrigerant at discharge temperature of less than about 135° C.; and (c) condensing the refrigerant from said compressor at a temperature of from about 40° C. to about 70° C. to produce a refrigerant vapor and heated air at a temperature of from about 18° C. to about 24° C.

The present invention includes methods of providing residential air conditioning in the heating mode, said method comprising:

(a) evaporating a refrigerant according to the present invention (including any refrigerant selected from each of Refrigerants 1-22), at a temperature of from about 0° C. to about 10° C. to produce a refrigerant vapor;

(b) compressing said refrigerant vapor in a compressor lubricated with POE lubricant to produce a refrigerant at discharge temperature of less than about 135° C.;

(c) condensing the refrigerant from said compressor at a temperature of from about 40° C. to about 70° C. to produce a refrigerant vapor; and (d) exposing at least a portion of said refrigerant and/or at least a portion of said lubricant to a sequestration material of the present invention, including any of Sequestration Materials 1-6.

Residential Air to Water Heat Pump Hydronic System

The present invention includes methods of providing heating in a residential air to water heat pump, said method comprising:

(a) evaporating a refrigerant according to the present invention (including any refrigerant selected from each of Refrigerants 1-22), at a temperature of from about −30° C. to about 5° C. to produce a refrigerant vapor;

(b) compressing said refrigerant vapor to produce a refrigerant at discharge temperature of less than about 135° C.; and (c) condensing the refrigerant from said compressor at a temperature of from about 50° C. to about 90° C. to produce a refrigerant vapor.

The present invention includes methods of providing heating in a residential air to water heat pump, said method comprising:

(a) evaporating a refrigerant according to the present invention (including any refrigerant selected from each of Refrigerants 1-22), at a temperature of from about −20° C. to about 3° C. to produce a refrigerant vapor;

(b) compressing said refrigerant vapor to produce a refrigerant at discharge temperature of less than about 135° C.; and (c) condensing the refrigerant from said compressor at a temperature of from about 50° C. to about 90° C. to produce a refrigerant vapor.

The present invention includes methods of providing heating in a residential air to water heat pump, said method comprising:

(a) evaporating a refrigerant according to the present invention (including any refrigerant selected from each of Refrigerants 1-22), at a temperature of from about −30° C. to about 5° C. to produce a refrigerant vapor;

(b) compressing said refrigerant vapor to produce a refrigerant at discharge temperature of less than about 135° C.; and (c) condensing the refrigerant from said compressor at a temperature of from about 50° C. to about 90° C. to produce a refrigerant vapor and heated water at a temperature of from about 50° C. to about 55° C.

The present invention includes methods of providing heating in a residential air to water heat pump, said method comprising:

(a) evaporating a refrigerant according to the present invention (including any refrigerant selected from each of Refrigerants 1-22), at a temperature of from about −30° C. to about 5° C. to produce a refrigerant vapor;

(b) compressing said refrigerant vapor in a compressor lubricated with POE lubricant to produce a refrigerant at discharge temperature of less than about 135° C.;

(c) condensing the refrigerant from said compressor at a temperature of from about 40° C. to about 70° C. to produce a refrigerant vapor; and (d) exposing at least a portion of said refrigerant and/or at least a portion of said lubricant to a sequestration material of the present invention, including any of Sequestration Materials 1-6.

Uses

Residential Air Conditioning

The present invention includes the use of a heat transfer composition comprising Refrigerant 1, in residential air conditioning.

The present invention therefore includes the use of a heat transfer composition comprising Refrigerant 2, in residential air conditioning.

The present invention therefore includes the use of a heat transfer composition comprising Refrigerant 3, in residential air conditioning.

The present invention therefore includes the use of a heat transfer composition comprising Refrigerant 4, in residential air conditioning.

The present invention therefore includes the use of a heat transfer composition comprising Refrigerant 5, in residential air conditioning.

The present invention therefore includes the use of a heat transfer composition comprising Refrigerant 6, in residential air conditioning.

The present invention therefore includes the use of a heat transfer composition comprising Refrigerant 7, in a residential air conditioning.

The present invention therefore includes the use of a heat transfer composition comprising Refrigerant 8, in residential air conditioning.

The present invention therefore includes the use of a heat transfer composition comprising Refrigerant 9, in residential air conditioning.

The present invention therefore includes the use of a heat transfer composition comprising Refrigerant 10, in a residential air conditioning.

The present invention therefore includes the use of a heat transfer composition comprising Refrigerant 11, in a residential air conditioning.

The present invention therefore includes the use of a heat transfer composition comprising Refrigerant 12, in residential air conditioning.

The present invention therefore includes the use of a heat transfer composition comprising Refrigerant 13, in residential air conditioning.

The present invention therefore includes the use of a heat transfer composition comprising Refrigerant 14, in residential air conditioning.

The present invention therefore includes the use of a heat transfer composition comprising Refrigerant 15, in residential air conditioning.

The present invention therefore includes the use of a heat transfer composition comprising Refrigerant 16, in residential air conditioning.

The present invention therefore includes the use of a heat transfer composition comprising Refrigerant 17, in a residential air conditioning.

The present invention therefore includes the use of a heat transfer composition comprising Refrigerant 18, in residential air conditioning.

The present invention therefore includes the use of a heat transfer composition comprising Refrigerant 19, in residential air conditioning.

The present invention therefore includes the use of a heat transfer composition comprising Refrigerant 20, in a residential air conditioning.

The present invention therefore includes the use of a heat transfer composition comprising Refrigerant 21, in a residential air conditioning.

The present invention therefore includes the use of a heat transfer composition comprising Refrigerant 22, in residential air conditioning.

Chillers

The present invention includes the use of a heat transfer composition comprising Refrigerant 1, in a chiller.

The present invention therefore includes the use of a heat transfer composition comprising Refrigerant 2, in a chiller.

The present invention therefore includes the use of a heat transfer composition comprising Refrigerant 3, in a chiller.

The present invention therefore includes the use of a heat transfer composition comprising Refrigerant 4, in a chiller.

The present invention therefore includes the use of a heat transfer composition comprising Refrigerant 5, in a chiller.

The present invention therefore includes the use of a heat transfer composition comprising Refrigerant 6, in a chiller.

The present invention therefore includes the use of a heat transfer composition comprising Refrigerant 7, in a residential air conditioning.

The present invention therefore includes the use of a heat transfer composition comprising Refrigerant 8, in a chiller.

The present invention therefore includes the use of a heat transfer composition comprising Refrigerant 9, in a chiller.

The present invention therefore includes the use of a heat transfer composition comprising Refrigerant 10, in a chiller.

The present invention therefore includes the use of a heat transfer composition comprising Refrigerant 11, in a chiller.

The present invention therefore includes the use of a heat transfer composition comprising Refrigerant 12, in a chiller.

The present invention therefore includes the use of a heat transfer composition comprising Refrigerant 13, in a chiller.

The present invention therefore includes the use of a heat transfer composition comprising Refrigerant 14, in a chiller.

The present invention therefore includes the use of a heat transfer composition comprising Refrigerant 15, in a chiller.

The present invention therefore includes the use of a heat transfer composition comprising Refrigerant 16, in a chiller.

The present invention therefore includes the use of a heat transfer composition comprising Refrigerant 17, in a residential air conditioning.

The present invention therefore includes the use of a heat transfer composition comprising Refrigerant 18, in a chiller.

The present invention therefore includes the use of a heat transfer composition comprising Refrigerant 19, in a chiller.

The present invention therefore includes the use of a heat transfer composition comprising Refrigerant 20, in a chiller.

The present invention therefore includes the use of a heat transfer composition comprising Refrigerant 21, in a chiller.

The present invention therefore includes the use of a heat transfer composition comprising Refrigerant 22, in a chiller.

Low Temperature Refrigeration

The present invention includes the use of a heat transfer composition comprising any refrigerant of the present invention, including each of Refrigerants 1-22, in a low temperature refrigeration system.

Medium Temperature Refrigeration

The present invention includes the use of a heat transfer composition comprising any refrigerant of the present invention, including each of Refrigerants 1-22, in a medium temperature refrigeration system.

Retrofit and Replacement

The heat transfer compositions and the refrigerants of the present invention (including each of Refrigerants 1-22 and all heat transfer compositions containing Refrigerants 1-22) therefore can be used as a retrofit refrigerant/heat transfer composition or as a replacement refrigerant/heat transfer composition.

The present invention thus includes methods of retrofitting existing heat transfer system designed for and containing R-22 refrigerant, without requiring substantial engineering modification of the existing system, particularly without modification of the condenser, the evaporator and/or the expansion valve.

The present invention thus also includes methods of using a refrigerant or heat transfer composition of the present invention (including each of Refrigerants 1-22 and all heat transfer compositions containing Refrigerants 1-22) as a retrofit for R-22, and in particular as a retrofit for R-22 in a low temperature refrigeration system, without requiring substantial engineering modification of the existing system, particularly without modification of the condenser, the evaporator and/or the expansion valve.

The present invention thus also includes methods of using a refrigerant or heat transfer composition of the present invention (including each of Refrigerants 1-22 and all heat transfer compositions containing Refrigerants 1-22) as a retrofit for R-22, and in particular as a replacement for R-22 in a medium temperature refrigeration system, without requiring substantial engineering modification of the existing system, particularly without modification of the condenser, the evaporator and/or the expansion valve.

The present invention thus also includes methods of using a refrigerant or heat transfer composition of the present invention (including each of Refrigerants 1-22 and all heat transfer compositions containing Refrigerants 1-22) as a replacement for R-22 in a low temperature refrigeration system.

The present invention thus also includes methods of using a refrigerant or heat transfer composition of the present invention (including each of Refrigerants 1-22 and all heat transfer compositions containing Refrigerants 1-22) as a replacement for R-22 in a medium temperature refrigeration system.

The present invention thus also includes methods of using a refrigerant or heat transfer composition of the present invention (including each of Refrigerants 1-22 and all heat transfer compositions containing Refrigerants 1-22) as a replacement for R-404A, and in particular as a replacement for R-404A in a low temperature refrigeration system.

The present invention thus also includes methods of using a refrigerant or heat transfer composition of the present invention (including each of Refrigerants 1-22 and all heat transfer compositions containing Refrigerants 1-22) as a replacement for R-404A, and in particular as a replacement for R-404A in a medium temperature refrigeration system, Equipment for the Systems, Methods and Uses Examples of commonly used compressors, for the purposes of this invention include reciprocating, rotary (including rolling piston and rotary vane), scroll, screw, and centrifugal compressors. Thus, the present invention provides each and any of the refrigerants, including each of Refrigerants 1-22, and/or heat transfer compositions as described herein, including those containing any one of Refrigerants 1-22, for use in a heat transfer system comprising a reciprocating, rotary (including rolling piston and rotary vane), scroll, screw, or centrifugal compressor.

Examples of commonly used expansion devices, for the purposes of this invention include a capillary tube, a fixed orifice, a thermal expansion valve and an electronic expansion valve. Thus, the present invention provides each and any of the refrigerants, including each of Refrigerants 1-22, and/or heat transfer compositions, including those containing any one of Refrigerants 1-22, as described herein for use in a heat transfer system comprising a capillary tube, a fixed orifice, a thermal expansion valve or an electronic expansion valve.

For the purposes of this invention, the evaporator and the condenser can each independently be selected from a finned tube heat exchanger, a microchannel heat exchanger, a shell and tube, a plate heat exchanger, and a tube-in-tube heat exchanger.

Thus, the present invention provides each and any of the refrigerants and/or heat transfer compositions as described herein for use in a heat transfer system wherein the evaporator and condenser together form a finned tube heat exchanger, a microchannel heat exchanger, a shell and tube, a plate heat exchanger, or a tube-in-tube heat exchanger.

The heat transfer composition of the invention can be used in heating and cooling applications. In a particular feature of the invention, the heat transfer composition can be used in a method of cooling comprising condensing a heat transfer composition and subsequently evaporating said composition in the vicinity of an article or body to be cooled.

The heat transfer composition of the invention is provided for use in a low temperature refrigeration systems, including use in each of the following:
  low temperature commercial refrigerator,
  a low temperature commercial freezer,
  an ice making machine,
  a vending machine,
  a low temperature transport refrigeration system,
  an industrial freezer,
  an industrial refrigerator and
  a low temperature chiller.

The heat transfer composition of the invention is provided for use in a medium temperature refrigeration system, wherein the medium temperature refrigeration system is preferably used to chill food or beverages such as in a refrigerator or a bottle cooler. The system usually has an air-to-refrigerant evaporator to chill the food or beverage, a reciprocating, scroll or screw or rotary compressor, an air-to-refrigerant condenser to exchange heat with the ambient air, and a thermal or electronic expansion valve.

The heat transfer composition of the invention is provided for use in a low temperature refrigeration system, wherein said low temperature refrigeration system is preferably used in a freezer or an ice making machine. The system usually has an air-to-refrigerant evaporator to chill the food or beverage, a reciprocating, scroll or rotary compressor, an air-to-refrigerant condenser to exchange heat with the ambient air, and a thermal or electronic expansion valve.

Each of the heat transfer compositions described herein, including heat transfer compositions containing any one of Refrigerants 1-22, is particularly provided for use in a low temperature system with a reciprocating, rotary (rolling-piston or rotary vane) or scroll compressor.

Each of the heat transfer compositions described herein, including heat transfer compositions containing any one of Refrigerants 1-22, is particularly provided for use in a medium temperature system with a reciprocating, rotary (rolling-piston or rotary vane) or scroll compressor.

The heat transfer compositions and the refrigerants of the present invention (including each of Refrigerants 1-22 and all heat transfer compositions containing Refrigerants 1-22) therefore can be used as a replacement refrigerant/heat transfer composition or a retrofit for the refrigerant R-22.

The heat transfer compositions and the refrigerants of the present invention (including each of Refrigerants 1-22 and all heat transfer compositions containing Refrigerants 1-22) therefore can be used as a replacement refrigerant/heat transfer composition for the refrigerant R-404A.

The present invention thus includes methods of replacing the refrigerant in a heat transfer system designed for or suitable for use with R-22 refrigerant.

The present invention thus includes methods of replacing the refrigerant in a heat transfer system designed for or suitable for use with R-404A refrigerant.

The present invention also includes methods of retrofitting an existing heat transfer system containing R-22, including particularly low and medium temperature refrigeration systems, by removing at least a portion of the R-22 from the system and then adding to the system a the refrigerant of the present invention, including each of Refrigerants 1-22.

It will be appreciated that when the heat transfer composition is used as a low GWP replacement for R-404A, stem, or is used in a heat transfer system, which is suitable for use with designed to contain or containing R-22 refrigerant, or is used in a heat transfer system which is suitable for use with R-22 refrigerant, the heat transfer composition may consist essentially of the refrigerant of the invention. Alternatively, the invention encompasses the use of the refrigerant of the invention as a low GWP replacement for R-22, in a heat transfer system suitable for use with R-22 refrigerant as described herein.

The compositions of the present invention exhibit many of the desirable characteristics of R-22 but have a GWP that is substantially lower than that of R-22 while at the same time having operating characteristics i.e. capacity and efficiency (COP) that are substantially similar to or substantially match R-22. This allows the claimed compositions to replace R-22 in existing heat transfer systems without requiring any significant system modification for example of the condenser, the evaporator and/or the expansion valve. The composition can therefore be used as a direct replacement in retrofitting heat exchange systems which have been used with or are suitable for use with R-22.

The refrigerants of the invention, including each of Refrigerants 1-22, therefore preferably exhibit operating characteristics compared with R-22 wherein the efficiency (COP) of the composition is from 95 to 105% of the efficiency of R-22 in heat transfer systems, in which the compositions of the invention are to replace the R-22 refrigerant.

The refrigerants of the invention, including each of Refrigerants 1-22, therefore preferably exhibits operating characteristics compared with R-22 wherein the capacity of the composition is from 97 to 103% of the capacity of R-22 in heat transfer systems, in which the compositions of the invention are to replace the R-22 refrigerant.

The refrigerants of the invention, including each of Refrigerants 1-22, therefore preferably exhibits operating characteristics compared with R-22 wherein the capacity of the composition is from 97 to 103% of the capacity of R-22 in heat transfer systems and wherein the efficiency (COP) is equal to or greater than the efficiency of R-22 in the heat transfer system, in which the compositions of the invention are to replace the R-22 refrigerant.

Preferably, the refrigerants of the invention, including each of Refrigerants 1-22, preferably exhibit operating characteristics compared with R-22A wherein the efficiency (COP) of the composition is from 100 to 105% of the efficiency of R-22 in heat transfer systems, in which the compositions of the invention are to replace the R-22 refrigerant.

In order to maintain reliability of the heat transfer system, it is preferred that the composition of the invention further exhibits the following characteristics compared with R-22:
  the discharge temperature is not greater than 100° C. higher than that of R-22; and
  the compressor pressure ratio is from 95 to 105% of the compressor pressure ratio of R-22
in heat transfer systems, in which the composition of the invention is used to replace the R-22 refrigerant.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 1.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 2.

There is therefore provided a method of retrofitting an existing heat transfer system designed to contain or containing R-22 refrigerant or which is suitable for use with R-404 refrigerant, said method comprising replacing at least a portion of the existing R-404A refrigerant with a heat transfer composition comprising Refrigerant 3.

There is therefore provided a method of retrofitting an existing heat transfer system designed to contain or containing R-404A refrigerant or which is suitable for use with R-22 refrigerant, said method comprising replacing at least a portion of the existing R-22 refrigerant with a heat transfer composition comprising Refrigerant 4.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 5.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 6.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 7.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 8.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 9.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 10.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 11.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 12.

There is therefore provided a method of retrofitting an existing heat transfer system designed to contain or containing R-22 refrigerant or which is suitable for use with R-404 refrigerant, said method comprising replacing at least a portion of the existing R-404A refrigerant with a heat transfer composition comprising Refrigerant 13.

There is therefore provided a method of retrofitting an existing heat transfer system designed to contain or containing R-404A refrigerant or which is suitable for use with R-22 refrigerant, said method comprising replacing at least a portion of the existing R-22 refrigerant with a heat transfer composition comprising Refrigerant 14.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 15.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 16.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 17.

There is therefore provided a method of retrofitting an existing heat transfer system designed to contain or containing R-404A refrigerant or which is suitable for use with R-404 refrigerant, said method comprising replacing at least a portion of the existing R-404A refrigerant with a heat transfer composition comprising Refrigerant 18.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 19.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 20.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 21.

There is therefore provided a method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising Refrigerant 22.

The step of replacing, including as recited in each of the preceding paragraphs, preferably comprises removing at least a substantial portion of, and preferably substantially all of, the existing refrigerant (which can be but is not limited to R-22) and introducing a heat transfer composition or a refrigerant of the present invention, including each of Refrigerants 1-22, without any substantial modification of the system to accommodate the refrigerant of the present invention.

In preferred retrofitting embodiments, including those embodiments described above, the removing step comprises removing at least about 5%, about 10%, about 25%, about 50% or about 75% by weight of the R-22 from the existing system and replacing it with the heat transfer compositions of the invention The composition of the invention is alternatively provided to replace R-22 in refrigeration systems. Thus, each of the heat transfer compositions as described herein, including heat transfer compositions that include any one of Refrigerants 1-22 can be used to replace R-22 in any one of the systems disclosed herein.

There is therefore provided a method of using Refrigerant 1 to replace R-22 as a replacement in a heat transfer system designed to contain or suitable for use with R-22 refrigerant.

There is therefore provided a method of using Refrigerant 6 to replace R-22 as a replacement in a heat transfer system designed to contain or suitable for use with R-22 refrigerant.

There is therefore provided a method of using Refrigerant 9 to replace R-22 as a replacemnt in a heat transfer system designed to contain or suitable for use with R-22 refrigerant.

There is therefore provided a method of using Refrigerant 16 to replace R-22 as a replacement in a heat transfer system designed to contain or suitable for use with R-22 refrigerant.

There is therefore provided a method of using Refrigerant 19 to replace R-22 as a replacemnt in a heat transfer system designed to contain or suitable for use with R-22 refrigerant.

There is therefore provided a method of using Refrigerant 1 to replace R-404A as a replacement in a heat transfer system designed to contain or suitable for use with R-404A refrigerant.

There is therefore provided a method of using Refrigerant 6 to replace R-404 as a replacement in a heat transfer system designed to contain or suitable for use with R-404A refrigerant.

There is therefore provided a method of using Refrigerant 9 to replace R-404A as a replacement in a heat transfer system designed to contain or suitable for use with R-404A refrigerant.

There is therefore provided a method of using Refrigerant 16 to replace R-404 as a replacement in a heat transfer system designed to contain or suitable for use with R-404A refrigerant.

There is therefore provided a method of using Refrigerant 19 to replace R-404A as a replacement in a heat transfer system designed to contain or suitable for use with R-404A refrigerant.

The present invention relates to the use in a medium or low temperature refrigeration system of Refrigerant 1, wherein the Refrigerant 1
(a) has an efficiency (COP) from about 95% to about 105% of the efficiency of R-22 in said system; and
(b) is non-flammable as determined in accordance with the Non-Flammability Test.

The present invention relates to the use of in a medium or low temperature refrigeration system of Refrigerant 6 wherein the Refrigerant 6

(a) has an efficiency (COP) from about 95% to about 105% of the efficiency of R22 in said system and/or used in said method; and
(b) is non-flammable as determined in accordance with the Non-Flammability Test.

The present invention relates to the use of in a medium or low temperature refrigeration system of Refrigerant 9 wherein the Refrigerant 9
(a) has an efficiency (COP) from about 95% to about 105% of the efficiency of R22 in said system and/or used in said method; and
(b) is non-flammable as determined in accordance with the Non-Flammability Test.

The present invention relates to the use of in a medium or low temperature refrigeration system of Refrigerant 16 wherein the Refrigerant 16
(a) has an efficiency (COP) from about 95% to about 105% of the efficiency of R22 in said system and/or used in said method; and
(b) is non-flammable as determined in accordance with the Non-Flammability Test.

The present invention relates to the use of in a medium or low temperature refrigeration system of Refrigerant 19 wherein the Refrigerant 19
(a) has an efficiency (COP) from about 95% to about 105% of the efficiency of R22 in said system and/or used in said method; and
(b) is non-flammable as determined in accordance with the Non-Flammability Test.

EXAMPLES

The refrigerant compositions identified in Table 1 below were analyzed as described herein. Each composition was subjected to thermodynamic analysis to determine its ability to match the operating characteristics of R-22 or R-404A in various refrigeration systems.

The analysis was performed using experimental data collected for properties of various binary pairs of components used in the composition. The vapor/liquid equilibrium behavior of $CF_3I$ was determined and studied in a series of binary pairs with each of HFO-1234ze, HFC-32, and HFC-125. The composition of each binary pair was varied over a series of relative percentages in the experimental evaluation and the mixture parameters for each binary par were regressed to the experimentally obtained data. Vapor/liquid equilibrium behavior data for binary pairs HFC-32 and HFC-125, HFC-32 and HFO-1234ze, and HFC-125 and HFO-1234ze available in the National Institute of Science and Technology (NIST) Reference Fluid Thermodynamic and Transport Properties Database software (Refprop 9.1 NIST Standard Database 2013) were used for the Examples. Theparameters selected for conducting the analysis were: same compressor displacement for all refrigerants, same operating conditions for all refrigerants, same compressor isentropic and volumetric efficiency for all refrigerants. In each Example, simulations were conducted using the measured vapor liquid equilibrium data. The simulation results are reported for each Example.

TABLE 1

Refrigerants evaluated for Performance Examples

| Refrigerant | R32 (wt %) | R125 (wt %) | CF3I (wt %) | R1234yf (wt %) | R1234ze (wt %) | GWP | Flammability |
|---|---|---|---|---|---|---|---|
| A1 | 22% | 4% | 58% | 0 | 16% | 289 | Non-Flammable |
| A2 | 22% | 4% | 54% | 0 | 20% | 289 | Non-Flammable |
| A3 | 20% | 4% | 46% | 0 | 30% | 276 | Non-Flammable |
| B1 | 20 | 4 | 53 | 23 | 0 | 276 | Non-Flammable |
| B2 | 20 | 4 | 61 | 15 | 0 | 276 | Non-Flammable |
| B3 | 20 | 4 | 54 | 25 | 0 | 256 | Non-Flammable |

Example 1—Residential Air-Conditioning System (Cooling)

A residential air-conditioning system used to supply cool air (26.7° C.) to buildings in the summer is tested. Refrigerants A1, A2, and A3 were used in a simulation of a residential air-conditioning system as described above and the performance results are reported in Table 2 below. Operating conditions were: Condensing temperature=46° C.; Condenser sub-cooling=5.5° C.; Evaporating temperature=7° C.; Evaporator Superheat=5.5° C.; Isentropic Efficiency=70%; Volumetric Efficiency=100%; and Temperature Rise in Suction Line=5.5° C.

TABLE 2

Performance in Residential Air-Conditioning System (Cooling)

| Refrigerant | Capacity (% of R22) | Efficiency (% of R22) | Power Consumption (% of R22) | Compresssor Pressure ratio (% of R22) | Discharge Temperature (° C.) |
|---|---|---|---|---|---|
| R22 | 100% | 100% | 100% | 100% | 86.9 |
| A1 | 102% | 98% | 109% | 102% | 87.7 |
| A2 | 103% | 97% | 109% | 103% | 86.6 |
| A3 | 97% | 99% | 98% | 104% | 83.8 |

As shown in Table 2, Refrigerants A1 to A3 show 95% or higher capacity and efficiency compared to R22. Furthermore, Refrigerants A1 to A3 show 110% or lower power consumption compared to R22 indicating that the same R22 compressor electric motor can be used, and compressor pressure ratios of 95 to 105% of R22 indicate that no changes on R22 compressor are needed. Refrigerants A1 to A3 show a discharge temperature of less than 120° C., indicating good compressor reliability.

Example 2—Residential Air-Conditioning System (High Ambient)

A residential air-conditioning system used to supply cool air (26.7° C.) to buildings in the summer is tested using refrigerants A1, A2, and A3 and the performance results are reported in Table 3. Operating conditions were: Condensing temperature=63.4° C.; Condenser sub-cooling=5.5° C.; Evaporating temperature=14.9° C.; Evaporator Superheat=5.5° C.; Isentropic Efficiency=63%; Volumetric Efficiency=100%; Temperature Rise in Suction Line=5.5° C.

TABLE 3

Performance in Residential Air-Conditioning System (Cooling)

| Refrigerant | Capacity (% of R22) | Efficiency (% of R22) | Power Consumption (% of R22) | Compressor Pressure ratio (% of R22) | Discharge Temperature (° C.) |
|---|---|---|---|---|---|
| R22 | 100% | 100% | 100% | 100% | 111.6 |
| A1 | 102% | 96% | 106% | 104% | 113.0 |
| A2 | 100% | 96% | 104% | 104% | 111.6 |
| A3 | 94% | 97% | 97% | 105% | 108.0 |

As shown in Table 3, Refrigerants A1 to A3 show 95% or higher capacity and efficiency compared to R22. Furthermore, Refrigerants A1 to A3 show 110% or lower power consumption compared to R22 indicating that the same R22 compressor electric motor can be used, and compressor pressure ratios of 95 to 105% of R22 indicate that no changes on R22 compressor are needed. Refrigerants A1 to A3 show a discharge temperature of less than 120° C., indicating good compressor reliability.

Example 3—Residential Heat Pump System (Heating)

Residential heat pump system is used to supply warm air (21.1° C.) to buildings in the winter. Refrigerants A1, A2, and A3 were used in a simulation of a residential heat pump system as described above and the performance results are in Table 4 below. Operating conditions were: Condensing temperature=41° C.; Condenser sub-cooling=5.5° C.; Evaporating temperature=0.5° C.; Evaporator Superheat=5.5° C.; Isentropic Efficiency=70%; Volumetric Efficiency=100%; and Temperature Rise in Suction Line=5.5° C.

TABLE 4

Performance in Residential Heat pump System (Heating)

| Refrigerant | Capacity (% of R22) | Efficiency (% of R22) | Power Consumption (% of R22) | Compressor Pressure ratio (% of R22) | Discharge Temperature (° C.) |
|---|---|---|---|---|---|
| R22 | 100% | 100% | 100% | 100% | 85.2 |
| A1 | 105% | 98% | 107% | 102% | 85.8 |
| A2 | 103% | 98% | 105% | 102% | 84.6 |
| A3 | 96% | 99% | 97% | 104% | 81.7 |

As shown in Table 3, Refrigerants A1 to A3 show 95% or higher capacity and efficiency compared to R22. Furthermore, Refrigerants A1 to A3 show 110% or lower power consumption compared to R22 indicating that the same R22 compressor electric motor can be used, and compressor pressure ratios of 95 to 105% of R22 indicate that no changes on R22 compressor are needed. Refrigerants A1 to A3 show a discharge temperature of less than 120° C., indicating good compressor reliability.

Example 4—Commercial Air-Conditioning System—Chiller

A commercial air-conditioning system (chiller) used to supply chilled water (7° C.) to large buildings (such as office and hospital buildings) is tested and the performance results are reported in Table 5. Operating conditions were: Condensing temperature=46° C.; Condenser sub-cooling=5.5° C.; Evaporating temperature=4.5° C.; Evaporator Superheat=5.5° C.; Isentropic Efficiency=70%; Volumetric Efficiency=100%; and Temperature Rise in Suction Line=2° C.

TABLE 5

Performance in Commercial Air-Conditioning System - Air-Cooled Chiller

| Refrigerant | Capacity (% of R22) | Efficiency (% of R22) | Power Consumption (% of R22) | Compressor Pressure ratio (% of R22) | Discharge Temperature (° C.) |
|---|---|---|---|---|---|
| R22 | 100% | 100% | 100% | 100% | 85.5 |
| A1 | 104% | 98% | 107% | 102% | 86.4 |
| A2 | 103% | 98% | 105% | 103% | 85.2 |
| A3 | 96% | 99% | 97% | 104% | 82.3 |

As shown in Table 5, Refrigerants A1 to A3 show 95% or higher capacity and efficiency compared to R22. Furthermore, Refrigerants A1 to A3 show 110% or lower power consumption compared to R22 indicating that the same R22 compressor electric motor can be used, and compressor pressure ratios of 95 to 105% of R22 indicate that no changes on R22 compressor are needed. Refrigerants A1 to A3 show a discharge temperature of less than 120° C., indicating good compressor reliability.

Example 5—Residential Air-to-Water Heat Pump Hydronic System

A residential air-to-water heat pump hydronic system used to supply hot water (50° C.) to buildings for floor heating or similar applications in the winter is tested with Refrigerants A1, A2, and A3 and the performance results are reported in Table 6. Operating conditions were: Condensing temperature=60° C.; Condenser sub-cooling=5.5° C.; Evaporating temperature=0.5° C.; Evaporator Superheat=5.5° C.; Isentropic Efficiency=70%; Volumetric Efficiency=100%; and Temperature Rise in Suction Line=2° C.

TABLE 6

Performance in Residential Air-to-Water Heat Pump Hydronic System

| Refrigerant | Capacity (% of R22) | Efficiency (% of R22) | Power Consumption (% of R22) | Compressor Pressure ratio (% of R22) | Discharge Temperature (° C.) |
|---|---|---|---|---|---|
| R22 | 100% | 100% | 100% | 100% | 111.6 |
| A1 | 101% | 96% | 105% | 104% | 111.0 |
| A2 | 99% | 96% | 103% | 105% | 109.3 |
| A3 | 92% | 97% | 95% | 108% | 104.9 |

As shown in Table 6, Refrigerants A1 to A3 show 95% or higher capacity and efficiency compared to R22. Furthermore, Refrigerants A1 to A3 show 110% or lower power consumption compared to R22 indicating that the same R22 compressor electric motor can be used, and compressor pressure ratios of 95 to 105% of R22 indicate that no changes on R22 compressor are needed. Refrigerants A1 to A3 show a discharge temperature of less than 120° C., indicating good compressor reliability.

Example 6—Medium Temperature Refrigeration System

A medium temperature refrigeration system used to chill the food or beverage such as in refrigerator and bottle cooler is tested with refrigerants A1, A2, and and the performance results are reported in Table 7. Operating conditions were: Condensing temperature=40.6° C.; Condenser sub-cooling=0° C. (system with receiver); Evaporating temperature=−6.7° C.; Evaporator Superheat=5.5° C.; Isentropic Efficiency=70%; Volumetric Efficiency=100%; Degree of superheat in the suction line=19.5° C.

TABLE 7

Performance in Medium Temperature Refrigeration System

| Refrigerant | Capacity (% of R22) | Efficiency (% of R22) | Power Consumption (% of R22) | Comprssor Pressure ratio (% of R22) | Discharge Temperature (° C.) |
|---|---|---|---|---|---|
| R22 | 100% | 100% | 100% | 100% | 108.0 |
| R404A | 97% | 86% | 112% | 97% | 80.2 |
| A1 | 103% | 97% | 106% | 103% | 112.3 |
| A2 | 101% | 97% | 104% | 104% | 109.7 |
| A3 | 94% | 97% | 96% | 106% | 108.3 |

As shown in Table 7, Refrigerants A1 to A3 show 95% or higher capacity and efficiency compared to R22. Furthermore, Refrigerants A1 to A3 show 110% or lower power consumption compared to R22 indicating that the same R22 compressor electric motor can be used, and compressor pressure ratios of 95 to 105% of R22 indicate that no changes on R22 compressor are needed. Refrigerants A1 to A3 show a discharge temperature of less than 120° C., indicating good compressor reliability.

Example 7—Low Temperature Refrigeration System

A low temperature refrigeration system used to freeze the food such as in ice cream machine and freezer is tested using refrigerants A1, A2, and A3 and the performance results are in Table 8. Operating conditions were: Condensing temperature=40.6° C.; Condenser sub-cooling=0° C. (system with receiver); Evaporating temperature=−28.9° C.; Degree of superheat at evaporator outlet=5.5° C.; Isentropic Efficiency=65%; Volumetric Efficiency=100%; Degree of superheat in the suction line=44.4° C.

TABLE 8

Performance in Low Temperature Refrigeration System

| Refrigerant | Capacity (% of R22) | Efficiency (% of R22) | Power Consumption (% of R22) | Compressor Pressure ratio (% of R22) | Discharge Temperature (° C.) |
|---|---|---|---|---|---|
| R22 | 100% | 100% | 100% | 100% | 177.0 |
| R404A | 91% | 81% | 113% | 96% | 123.5 |
| A1 | 100% | 96% | 104% | 104% | 172.0 |
| A2 | 98% | 96% | 102% | 105% | 169.3 |
| A3 | 89% | 96% | 92% | 110% | 162.3 |

As shown in Table 8, Refrigerants A1 to A3 show 95% or higher capacity and efficiency compared to R22. Furthermore, Refrigerants A1 to A3 show 110% or lower power consumption compared to R22 indicating that the same R22 compressor electric motor can be used, and compressor pressure ratios of 95 to 105% of R22 indicate that no changes on R22 compressor are needed.

Example 8—Residential Air-Conditioning System (Cooling)

A residential air-conditioning system used to supply cool air (26.7° C.) to buildings in the summer is tested. Refrigerants B1, B2, and B3 were used in a simulation of a residential air-conditioning system as described above and the performance results compared to R22 are reported in Table 9. Operating conditions were: Condensing temperature=46° C.; Condenser sub-cooling=5.5° C.; Evaporating temperature=7° C.; Evaporator Superheat=5.5° C.; Isentropic Efficiency=70%; Volumetric Efficiency=100%; and Temperature

TABLE 9

Performance in Residential Air-Conditioning System (Cooling)

| Refrigerant | Capacity (% of R22) | Efficiency (% of R22) | Power Consumption (% of R22) | Compressor Pressure ratio (% of R22) | Discharge Temperature (° C.) |
|---|---|---|---|---|---|
| R22 | 100% | 100% | 100% | 100% | 86.9 |
| B1 | 104% | 97% | 107% | 101% | 83.7 |
| B2 | 105% | 97% | 108% | 101% | 86.6 |
| B3 | 99% | 98% | 100% | 102% | 82.3 |

As shown in Table 9, Refrigerants B1 to B3 show 95% or higher capacity and efficiency compared to R22. Furthermore, Refrigerants B1 to B3 show 110% or lower power consumption compared to R22 indicating that the same R22 compressor electric motor can be used, and compressor pressure ratios of 102% or less of R22 indicate that no changes on R22 compressor are needed. Refrigerants B1 to B3 show a discharge temperature of less than 120° C., indicating good compressor reliability.

Example 9—Residential Air-Conditioning System (High Ambient)

A residential air-conditioning system used to supply cool air (26.7° C.) to buildings in the summer is tested using refrigerants B1, B2, and B3 were used in this simulation of a residential air-conditioning system as described above and the performance results compared to R22 are in Table 10. Operating conditions were: Condensing temperature=63.4° C.; Condenser sub-cooling=5.5° C.; Evaporating temperature=14.9° C.; Evaporator Superheat=5.5° C.; Isentropic Efficiency=63%; Volumetric Efficiency=100%; Temperature Rise in Suction Line=5.5° C.

TABLE 10

Performance in Residential Air-Conditioning System (Cooling)

| Refrigerant | Capacity (% of R22) | Efficiency (% of R22) | Power Consumption (% of R22) | Compressor Pressure ratio (% of R22) | Discharge Temperature (° C.) |
|---|---|---|---|---|---|
| R22 | 100% | 100% | 100% | 100% | 111.6 |
| B1 | 99% | 94% | 106% | 103% | 108.1 |
| B2 | 101% | 94% | 107% | 103% | 111.8 |
| B3 | 96% | 97% | 100% | 103% | 106.4 |

As shown in Table 11, Refrigerants B1 to B3 show 94% or higher capacity and efficiency compared to R22. Furthermore, Refrigerants A1 to A3 show 110% or lower power consumption compared to R22 indicating that the same R22 compressor electric motor can be used, and compressor pressure ratios of 95 to 105% of R22 indicate that no changes on R22 compressor are needed. Refrigerants A1 to A3 show a discharge temperature of less than 120° C., indicating good compressor reliability.

Example 10—Residential Heat Pump System (Heating)

A residential heat pump system used to supply warm air (21.1° C.) to buildings in the winter is tested with refrigerants B1, B2, and B3 were used in this simulation of a residential heat pump system and the performance results compared to R22 are in Table 11. Operating conditions were: Condensing temperature=41° C.; Condenser sub-cooling=5.5° C.; Evaporating temperature=0.5° C.; Evaporator Superheat=5.5° C.; Isentropic Efficiency=70%; Volumetric Efficiency=100%; and Temperature Rise in Suction Line=5.5° C.

TABLE 11

Performance in Residential Heat pump System (Heating)

| Refrigerant | Capacity (% of R22) | Efficiency (% of R22) | Power Consumption (% of R22) | Compressor Pressure ratio (% of R22) | Discharge Temperature (° C.) |
|---|---|---|---|---|---|
| R22 | 100% | 100% | 100% | 100% | 85.2 |
| B1 | 104% | 97% | 107% | 101% | 81.4 |
| B2 | 105% | 97% | 108% | 101% | 84.6 |
| B3 | 99% | 98% | 101% | 102% | 80.0 |

As shown in Table 11, Refrigerants B1 and B2 show 95% or higher capacity and efficiency compared to R22. Furthermore, Refrigerants B1 to B3 show 110% or lower power consumption compared to R22 indicating that the same R22 compressor electric motor can be used, and compressor pressure ratios of 95 to 105% of R22 indicate that no changes on R22 compressor are needed. Refrigerants B1 to B3 show a discharge temperature of less than 120° C., indicating good compressor reliability.

Example 11—Commercial Air-Conditioning System—Chiller

A commercial air-conditioning system (chiller) used to supply chilled water (7° C.) to large buildings (such as office and hospital buildings) is with refrigerants B1, B2 and B3 tested and the performance results are reported in Table 12. Operating conditions were: Condensing temperature=46° C.; Condenser sub-cooling=5.5° C.; Evaporating temperature=4.5° C.; Evaporator Superheat=5.5° C.; Isentropic Efficiency=70%; Volumetric Efficiency=100%; and Temperature Rise in Suction Line=2° C.

TABLE 12

Performance in Commercial Air-Conditioning System - Air-Cooled Chiller

| Refrigerant | Capacity (% of R22) | Efficiency (% of R22) | Power Consumption (% of R22) | Compressor Pressure ratio (% of R22) | Discharge Temperature (° C.) |
|---|---|---|---|---|---|
| R22 | 100% | 100% | 100% | 100% | 85.5 |
| B1 | 103% | 97% | 109% | 101% | 82.2 |
| B2 | 105% | 97% | 108% | 101% | 85.3 |
| B3 | 99% | 98% | 100% | 102% | 80.7 |

As shown in Table 12, Refrigerants B1 to B3 show 95% or higher capacity and efficiency compared to R22. Furthermore, Refrigerants B1 to B3 show 110% or lower power consumption compared to R22 indicating that the same R22 compressor electric motor can be used, and compressor pressure ratios of 95 to 105% of R22 indicate that no changes on R22 compressor are needed. Refrigerants B1 to B3 show a discharge temperature of less than 120° C., indicating good compressor reliability.

Example 12—Residential Air-to-Water Heat Pump Hydronic System

A residential air-to-water heat pump hydronic system used to supply hot water (50° C.) to buildings for floor heating or similar applications in the winter is tested with refrigerants B1, B2, and B3 and the performance results are reported in Table 13. Operating conditions were: Condensing temperature=60° C.; Condenser sub-cooling=5.5° C.; Evaporating temperature=0.5° C.; Evaporator Superheat=5.5° C.; Isentropic Efficiency=70%; Volumetric Efficiency=100%; and Temperature Rise in Suction Line=2° C.

TABLE 13

Performance in Residential Air-to-Water Heat Pump Hydronic System

| Refrigerant | Capacity (% of R22) | Efficiency (% of R22) | Power Consumption (% of R22) | Compressor Pressure ratio (% of R22) | Discharge Temperature (° C.) |
|---|---|---|---|---|---|
| R22 | 100% | 100% | 100% | 100% | 111.6 |
| B1 | 98% | 94% | 105% | 103% | 105.1 |
| B2 | 100% | 95% | 106% | 103% | 109.4 |
| B3 | 93% | 95% | 99% | 104% | 102.9 |

As shown in Table 13, refrigerant B2 shows a 95% or higher capacity and efficiency compared to R22. Furthermore, Refrigerants B1 to B3 show 110% or lower power consumption compared to R22 indicating that the same R22 compressor electric motor can be used, and compressor pressure ratios of 95 to 105% of R22 indicate that no changes on R22 compressor are needed. Refrigerants B1 to B3 show a discharge temperature of less than 120° C., indicating good compressor reliability.

Example 13—Medium Temperature Refrigeration System

A medium temperature refrigeration system used to chill the food or beverage such as in refrigerator and bottle cooler is tested with refrigerants B1, B2 and B3 and the performance results are reported in Table 14. Operating conditions were: Condensing temperature=40.6° C.; Condenser sub-cooling=0° C. (system with receiver); Evaporating temperature=−6.7° C.; Evaporator Superheat=5.5° C.; Isentropic Efficiency=70%; Volumetric Efficiency=100%; Degree of superheat in the suction line=19.5° C.

TABLE 14

Performance in Medium Temperature Refrigeration System

| Refrigerant | Capacity (% of R22) | Efficiency (% of R22) | Power Consumption (% of R22) | Compressor Pressure ratio (% of R22) | Discharge Temperature (° C.) |
|---|---|---|---|---|---|
| R22 | 100% | 100% | 100% | 100% | 108.0 |
| R404A | 97% | 86% | 112% | 97% | 80.2 |
| B1 | 102% | 96% | 106% | 102% | 102.0 |
| B2 | 103% | 96% | 108% | 102% | 106.0 |
| B3 | 97% | 96% | 101% | 102% | 100.0 |

As shown in Table 14, Refrigerants B1-B3 show 95% or higher capacity and efficiency compared to R22. Furthermore, Refrigerants B1 to B3 show 110% or lower power consumption compared to R22 indicating that the same R22 compressor electric motor can be used, and compressor pressure ratios of 95 to 105% of R22 indicate that no changes on R22 compressor are needed. Refrigerants A1 to A3 show a discharge temperature of less than 120° C., indicating good compressor reliability.

Example 14—Low Temperature Refrigeration System

A low temperature refrigeration system used to freeze the food such as in ice cream machine and freezer is tested using refrigerants B1, B2, and B3, and the performance results are in Table 15. Operating conditions were: Condensing temperature=40.6° C.; Condenser sub-cooling=0° C. (system with receiver); Evaporating temperature=−28.9° C.; Degree of superheat at evaporator outlet=5.5° C.; Isentropic Efficiency=65%; Volumetric Efficiency=100%; Degree of superheat in the suction line=44.4° C.

TABLE 15

Performance in Low Temperature Refrigeration System

| Refrigerant | Capacity (% of R22) | Efficiency (% of R22) | Power Consumption (% of R22) | Compressor Pressure ratio (% of R22) | Discharge Temperature (° C.) |
|---|---|---|---|---|---|
| R22 | 100% | 100% | 100% | 100% | 177.0 |
| R404A | 91% | 81% | 113% | 96% | 123.5 |
| B1 | 97% | 96% | 107% | 103% | 161.1 |
| B2 | 99% | 96% | 106% | 103% | 168.4 |
| B3 | 91% | 97% | 96% | 105% | 157.4 |

As shown in Table 15, Refrigerants B1 and B2 show 95% or higher capacity and efficiency compared to R22. Furthermore, Refrigerants B1 to B3 show 110% or lower power consumption compared to R22 indicating that the same R22 compressor electric motor can be used, and compressor pressure ratios of 95 to 105% of R22 indicate that no changes on R22 compressor are needed.

Numbered Embodiment 1

A refrigerant comprising at least about 98.5% by weight of the following four compounds, with each compound being present in the following relative percentages:
36.8 to 72% by weight trifluoroiodomethane ($CF_3I$);
2 to 36% by weight of tetrafluoropropene selected from trans-1,3,3,3-tetrafluoropropene (HFO-1234ze(E), 2,3,3,3-tetrafluoropropene (HFO-1234yf) and combinations of these;
15 to 31% by weight difluoromethane (HFC-32); and
1 to 4.5% by weight pentafluoroethane (HFC-125).

Numbered Embodiment 2

A refrigerant comprising at least about 98.5% by weight of the following four compounds, with each compound being present in the following relative percentages:
36.8 to 64.8% by weight trifluoroiodomethane ($CF_3I$);
8 to 36% by weight of trans-1,3,3,3-tetrafluoropropene (HFO-1234ze(E);
17 to 31% by weight difluoromethane (HFC-32); and
1 to 4.2% by weight pentafluoroethane (HFC-125).

Numbered Embodiment 3

A refrigerant comprising at least about 98.5% by weight of the following four compounds in the relative amounts set forth below:
36.8 to 64.8% by weight trifluoroiodomethane ($CF_3I$);
8 to 36% by weight 1,3,3,3-tetrafluoropropene (HFO-1234ze);
17 to 23% by weight difluoromethane (HFC-32); and
1 to 4.2% by weight pentafluoroethane (HFC-125).

Numbered Embodiment 4

A refrigerant consisting essentially of:
36.8 to 64.8% by weight trifluoroiodomethane ($CF_3I$);
8 to 36% by weight 1,3,3,3-tetrafluoropropene (HFO-1234ze);
17 to 23% by weight difluoromethane (HFC-32); and
1 to 4.2% by weight pentafluoroethane (HFC-125) with the percentages being based on the total weight of the four compounds Numbered Embodiment 5

A refrigerant consisting of:
36.8 to 64.8% by weight trifluoroiodomethane ($CF_3I$);
8 to 36% by weight 1,3,3,3-tetrafluoropropene (HFO-1234ze);
17 to 23% by weight difluoromethane (HFC-32); and
1 to 4.2% by weight pentafluoroethane (HFC-125)

Numbered Embodiment 6

A refrigerant comprising at least about 98.5% by weight of the following four compounds, with each compound being present in the following relative percentages:
about 42 to about 60% by weight trifluoroiodomethane ($CF_3I$);
about 12 to about 30% by weight trans-1,3,3,3-tetrafluoropropene (HFO-1234ze(E));
about 18 to about 20% by weight difluoromethane (HFC-32); and
2 to 4.2% by weight pentafluoroethane (HFC-125).

Numbered Embodiment 7

A refrigerant consisting essentially of the following four compounds, with each compound being present in the following relative percentages:
about 42 to about 60% by weight trifluoroiodomethane ($CF_3I$);
about 12 to about 30% by weight trans-1,3,3,3-tetrafluoropropene (HFO-1234ze(E));
about 18 to about 20% by weight difluoromethane (HFC-32); and
2 to 4.2% by weight pentafluoroethane (HFC-125).

Numbered Embodiment 8

A refrigerant consisting of the following four compounds, with each compound being present in the following relative percentages:
about 42 to about 60% by weight trifluoroiodomethane (CF3I);
about 12 to about 30% by weight trans-1,3,3,3-tetrafluoropropene (HFO-1234ze(E));
about 18 to about 20% by weight difluoromethane (HFC-32); and
2 to 4.2% by weight pentafluoroethane (HFC-125).

Numbered Embodiment 9

The refrigerant of numbered embodiment 1 wherein the refrigerant of four compounds is:
about 58% by weight trifluoroiodomethane ($CF_3I$);
about 16% by weight 1,3,3,3-tetrafluoropropene (HFO-1234ze);
22±1% by weight difluoromethane (HFC-32); and
4±0.5% by weight pentafluoroethane (HFC-125).
with the percentages being based on the total weight of the four compounds.

Numbered Embodiment 10

The refrigerant of numbered embodiment 9 consisting essentially of about 58% by weight trifluoroiodomethane ($CF_3I$);
about 16% by weight 1,3,3,3-tetrafluoropropene (HFO-1234ze);
22±1% by weight difluoromethane (HFC-32); and
4±0.5% by weight pentafluoroethane (HFC-125)
with the percentages being based on the total weight of the four compounds.

Numbered Embodiment 11

The refrigerant of numbered embodiment 9 consisting of about 58% by weight trifluoroiodomethane ($CF_3I$);
about 16% by weight 1,3,3,3-tetrafluoropropene (HFO-1234ze);
22±1% by weight difluoromethane (HFC-32)
4±0.5% by weight pentafluoroethane (HFC-125)

with the percentages being based on the total weight of the four compounds.

Numbered Embodiment 12

A refrigerant consisting essentially of the following four compounds, with each compound being present in the following relative percentages:
about 42 to about 60% by weight trifluoroiodomethane ($CF_3I$);
about 12 to about 30% by weight trans-1,3,3,3-tetrafluoropropene (HFO-1234ze(E));
about 18 to about 20% by weight difluoromethane (HFC-32); and
2 to 4.2% by weight pentafluoroethane (HFC-125), wherein said refrigerant is non-flammable and has a GWP of 400 or less.

Numbered Embodiment 13

A refrigerant comprising at least about 98.5% by weight of the following four compounds, with each compound being present in the following relative percentages:
46 to 72% by weight trifluoroiodomethane ($CF_3I$);
2 to 28% by weight 1,1,1,2-tetrafluoropropene (HFO-1234yf);
15 to 21.5% by weight difluoromethane (HFC-32); and
1 to 4.5% by weight pentafluoroethane (HFC-125).

Numbered Embodiment 14

A refrigerant consisting essentially of the following four compounds, with each compound being present in the following relative percentages:
46 to 72% by weight trifluoroiodomethane ($CF_3I$);
2 to 28% by weight 1,1,1,2-tetrafluoropropene (HFO-1234yf);
15 to 21.5% by weight difluoromethane (HFC-32); and
1 to 4.5% by weight pentafluoroethane (HFC-125).

Numbered Embodiment 15

A refrigerant consisting of the following four compounds, with each compound being present in the following relative percentages:
46 to 72% by weight trifluoroiodomethane ($CF_3I$);
2 to 28% by weight 1,1,1,2-tetrafluoropropene (HFO-1234yf);
15 to 21.5% by weight difluoromethane (HFC-32); and
1 to 4.5% by weight pentafluoroethane (HFC-125).

Numbered Embodiment 16

A refrigerant comprising at least about 98.5% by weight of the following four compounds, with each compound being present in the following relative percentages:
about 50 to about 68% by weight trifluoroiodomethane ($CF_3I$);
about 6 to about 24% by weight 1,1,1,2-tetrafluoropropene (HFO-1234yf);
about 18 to about 21% by weight difluoromethane (HFC-32); and
2 to 4.5% by weight pentafluoroethane (HFC-125).

Numbered Embodiment 17

A refrigerant consisting essentially of the following four compounds, with each compound being present in the following relative percentages:
about 50 to about 68% by weight trifluoroiodomethane ($CF_3I$);
about 6 to about 24% by weight 1,1,1,2-tetrafluoropropene (HFO-1234yf);
about 18 to about 21% by weight difluoromethane (HFC-32); and
2 to 4.5% by weight pentafluoroethane (HFC-125).

Numbered Embodiment 18

A refrigerant consisting of the following four compounds, with each compound being present in the following relative percentages:
about 50 to about 68% by weight trifluoroiodomethane ($CF_3I$);
about 6 to about 24% by weight 1,1,1,2-tetrafluoropropene (HFO-1234yf);
about 18 to about 21% by weight difluoromethane (HFC-32); and
2 to 4.5% by weight pentafluoroethane (HFC-125).

Numbered Embodiment 19

A refrigerant comprising at least about 98.5% by weight of the following four compounds, with each compound being present in the following relative percentages:
about 53% by weight trifluoroiodomethane ($CF_3I$);
about 23% by weight 1,1,1,2-tetrafluoropropene (HFO-1234yf);
20±1% by weight difluoromethane (HFC-32); and
4±0.5% by weight pentafluoroethane (HFC-125).

Numbered Embodiment 20

A refrigerant consisting essentially of the following four compounds, with each compound being present in the following relative percentages:
about 53% by weight trifluoroiodomethane ($CF_3I$);
about 23% by weight 1,1,1,2-tetrafluoropropene (HFO-1234yf);
20±1% by weight difluoromethane (HFC-32); and
4±0.5% by weight pentafluoroethane (HFC-125).

Numbered Embodiment 21

The present invention relates to a refrigerant consisting of the following four compounds, with each compound being present in the following relative percentages:
about 53% by weight trifluoroiodomethane ($CF_3I$);
about 23% by weight 1,1,1,2-tetrafluoropropene (HFO-1234yf);
20±1% by weight difluoromethane (HFC-32); and
4±0.5% by weight pentafluoroethane (HFC-125).

Numbered Embodiment 22

A refrigerant consisting essentially of the following four compounds, with each compound being present in the following relative percentages:
about 50 to about 68% by weight trifluoroiodomethane ($CF_3I$);
about 6 to about 24% by weight 1,1,1,2-tetrafluoropropene (HFO-1234yf);
about 18 to about 21% by weight difluoromethane (HFC-32); and 2 to 4.5% by weight pentafluoroethane (HFC-125), wherein said refrigerant is non-flammable and has a GWP of 400 or less.

Numbered Embodiment 23

A heat transfer composition comprising a refrigerant of any one of numbered embodiments 1 to 22.

Numbered Embodiment 24

The heat transfer composition as claimed in numbered embodiment 23, wherein the refrigerant comprises greater than 40% by weight of the composition.

Numbered Embodiment 25

The heat transfer composition as claimed in numbered embodiment 23 wherein the refrigerant comprises greater than 50% by weight of the composition.

Numbered Embodiment 26

The heat transfer composition as claimed in numbered embodiment 23, wherein the refrigerant comprises greater than 60% by weight of the composition.

Numbered Embodiment 27

The heat transfer composition as claimed in numbered embodiment 23, wherein the refrigerant comprises greater than 70% by weight of the composition.

Numbered Embodiment 28

The heat transfer composition as claimed in numbered embodiment 23, wherein the refrigerant comprises greater than 80% by weight of the composition.

Numbered Embodiment 29

The heat transfer composition as claimed in numbered embodiment 23, wherein the refrigerant comprises greater than 90% by weight of the composition.

Numbered Embodiment 30

The heat transfer composition as claimed in numbered embodiment 23, wherein the heat transfer composition consists essentially of the refrigerant.

Numbered Embodiment 31

The heat transfer composition as claimed in numbered embodiment 23 wherein the heat transfer composition consists of the refrigerant.

Numbered Embodiment 32

The heat transfer composition of any one of numbered embodiments 15 to 21 wherein said heat transfer composition further comprising a stabilizer selected from a diene-based compound and/or a phenol-based compound and/or a phosphorus compound and/or a nitrogen compound and/or an epoxide and/or an alkylated naphthalene and/or isobutylene.

Numbered Embodiment 33

The heat transfer composition of numbered embodiment 32 wherein the diene based compound is a C3 to C15 diene or a compound formed by reaction of any two or more C3 to C4 dienes.

Numbered Embodiment 34

The heat transfer composition of numbered embodiment 32 wherein the diene based compound is an allyl ether, propadiene, butadiene, isoprene and a terpene.

Numbered Embodiment 35

The heat transfer composition of numbered embodiment 32 wherein the diene based compound is a terpene selected from the group consisting of terebene, retinal, geranoil, terpinene, delta-3 carene, terpinolene, phellandrene, fenchene, myrcene, farnesene, pinene, nerol, citral, camphor, menthol, limonene, nerolidol, phytol, carnosic acid and vitamin $A_1$.

Numbered Embodiment 36

The heat transfer composition of numbered embodiment 35 wherein the diene based compound is farnesene.

Numbered Embodiment 37

The heat transfer composition of any one of numbered embodiments 22 to 36 wherein the diene based compound is provided in the heat transfer composition in an amount of from 0.0001% by weight to about 5% by weight based on the weight of the diene-based compound(s) plus refrigerant in the heat transfer composition.

Numbered Embodiment 38

The heat transfer composition of any one of numbered embodiments 22 to 36 wherein the diene based compound is provided in the heat transfer composition in an amount of from 0.001% by weight to about 2.5% by weight based on the weight of the diene-based compound(s) plus refrigerant in the heat transfer composition.

Numbered Embodiment 39

The heat transfer composition of any one of numbered embodiments 22 to 36 wherein the diene based compound is provided in the heat transfer composition in an amount of from 0.01% to about 1% by weight based on the weight of the diene-based compound(s) plus refrigerant in the heat transfer composition.

Numbered Embodiment 40

The heat transfer composition of any of numbered embodiments 32 to 39 wherein the phosphorus compound is a phosphite or a phosphate compound.

Numbered Embodiment 41

The heat transfer composition of numbered embodiment 40, wherein the phosphite compound is selected from a diaryl, dialkyl, triaryl and/or trialkyl phosphite, and/or a mixed aryl/alkyl di- or tri-substituted phosphite, or one or more compounds selected from hindered phosphites, tris-(di-tert-butylphenyl)phosphite, di-n-octyl phophite, iso-octyl diphenyl phosphite, iso-decyl diphenyl phosphite, tri-isodecyl phosphate, triphenyl phosphite and diphenyl phosphite, particularly diphenyl phosphite.

Numbered Embodiment 42

The heat transfer composition of numbered embodiment 40, wherein the phosphate compounds is selected from a triaryl phosphate, trialkyl phosphate, alkyl mono acid phosphate, aryl diacid phosphate, amine phosphate, preferably triaryl phosphate and/or a trialkyl phosphate, particularly tri-n-butyl phosphate.

Numbered Embodiment 43

The heat transfer composition of numbered embodiments 40 to 42 wherein the phosphorus compound is provided in the heat transfer composition in an amount of from 0.0001% by weight to about 5% by weight.

Numbered Embodiment 44

The heat transfer composition of numbered embodiments 40 to 42 wherein the phosphorus compound is provided in the heat transfer composition in an amount of 0.001% by weight to about 2.5% by weight.

Numbered Embodiment 45

The heat transfer composition of numbered embodiments 40 to 42 wherein the phosphorus compound is provided in the heat transfer composition in an amount of from 0.01% to about 1% by weight.

Numbered Embodiment 46

The heat transfer composition of numbered embodiment 40 or 41 wherein the phosphorous compound is diphenyl phosphite.

Numbered Embodiment 47

The heat transfer composition of any one of numbered embodiments 32 to 46 wherein the stabilizer composition comprises a diene based as claimed in any one of numbered embodiment 33 to 39 and a phosphorous compound as claimed in any one of numbered embodiments 40 to 46.

Numbered Embodiment 48

The heat transfer composition of any one of numbered embodiments 32 to 47 wherein the stabilizer composition comprises farnesene and diphenyl phosphite.

Numbered Embodiment 49

The heat transfer composition of any one of numbered embodiments 32 to 48 wherein the stabilizer composition comprises a nitrogen compound selected from diphenylamine, p-phenylenediamine, triethylamine, tributylamine, diisopropylamine, triisopropylamine and triisobutylamine, piperidinyl, piperazinone, or alkyoxypiperidinyl, 2,2,6,6-tetramethyl-4-piperidone, 2,2,6,6-tetramethyl-4-piperidinol; bis-(1,2,2,6,6-pentamethylpiperidyl)sebacate; di(2,2,6,6-tetramethyl-4-piperidyl)sebacate, poly(N-hydroxyethyl-2,2,6, 6-tetramethyl-4-hydroxy-piperidyl succinate; N-phenyl-N'-(1,3-dimethyl-butyl)-p-phenylenediamine N,N'-di-sec-butyl-p-phenylenediamine tallow amines, methyl bis tallow amine and bis tallow amine, or phenol-alpha-napththylamine or Tinuvin®765 (Ciba), BLS®1944 (Mayzo Inc), BLS®1770 (Mayzo Inc, bis (nonylphenyl amine), (N-(1-methylethyl)-2-propylamine, or phenyl-alpha-naphthyl amine (PANA), alkyl-phenyl-alpha-naphthyl-amine (APANA), and bis (nonylphenyl) amine, dinitrobenzene, nitrobenzene, nitromethane, nitrosobenzene, and TEMPO [(2,2,6,6-tetramethylpiperidin-1-yl)oxyl]

Numbered Embodiment 50

The heat transfer composition of any one of numbered embodiments 32 to 48, wherein the nitrogen compound is one or more compounds selected from dinitrobenzene, nitrobenzene, nitromethane, nitrosobenzene, and TEMPO [(2,2,6,6-tetramethylpiperidin-1-yl)oxyl], preferably dinitrobenzene.

Numbered Embodiment 51

The heat transfer composition of any one of numbered embodiments 49 to 50 wherein the nitrogen compound is provided in the heat transfer composition in an amount of from 0.0001% by weight to about 5% by weight wherein percentage by weight refers to the weight of the nitrogen-based compound(s) plus refrigerant in the heat transfer composition.

Numbered Embodiment 52

The heat transfer composition of any one of numbered embodiments 49 to 50 wherein the nitrogen compound is provided in the heat transfer composition in an amount of 0.001% by weight to about 2.5% by weight wherein percentage by weight refers to the weight of the nitrogen-based compound(s) plus refrigerant in the heat transfer composition.

Numbered Embodiment 53

The heat transfer composition of any one of numbered embodiments 49 to 50 wherein the nitrogen compound is provided in the heat transfer composition in an amount of from 0.01% to about 1% by weight wherein percentage by weight refers to the weight of the nitrogen-based compound(s) plus refrigerant in the heat transfer composition.

Numbered Embodiment 54

The heat transfer composition of any one of numbered embodiments 32 to 53 wherein the phenol based compound is one or more selected from 4,4'-methylenebis(2,6-di-tert-butylphenol); 4,4'-bis(2,6-di-tert-butylphenol); 4,4'-bis(2-methyl-6-tert-butylphenol); 2,2'-methylenebis(4-ethyl-6-tertbutylphenol); 2,2'-methylenebis(4-methyl-6-tert-butylphenol); 4,4-butylidenebis(3-methyl-6-tert-butylphenol); 4,4-isopropylidenebis(2,6-di-tert-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-tert-butyl-4-methylphenol (BHT); 2,6-di-tert-butyl-4-ethylphenol: 2,4-dimethyl-6-tert-butylphenol; 2,6-di-tert-alpha-dimethylamino-p-cresol; 2,6-di-tert-butyl-4(N,N'- dimethylaminomethylphenol); 4,4'-thiobis(2-methyl-6-tert-butylphenol); 4,4'-thiobis(3-methyl-6-tert-butylphenol); 2,2'-thiobis(4-methyl-6-tert-butylphenol); bis(3-methyl-4-hydroxy-5-tert-butylbenzyl) sulfide; bis (3,5-di-tert-butyl-4-hydroxybenzyl)sulfide, tocopherol, hydroquinone, 2,2'6,6'-tetra-tert-butyl-4,4'-methylenediphenol and t-butyl hydroquinone.

Numbered Embodiment 55

The heat transfer composition of any one of numbered embodiments 32 to 54 wherein the phenol compound is BHT.

Numbered Embodiment 56

The heat transfer composition of any one of numbered embodiment 32 to 55 wherein the phenol compound is provided in the heat transfer composition in an amount of from 0.0001% by weight to about 5%, wherein the percentage by weight refers to the weight of the phenol-based compound(s) plus refrigerant in the heat transfer composition.

Numbered Embodiment 57

The heat transfer composition of any one of numbered embodiment 32 to 55 wherein the phenol compound is provided in the heat transfer composition in an amount of 0.001% by weight to about 2.5% by weight, wherein the percentage by weight refers to the weight of the phenol-based compound(s) plus refrigerant in the heat transfer composition.

Numbered Embodiment 58

The heat transfer composition of any one of numbered embodiment 32 to 55 wherein the phenol compound is provided in the heat transfer composition in an amount of from 0.01% to about 1% by weight, wherein the percentage by weight refers to the weight of the phenol-based compound(s) plus refrigerant in the heat transfer composition.

Numbered Embodiment 59

The heat transfer composition of any one of numbered embodiments 32 to 58 wherein the phenol compound is BHT, wherein said BHT is present in an amount of from about 0.0001% by weight to about 5% by weight based on the weight of heat transfer composition.

Numbered Embodiment 60

The heat transfer composition any one of numbered embodiments 32 to 59 comprising a stabilizer composition comprising farnesene, diphenyl phosphite and BHT, wherein the farnesene is provided in an amount of from about 0.001% by weight to about 5% by weight based on the weight of the heat transfer composition, the diphenyl phosphite is provided in an amount of from about 0.0001% by weight to about 5% by weight based on the weight of the heat transfer composition and the BHT is provided in an amount of from about 0.0001% by weight to about 5% by weight based on the weight of heat transfer composition.

Numbered Embodiment 61

The heat transfer composition of any one of numbered embodiments 32 to 60 comprising a stabilizer composition comprising an alkylated naphthalene having the structure:

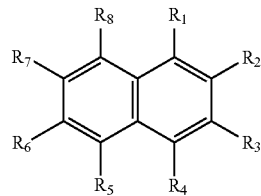

where each $R_1$-$R_8$ is independently selected from linear alkyl group, a branched alkyl group and hydrogen.

Numbered Embodiment 62

The heat transfer composition of any one of numbered embodiments 32 to 61 comprising a stabiliser composition comprising an alkylated naphthalene wherein said alkylated naphthalene is selected from any one of alkylated naphthalene 1 to 5

| Property | Alkylated Naphthalene 1 (AN1) | Alkylated Naphthalene 2 (AN2) | Alkylated Naphthalene 3 (AN3) | Alkylated Naphthalene 4 (AN4) | Alkylated Naphthalene 5 (AN5) |
|---|---|---|---|---|---|
| Viscosity @ 40° C. (ASTM D445), cSt | 20-200 | 20-100 | 20-50 | 30-40 | about 36 |
| Viscosity @ 100° C. (ASTM D445), cSt | 3-20 | 3-10 | 3-8 | 5-7 | about 5.6 |
| Pour Point (ASTM D97), ° C. | −50 to −20 | −45 to −25 | −40 to −30 | −35 to −30 | about −33 | wherein viscosity at 40° C. is measured according to ASTM D445 and wherein the term "about" can mean+/−4 cSt.

wherein viscosity at 100° C. is measured according to ASTM D445 and wherein the term "about" means+/−0.4 cSt.

and wherein pour point is as measured according to ASTM D97 and wherein the term "about" means+/−5° C.

or a stabiliser composition comprising alkylated naphthalene wherein said alkylated naphthalene is selected from any one of alkylated naphthalene 6 to 10

| Property | Alkylated Naphthalene 6 (AN6) | Alkylated Naphthalene 7 (AN7) | Alkylated Naphthalene 8 (AN8) | Alkylated Naphthalene 9 (AN9) | Alkylated Naphthalene 10 (AN10) |
|---|---|---|---|---|---|
| Viscosity @ 40° C. (ASTM D445), cSt | 20-200 | 20-100 | 20-50 | 30-40 | about 36 |
| Viscosity @100° C. (ASTM D445), cSt | 3-20 | 3-10 | 3-8 | 5-7 | about 5.6 |
| Aniline Point (ASTM D611), ° C. | 40-110 | 50-90 | 50-80 | 60-70 | about 36 |
| Noack Volatility CEC L40 (ASTM D6375), wt % | 1-50 | 5-30 | 5-15 | 10-15 | about 12 |
| Pour Point (ASTM D97), ° C. | −50 to −20 | −45 to −25 | −40 to −30 | −35 to −30 | about −33 |
| Flash Point (ASTM D92)), ° C. | 200-300 | 200-270 | 220-250 | 230-240 | about 236 | wherein viscosity at 40° C. is measured according to ASTM D445 and wherein the term "about" can mean+/−4 cSt.

wherein viscosity at 100° C. is measured according to ASTM D445 and wherein the term "about" means+/−0.4 cSt.

and wherein pour point is as measured according to ASTM D97 and wherein the term "about" means+/~5° C.

Numbered Embodiment 63

The heat transfer composition of numbered embodiment 62 wherein said alkylated naphthalene is one or more of NA-LUBE KR-007A; KR-008, KR-009; KR-015; KR-019; KR-005FG; KR-015FG; and KR-029FG.

Numbered Embodiment 64

The heat transfer composition of numbered embodiment 62 wherein said alkylated naphthalene is one or more of NA-LUBE KR-007A; KR-008, KR-009; and KR-005FG.

Numbered Embodiment 65

The heat transfer composition of numbered embodiment 62 wherein said alkylated naphthalene is one or more of NA-LUBE KR-008.

Numbered Embodiment 66

The heat transfer composition of any one of numbered embodiments 32 to 65 wherein said alkylated naphthalene is present in an amount of from 0.01% to about 10% by weight based on the amount of alkylated naphthalene plus refrigerant.

Numbered Embodiment 67

The heat transfer composition of any one of numbered embodiments 32 to 65 wherein said alkylated naphthalene is present in an amount of from 1.5% to about 4.5% by weight based on the amount of alkylated naphthalene plus refrigerant.

Numbered Embodiment 68

The heat transfer composition of any one of numbered embodiments 32 to 65 wherein said alkylated naphthalene is present in an amount of from 2.5% to about 3.5%, by weight based on the amount of alkylated naphthalene plus refrigerant.

Numbered Embodiment 69

The heat transfer composition of any one of numbered embodiments 32 to 65 wherein the stabilizer is isobutylene.

Numbered Embodiment 70

The heat transfer composition of numbered embodiment 69, wherein the isobutylene is present in an amount of from 0.0001% by weight to about 5% by weight, wherein percentage by weight refers to the weight of the isobutylene plus refrigerant in the heat transfer composition.

Numbered Embodiment 71

The heat transfer composition of numbered embodiment 69, wherein the isobutylene is present in an amount of 0.001% by weight to about 2.5% by weight, wherein percentage by weight refers to the weight of the isobutylene plus refrigerant in the heat transfer composition.

Numbered Embodiment 72

The heat transfer composition of numbered embodiment 69, wherein the isobutylene is present in an amount of from 0.01% to about 1% by weight, wherein percentage by weight refers to the weight of the isobutylene plus refrigerant in the heat transfer composition.

Numbered Embodiment 73

The heat transfer composition of numbered embodiments 32 to 72 wherein the stabilizer is an aromatic epoxide, an alkyl epoxide or an alkylene epoxide.

Numbered Embodiment 74

The heat transfer composition of any one of numbered embodiments 32 to 73, wherein the stabilizer comprises a diene based compound as defined in any one of numbered embodiments 33 to 39 and an alkylated naphthalene as defined in any one of numbered embodiments 61 to 68.

Numbered Embodiment 75

The heat transfer composition of any one of numbered embodiments 32 to 73, wherein the stabilizer comprises a diene based compound as defined in any one of numbered embodiments 33 to 39, a phenol based compound as defined in any one of numbered embodiments 54 to 60 and an alkylated naphthalene as defined in any one of numbered embodiments 61 to 68.

Numbered Embodiment 76

The heat transfer composition of numbered embodiment 75, wherein the phenol based compound BHT.

Numbered Embodiment 77

The heat transfer composition of any one of numbered embodiments 32 to 73, wherein the stabilizer comprises isobutylene as defined in any one of numbered embodiments 69 or 70 and an alkylated naphthalene as defined in any one of numbered embodiments 61 to 68.

Numbered Embodiment 78

The heat transfer composition of any one of numbered embodiments 32 to 73, wherein the stabilizer comprises an alkylated naphthalene as defined in any one of numbered embodiments 61 to 68, wherein the alkylated naphthalene is present in an amount of from 0.0001% by weight to about 5% by weight based on the weight of the heat transfer composition Numbered Embodiment 79

The heat transfer composition of any one of numbered embodiments 32 to 73, wherein the stabilizer comprises a farnesene as defined in any one of numbered embodiments 36 to 39, BHT as defined in any one of numbered embodiments 55 to 60 and an alkylated naphthalene as defined in any one of numbered embodiments 61 to 68, wherein the farnesene is provided in an amount of from about 0.0001% by weight to about 5% by weight, the alkylated Naphthalene is provided in an amount of from about 0.0001% by weight to about 10% by weight, and the BHT is provided in an amount of from about 0.0001% by weight to about 5% by weight, with the percentages being based on the weight of the heat transfer composition.

Numbered Embodiment 80

The heat transfer composition of any one of numbered embodiments 32 to 73, wherein the stabilizer comprises a farnesene as defined in any one of numbered embodiments 36 to 39, BHT as defined in any one of numbered embodiments 55 to 60 and an alkylated naphthalene as defined in numbered embodiment 61 to 68, wherein the farnesene is provided in an amount of from 0.001% by weight to about 2.5% by weight, the Alkylated Naphthalene is provided in an amount of from 0.001% by weight to about 10% by weight, and the BHT is provided in an amount of from 0.001% by weight to about 2.5% by weight, with the percentages being based on the weight of the heat transfer composition.

Numbered Embodiment 81

The heat transfer composition of any one of numbered embodiments 32 to 73, wherein the stabilizer comprises a farnesene as defined in any one of numbered embodiments 36 to 39, BHT as defined in any one of numbered embodiments 55 to 60 and an alkylated naphthalene as defined in numbered embodiment 61 to 68, wherein the farnesene is provided in an amount of from 0.001% by weight to about 2.5% by weight, the Alkylated Naphthalene is provided in an amount of from 1.5% by weight to about 4.5% by weight, and the BHT is provided in an amount of from 0.001% by weight to about 2.5% by weight, with the percentages being based on the weight of the heat transfer composition Numbered Embodiment 82

The heat transfer composition of any one of numbered embodiments 23 to 81 further comprising a lubricant selected from the group consisting of polyol esters (POEs), polyalkylene glycols (PAGs), mineral oil, alkylbenzenes (ABs), polyethers (PE), poly(alpha-olefin) (PAO) and polyvinyl ethers (PVE), Numbered Embodiment 83

The heat transfer composition of numbered embodiment 82 wherein the lubricant is a polyol ester (POE).

Numbered Embodiment 84

The heat transfer composition of any one of numbered embodiment 83 to 84 wherein the lubricant is present in the heat transfer composition in an amount of from 5 to 60% by weight.

Numbered Embodiment 85

The heat transfer composition of any one of numbered embodiment 83 to 84 wherein the lubricant is present in the heat transfer composition in an amount of from 30 to 50% by weight.

Numbered Embodiment 86

The heat transfer composition of any one of numbered embodiment 83 to 84 wherein the lubricant is present in the heat transfer composition in an amount of from about 10 to 60% by weight of the system using the heat transfer composition.

Numbered Embodiment 87

The heat transfer composition of any one of numbered embodiment 83 to 84 wherein the lubricant is present in the heat transfer composition in an amount of from about 20 to about 50% by weight of the system using the heat transfer composition.

Numbered Embodiment 88

The heat transfer composition of any one of numbered embodiment 83 to 84 wherein the lubricant is present in the heat transfer composition in an amount of from about 20 to about 40% by weight of the system using the heat transfer composition.

Numbered Embodiment 89

The heat transfer composition of any one of numbered embodiment 83 to 84 wherein the lubricant is present in the heat transfer composition in an amount of from about 20 to about 30% by weight of the system using the heat transfer composition.

Numbered Embodiment 90

The heat transfer composition of any one of numbered embodiment 83 to 84 wherein the lubricant is present in the heat transfer composition in an amount of from about 30 to about 50% by weight of the system using the heat transfer composition.

Numbered Embodiment 91

The heat transfer composition of any one of numbered embodiment 83 to 84 wherein the lubricant is present in the heat transfer composition in an amount of from about 30 to about 40% by weight of the system using the heat transfer composition.

Numbered Embodiment 92

The heat transfer composition of any one of numbered embodiment 83 to 84 wherein the lubricant is present in the heat transfer composition in an amount of from about 5 to about 10% by weight of the system using the heat transfer composition.

Numbered Embodiment 93

The heat transfer composition of any one of numbered embodiment 83 to 84 wherein the lubricant is present in the heat transfer composition in an amount of from around about 8% by weight of the system using the heat transfer composition.

Numbered Embodiment 94

The heat transfer composition of any one of numbered embodiments 83 to 84, wherein the lubricant is a POE lubricant, and the POE lubricant is present in an amount of from about 0.1% by weight to about 5% by weight based on the weight of the heat transfer composition.

Numbered Embodiment 95

The heat transfer composition of any one of numbered embodiments 83 to 84, wherein the lubricant is a POE lubricant, and the POE lubricant is present in an amount of from about 0.1% by weight to about 1% by weight based on the weight of the heat transfer composition.

Numbered Embodiment 96

The heat transfer composition of any one of numbered embodiments 83 to 84, wherein the lubricant is a POE lubricant, and the POE lubricant is present in an amount of from about 0.1% by weight to about 0.5% by weight based on the weight of the heat transfer composition.

Numbered Embodiment 97

The heat transfer composition of any one of numbered embodiments 83 to 84 wherein the lubricant consists essentially of a POE having a viscosity at 40° C. measured in accordance with ASTM D445 of from about 30 to about 70

Numbered Embodiment 98

The heat transfer composition of any one of numbered embodiments 83 to 84 wherein the lubricant consists essentially of a POE having a viscosity at 40° C. measured in accordance with ASTM D445 of from about 30 to about 70 and which is present in an amount of from about 0.1% to about 1% based on the weight of the heat transfer composition.

Numbered Embodiment 99

A heat transfer composition of any one of numbered embodiments 83 to 84 comprising a refrigerant of any one of embodiments 1 to 22, and from about 0.1% to about 5%, of a lubricant, wherein said percentage is based on the weight of the lubricant in the heat transfer composition.

Numbered Embodiment 100

The heat transfer composition of any one of numbered embodiments 83 to 84 wherein the lubricant consists essentially of a POE having a viscosity at 40° C. measured in accordance with ASTM D445 of from about 30 to about 70 and which is present in an amount of from about 0.1% to about 0.5% based on the weight of the heat transfer composition.

Numbered Embodiment 101

The heat transfer composition of any one of numbered embodiments 83 to 84 wherein the lubricant consisting essentially of a POE having a viscosity at 40° C. measured in accordance with ASTM D445 of from about 30 to about 70 and which is present in an amount of from about 0.1% to about 0.5% based on the weight of the heat transfer composition.

Numbered Embodiment 102

The heat transfer composition of any one of numbered embodiments 23 to 31 wherein the heat transfer composition consists essentially of the refrigerant as claimed in any one of numbered embodiment 1 to 22.

Numbered Embodiment 103

The heat transfer composition of any one of numbered embodiments 23 to 31 wherein the heat transfer composition consist essentially of the refrigerant as claimed in any one of claims 1 to 22 and the stabilizer composition as claimed in any one of numbered embodiment 32 to 81.

Numbered Embodiment 104

The heat transfer composition of any one of numbered embodiments 23 to 31 wherein the heat transfer composition consist essentially of the refrigerant as claimed in any one of numbered embodiment 1 to 22, the stabilizer composition as claimed in any one of numbered embodiments 32 to 81 and the lubricant as claimed in any one of numbered embodiment 82 to 101.

Numbered Embodiment 105

The heat transfer composition of any one of numbered embodiments 23 to 104 having a Global Warming Potential (GWP) of less than 400

Numbered Embodiment 106

The heat transfer composition of any one of numbered embodiments 23 to 104 having a Global Warming Potential (GWP) of less than 300.

Numbered Embodiment 107

The heat transfer composition of any one of numbered embodiments 23 to 106 having an Ozone Depletion Potential (ODP) of not greater than 0.05.

Numbered Embodiment 108

The heat transfer composition of any one of numbered embodiments 23 to 106 having an Ozone Depletion Potential (ODP) of not greater than 0.02.

Numbered Embodiment 109

The heat transfer composition of any one of numbered embodiments 23 to 106 having an Ozone Depletion Potential (ODP) of about zero.

Numbered Embodiment 110

The heat transfer composition of any one of numbered embodiments 23 to 109 having an OEL of greater than 400.

Numbered Embodiment 111

A heat transfer system comprising a compressor a condenser, and expansion device and an evaporator in fluid communication, said heat transfer system containing a refrigerant of any one of numbered embodiments 1 to 22 or a heat transfer composition of any one of numbered embodiments 23 to 110.

Numbered Embodiment 112

The heat transfer system of numbered embodiment 111 additionally comprising an vapour injection system including a heat exchanger and a bypass expansion valve to divert a portion of the refrigerant flow at the condenser outlet through the device thereby providing liquid refrigerant to the heat exchanger at a reduced pressure and lower temperature.

Numbered Embodiment 113

The heat transfer system of numbered embodiment 111 additionally comprising a liquid injection system including a bypass valve which diverts a portion of the liquid refrigerant exiting the condenser to the compressor.

Numbered Embodiment 114

The heat transfer system of numbered embodiment 111 additionally comprising a liquid line/suction line heat exchanger.

Numbered Embodiment 115

The heat transfer system of numbered embodiment 111 additionally comprising an oil separator connected to the outlet of the compressor.

Numbered Embodiment 116

A heat transfer system comprising a compressor and lubricant for the compressor in the system, wherein the system comprises a refrigerant of any one of numbered embodiments 1 to 22 and a lubricant of any one of numbered embodiments 82 to 101 wherein the lubricant loading in the system is from about 5% to 60% by weight as a percentage of total lubricant and refrigerant contained in the system.

Numbered Embodiment 117

A heat transfer system of numbered embodiment 116 wherein the lubricant loading in the system is from about 10% to about 60% by weight as a percentage of total lubricant and refrigerant contained in the system.

Numbered Embodiment 118

A heat transfer system of numbered embodiment 116 wherein the lubricant loading in the system is from about 20% to about 50% by weight as a percentage of total lubricant and refrigerant contained in the system.

Numbered Embodiment 119

A heat transfer system of numbered embodiment 116 wherein the lubricant loading in the system is from about 20% to about 40% by weight as a percentage of total lubricant and refrigerant contained in the system.

Numbered Embodiment 120

A heat transfer system of numbered embodiment 116 wherein the lubricant loading in the system is from about 20% to about 30% by weight as a percentage of total lubricant and refrigerant contained in the system.

Numbered Embodiment 121

A heat transfer system of numbered embodiment 116 wherein the lubricant loading in the system is from about 30% to about 50% by weight as a percentage of total lubricant and refrigerant contained in the system.

Numbered Embodiment 122

A heat transfer system of numbered embodiment 116 wherein the lubricant loading in the system is from about 30% to about 40% by weight as a percentage of total lubricant and refrigerant contained in the system.

Numbered Embodiment 123

A heat transfer system of numbered embodiment 116 wherein the lubricant loading in the system is from about 5% to about 10% by weight as a percentage of total lubricant and refrigerant contained in the system.

Numbered Embodiment 124

A heat transfer system of numbered embodiment 116 wherein the lubricant loading in the system is about 8% by weight as a percentage of total lubricant and refrigerant contained in the system.

Numbered Embodiment 125

A heat transfer system comprising a compressor and lubricant for the compressor in the system, wherein the system comprises a refrigerant of any one of numbered embodiments 1 to 22 and a lubricant of any one of numbered embodiments 82 to 101 and an alkylated naphthalene of any one of numbered embodiments 61 to 68, wherein the alkylated naphthalene is present in an amount of from 0.1% to about 20%, where amounts are in percent by weight based on the amount of alkylated naphthalene plus lubricant in the system.

Numbered Embodiment 126

A heat transfer system of numbered embodiment 125 wherein the alkylated naphthalene is present in an amount of from 5% to about 15%, where amounts are in percent by weight based on the amount of alkylated naphthalene plus lubricant in the system.

Numbered Embodiment 127

A heat transfer system of numbered embodiment 125 wherein the alkylated naphthalene is present in an amount of from 8% to about 12%, where amounts are in percent by weight based on the amount of alkylated naphthalene plus lubricant in the system.

Numbered Embodiment 128

A heat transfer system of numbered embodiment 125 wherein the alkylated naphthalene is present in an amount of from 0.1% to about 20%, where amounts are in percent by weight based on the amount of alkylated naphthalene plus lubricant in the system and the lubricant is defined in numbered embodiment 110.

Numbered Embodiment 129

A heat transfer system of numbered embodiment 125 wherein the alkylated naphthalene is present in an amount of from 5% to about 15%, where amounts are in percent by weight based on the amount of alkylated naphthalene plus lubricant in the system.

Numbered Embodiment 130

A heat transfer system of numbered embodiment 125 wherein the alkylated naphthalene is present in an amount of from 8% to about 12%, where amounts are in percent by weight based on the amount of alkylated naphthalene plus lubricant in the system.

Numbered Embodiment 131

A heat transfer system of any one of numbered embodiments 111 to 130 comprising a sequestration material comprising i. copper or a copper alloy, or ii. activated alumina, or iii. a zeolite molecular sieve comprising copper, silver, lead or a combination thereof, or iv. an anion exchange resin, or v. a moisture-removing material, or vi. a combination of two or more of the above.

Numbered Embodiment 132

A heat transfer system of numbered embodiment 131 wherein the copper alloy additionally comprises one or more further metals, selected from tin, aluminum, silicon, nickel or a combination thereof.

Numbered Embodiment 133

A heat transfer system of numbered embodiment 131 or 132 wherein the copper alloy additionally comprises one or more non-metal elements, selected from carbon, nitrogen, silicon, oxygen or a combination thereof.

Numbered Embodiment 134

A heat transfer system of numbered embodiments 131 to 133 wherein the copper alloy comprises at least about 5 wt % of copper, based on the total weight of the copper alloy.

Numbered Embodiment 135

A heat transfer system of numbered embodiment 134 wherein the copper alloy comprises at least about 15 wt % of copper, based on the total weight of the copper alloy.

Numbered Embodiment 136

A heat transfer system of numbered embodiment 134 wherein the copper alloy comprises at least about 30 wt % of copper, based on the total weight of the copper alloy.

Numbered Embodiment 137

A heat transfer system of numbered embodiment 134 wherein the copper alloy comprises at least about 50 wt % of copper, based on the total weight of the copper alloy.

Numbered Embodiment 138

A heat transfer system of numbered embodiment 134 wherein the copper alloy comprises at least about 70 wt % of copper, based on the total weight of the copper alloy.

Numbered Embodiment 139

A heat transfer system of numbered embodiment 134 wherein the copper alloy comprises at least about 90 wt % of copper, based on the total weight of the copper alloy.

Numbered Embodiment 140

A heat transfer system of numbered embodiment 134 wherein the copper alloy comprises from about 5 wt % to about 95 wt % of copper, based on the total weight of the copper alloy.

Numbered Embodiment 141

A heat transfer system of numbered embodiment 134 wherein the copper alloy comprises from about 10 wt % to about 90 wt % of copper, based on the total weight of the copper alloy.

Numbered Embodiment 142

A heat transfer system of numbered embodiment 134 wherein the copper alloy comprises from about 15 wt % to about 85 wt % of copper, based on the total weight of the copper alloy.

Numbered Embodiment 143

A heat transfer system of numbered embodiment 134 wherein the copper alloy comprises from about 20 wt % to about 80 wt % of copper, based on the total weight of the copper alloy.

Numbered Embodiment 144

A heat transfer system of numbered embodiment 134 wherein the copper alloy comprises from about 30 wt % to about 70 wt % of copper, based on the total weight of the copper alloy.

Numbered Embodiment 145

A heat transfer system of numbered embodiment 134 wherein the copper alloy comprises from about 40 wt % to about 60 wt % of copper, based on the total weight of the copper alloy.

Numbered Embodiment 146

A heat transfer system of numbered embodiment 131 wherein the copper metal contains at least about 99 wt % of elemental copper.

Numbered Embodiment 147

A heat transfer system of numbered embodiment 146 wherein the copper metal contains at least about 99.5 wt % of elemental copper.

Numbered Embodiment 148

A heat transfer system of numbered embodiment 146 wherein the copper metal contains at least about 99.9 wt % of elemental copper.

Numbered Embodiment 149

A heat transfer system of any one of numbered embodiments 131 to 148 wherein the copper metal or copper alloy is in the form of a mesh, wool, spheres, cones or cylinders.

Numbered Embodiment 150

A heat transfer system of numbered embodiments 131 to 149 wherein the copper metal or copper alloy has a BET surface area of at least about 10 $m^2/g$ measured in accordance with ASTM D6556-10.

Numbered Embodiment 151

A heat transfer system of numbered embodiment 150 wherein the copper metal or copper alloy has a BET surface area of at least about 20 $m^2/g$ measured in accordance with ASTM D6556-10.

Numbered Embodiment 152

A heat transfer system of numbered embodiment 150 wherein the copper metal or copper alloy has a BET surface area of at least about 30 $m^2/g$ measured in accordance with ASTM D6556-10.

Numbered Embodiment 153

A heat transfer system of numbered embodiment 150 wherein the copper metal or copper alloy has a BET surface area of at least about 40 $m^2/g$ measured in accordance with ASTM D6556-10.

Numbered Embodiment 154

A heat transfer system of numbered embodiment 150 wherein the copper metal or copper alloy has a BET surface area of at least about 50 $m^2/g$ measured in accordance with ASTM D6556-10.

Numbered Embodiment 155

A heat transfer system of numbered embodiment 131 to 149 wherein the copper metal or copper alloy has a BET surface area of from about 0.01 to about 1.5 $m^2$ per kg of refrigerant measured in accordance with ASTM D6556-10.

Numbered Embodiment 156

A heat transfer system of numbered embodiment 155 wherein the copper metal or copper alloy has a BET surface area of from about 0.02 to about 0.5 $m^2$ per kg of refrigerant measured in accordance with ASTM D6556-10.

Numbered Embodiment 157

A heat transfer system of numbered embodiment 155 wherein the copper metal or copper alloy has a BET surface area of about 0.08 $m^2$ per kg of refrigerant measured in accordance with ASTM D6556-10.

Numbered Embodiment 158

A heat transfer system of numbered embodiment 132 wherein the zeolite molecular sieve comprises silver.

Numbered Embodiment 159

A heat transfer system of numbered embodiment 132 to 158 wherein the zeolite molecular sieve contains from about 1% to about 30% by weight of metal based on the total weight of the zeolite.

Numbered Embodiment 160

A heat transfer system of numbered embodiment 159 wherein the zeolite molecular sieve contains from about 5% to about 20% by weight of metal based on the total weight of the zeolite.

Numbered Embodiment 161

A heat transfer system of numbered embodiments 131 or 158 to 160 wherein the zeolite has openings which have a size across their largest dimension of from about 5 to 40 Å (Angstroms).

Numbered Embodiment 162

A heat transfer system of numbered embodiments 161 wherein the zeolite has openings which have a size across their largest dimension of from about 35 Å (Angstroms) or less.

Numbered Embodiment 163

A heat transfer system of numbered embodiments 161 wherein the zeolite has openings which have a size across their largest dimension of from about 15 to 35 Å (Angstroms).

Numbered Embodiment 164

A heat transfer system of numbered embodiments 131 or 158 to 163 wherein the zeolite molecular sieve is present in an amount of from about 1 wt % to about 30 wt % relative to the total amount of molecular sieve (e.g., zeolite), refrigerant and lubricant (if present) in the heat transfer system.

Numbered Embodiment 165

A heat transfer system of numbered embodiments 131 or 158 to 163 wherein the zeolite molecular sieve is present in an amount of from about 2 wt % to about 25 wt % relative to the total amount of molecular sieve (e.g., zeolite), refrigerant and lubricant (if present) in the heat transfer system.

Numbered Embodiment 166

A heat transfer system of numbered embodiments 131 or 158 to 163 wherein the zeolite molecular sieve comprises silver and is present in an amount of at least 5% parts by weight (pbw) based on the total amount of molecular sieve (e.g., zeolite) and lubricant in the heat transfer system.

Numbered Embodiment 167

A heat transfer system of numbered embodiments 131 or 158 to 163 wherein the zeolite molecular sieve comprises silver and is present in an amount of from about 5 pbw to about 30 pbw per 100 parts by weight of lubricant (pphl) based on the total amount of molecular sieve (e.g., zeolite) and lubricant in the heat transfer system.

Numbered Embodiment 168

A heat transfer system of numbered embodiment 167 wherein the silver is present in an amount of from about 5 pbw to about 20 pbw per 100 parts by weight of lubricant (pphl) based on the total amount of molecular sieve (e.g., zeolite) and lubricant in the heat transfer system.

Numbered Embodiment 169

A heat transfer system of numbered embodiment 167 wherein the silver is present in an amount of from about 1% to about 30% by weight, based on the total weight of the zeolite.

Numbered Embodiment 170

A heat transfer system of numbered embodiment 167 wherein the silver is present in an amount of from about 5% to about 20% by weight, based on the total weight of the zeolite.

Numbered Embodiment 171

A heat transfer system of numbered embodiments 132 or 158 to 170 wherein the zeolite molecular sieve comprises silver and wherein the molecular sieve is present in an amount of at least about 10 pphl, relative to the total amount of molecular sieve (e.g., zeolite), and lubricant in the heat transfer system being treated.

Numbered Embodiment 172

A heat transfer system of numbered embodiment 171 wherein the molecular sieve is present in an amount of at least about 10 pphl to about 30 pphl, relative to the total amount of molecular sieve (e.g., zeolite), and lubricant in the heat transfer system being treated.

Numbered Embodiment 173

A heat transfer system of numbered embodiment 171 wherein the molecular sieve is present in an amount of at least about 10 pphl to about 20 pphl, relative to the total amount of molecular sieve (e.g., zeolite), and lubricant in the heat transfer system being treated.

Numbered Embodiment 174

A heat transfer system of numbered embodiment 171 the molecular sieve is present in an amount of at least about 15 pphl to about 30 pphl, relative to the total amount of molecular sieve (e.g., zeolite), and lubricant in the heat transfer system being treated.

Numbered Embodiment 175

A heat transfer system of numbered embodiment 171 wherein the molecular sieve is present in an amount of at least about 15 pphl to about 20 pphl, relative to the total amount of molecular sieve (e.g., zeolite), and lubricant in the heat transfer system being treated.

Numbered Embodiment 176

A heat transfer system of numbered embodiment 171 wherein the molecular sieve is present in an amount of at least about 15 pphl, relative to the total amount of molecular sieve (e.g., zeolite), and lubricant in the heat transfer system being treated.

Numbered Embodiment 177

A heat transfer system of numbered embodiment 171 wherein the molecular sieve is present in an amount of at least about 18 pphl, relative to the total amount of molecular sieve (e.g., zeolite), and lubricant in the heat transfer system being treated.

Numbered Embodiment 178

A heat transfer system of numbered embodiment 171 wherein the molecular sieve is present in an amount of at least about 18 pphl to about 25 pphl, relative to the total amount of molecular sieve (e.g., zeolite), and lubricant in the heat transfer system being treated.

Numbered Embodiment 179

A heat transfer system of numbered embodiment 171 wherein the molecular sieve is present in an amount of at least about 5 pphl, relative to the total amount of molecular sieve (e.g., zeolite), and lubricant in the heat transfer system being treated.

Numbered Embodiment 180

A heat transfer system of numbered embodiment 171 wherein the molecular sieve is present in an amount of at least about 21 pphl, relative to the total amount of molecular sieve (e.g., zeolite), and lubricant in the heat transfer system being treated.

Numbered Embodiment 181

A heat transfer system of numbered embodiment 132 wherein the anion exchange resin is a type 1 or type 2 strongly basic anion exchange resin.

Numbered Embodiment 182

The heat transfer system of numbered embodiment 181 in the form of beads having a size across their largest dimension of from about 0.3 mm to about 1.2 mm, when dry.

Numbered Embodiment 183

The heat transfer system of numbered embodiments 181 and 182 wherein the anion exchange resin is present in an amount of from about 1 pphl to about 60 pphl, based on the total amount of anion exchange resin and lubricant in the system.

Numbered Embodiment 184

The heat transfer system of numbered embodiment 183 wherein the anion exchange resin is present in an amount of from about 5 pphl to about 60 pphl, based on the total amount of anion exchange resin and lubricant in the system.

Numbered Embodiment 185

The heat transfer system of numbered embodiment 183 wherein the anion exchange resin is present in an amount of from about 20 pphl to about 50 pphl, based on the total amount of anion exchange resin and lubricant in the system.

Numbered Embodiment 186

The heat transfer system of numbered embodiment 183 wherein the anion exchange resin is present in an amount of from about 20 pphl to about 30 pphl, based on the total amount of anion exchange resin and lubricant in the system.

Numbered Embodiment 187

The heat transfer system of numbered embodiment 183 wherein the anion exchange resin is present in an amount of from about 1 pphl to about 25 pphl, based on the total amount of anion exchange resin and lubricant in the system.

Numbered Embodiment 188

The heat transfer system of numbered embodiment 183 wherein the anion exchange resin is present in an amount of from about 2 pphl to about 20 pphl, based on the total amount of anion exchange resin and lubricant in the system.

Numbered Embodiment 189

The heat transfer system of numbered embodiment 183 wherein the anion exchange resin is present in an amount of at least about 10 pphl, based on the total amount of anion exchange resin and lubricant in the system.

Numbered Embodiment 190

The heat transfer system of numbered embodiment 183 wherein the anion exchange resin is present in an amount of at least about 15 pphl, based on the total amount of anion exchange resin and lubricant in the system.

Numbered Embodiment 191

The heat transfer system of numbered embodiment 183 wherein the anion exchange resin is present in an amount of from about 10 pphl to about 25 pphl, based on the total amount of anion exchange resin and lubricant in the system.

Numbered Embodiment 192

The heat transfer system of numbered embodiment 183 wherein the anion exchange resin is present in an amount of from about 15 pphl to about 20 pphl, based on the total amount of anion exchange resin and lubricant in the system.

Numbered Embodiment 193

The heat transfer system of numbered embodiment 183 wherein the anion exchange resin is present in an amount of at least about 4 pphl, based on the total amount of anion exchange resin and lubricant in the system.

Numbered Embodiment 194

The heat transfer system of numbered embodiment 183 wherein the anion exchange resin is present in an amount of at least about 16 pphl, based on the total amount of anion exchange resin and lubricant in the system.

Numbered Embodiment 195

The heat transfer system of numbered embodiments 131 and 182 to 194 wherein the anion exchange resin is a weakly base anion exchange adsorbent resin.

Numbered Embodiment 196

The heat transfer system of numbered embodiment 195 wherein the anion exchange resin is Amberlyst A21 (Free Base).

Numbered Embodiment 197

The heat transfer system of numbered embodiment 131 wherein sequestration material is a moisture removing material comprising of a moisture-removing molecular sieve.

Numbered Embodiment 198

The heat transfer system of numbered embodiment 197 wherein sequestration material is a moisture removing material consisting essentially of a moisture-removing molecular sieve.

Numbered Embodiment 199

The heat transfer system of numbered embodiment 198 wherein sequestration material is a moisture removing material consisting of a moisture-removing molecular sieve.

Numbered Embodiment 200

The heat transfer system of numbered embodiment 197 to 199 wherein said sequestration material is a sodium aluminosilicate molecular sieve.

Numbered Embodiment 201

The heat transfer system of numbered embodiment 200 wherein the sodium aluminosilicate molecular sieve, is selected from one or more of 3A, 4A, 5A and 13X.

Numbered Embodiment 202

The heat transfer system of numbered embodiments 199 to 201 wherein sequestration material is present in an amount of from about 15 pphl to about 60 pphl by weight.

Numbered Embodiment 203

The heat transfer system of numbered embodiment 202 wherein sequestration material is present in an amount of from about 30 pphl to 45 pphl by weight.

Numbered Embodiment 204

The heat transfer system of numbered embodiment 131 wherein the activated alumina is a sodium activated alumina.

Numbered Embodiment 205

The heat transfer system of numbered embodiment 204 wherein the activated alumina is present in an amount of from about 1 pphl to about 60 pphl

Numbered Embodiment 206

The heat transfer system of numbered embodiment 205 wherein the activated alumina is present in an amount of from about 5 pphl to about 60 pphl by weight.

Numbered Embodiment 207

The heat transfer system of numbered embodiment 131 to 206 wherein the sequestration material comprises an anion exchange resin and a molecular sieve in a weight ratio (when dry) of anion exchange resin to molecular sieve (e.g. zeolite) of from about 10:90 to about 90:10.

Numbered Embodiment 208

The heat transfer system of numbered embodiment 207 wherein the weight ratio (when dry) of anion exchange resin to molecular sieve (e.g. zeolite) is from about 20:80 to about 80:20.

Numbered Embodiment 209

The heat transfer system of numbered embodiment 207 wherein the weight ratio (when dry) of anion exchange resin to molecular sieve (e.g. zeolite) is from about 25:75 to about 75:25.

Numbered Embodiment 210

The heat transfer system of numbered embodiment 207 wherein the weight ratio (when dry) of anion exchange resin to molecular sieve (e.g. zeolite) is from about 30:70 to about 70:30.

Numbered Embodiment 211

The heat transfer system of numbered embodiment 207 wherein the weight ratio (when dry) of anion exchange resin to molecular sieve (e.g. zeolite) is from about 40:60 to about 60:40.

Numbered Embodiment 212

The heat transfer system of numbered embodiment 207 wherein the weight ratio (when dry) of anion exchange resin to molecular sieve (e.g. zeolite) is 25:75.

Numbered Embodiment 213

The heat transfer system of numbered embodiment 207 wherein the weight ratio (when dry) of anion exchange resin to molecular sieve (e.g. zeolite) is 50:50.

Numbered Embodiment 214

The heat transfer system of numbered embodiment 207 wherein the weight ratio (when dry) of anion exchange resin to molecular sieve (e.g. zeolite) is 75:25.

Numbered Embodiment 215

The heat transfer system of numbered embodiment 131 to 214 wherein said sequestration material comprises at least one of sequestration materials (i)-(v).

Numbered Embodiment 216

The heat transfer system of numbered embodiment 131 to 214 wherein said sequestration material comprises at least two of the (i)-(v) categories.

Numbered Embodiment 217

The heat transfer system of numbered embodiment 131 to 214 wherein said sequestration material comprises at least two of the (ii)-(v) categories.

Numbered Embodiment 218

The heat transfer system of numbered embodiment 131 to 214 wherein said sequestration material comprises at least three of the (ii)-(v) categories.

Numbered Embodiment 219

The heat transfer system of numbered embodiment 131 to 214 wherein said sequestration material comprises material from each of categories (ii)-(v).

Numbered Embodiment 220

The heat transfer system of numbered embodiment 131 to 214 wherein said sequestration material comprises a material from each of categories (ii)-(v), and wherein the material from category (iii) comprises silver.

Numbered Embodiment 221

The heat transfer system of numbered 131 to 220 comprising a compressor, an evaporator, a condenser and an expansion device, in fluid communication with each other, a refrigerant of any one of numbered embodiments 1 to 22, a lubricant of any one of numbered embodiments 82 to 101, a sequestration material of any one of numbered embodiments 131 to 220 and a stabiliser of any one of numbered embodiments 32 to 81.

Numbered Embodiment 222

The heat transfer system of numbered embodiments 131 to 221 wherein the system includes an oil separator downstream of the compressor, wherein said sequestration materials of numbered embodiments 131 to 220 are located inside the oil separator such that the liquid lubricant is in contact with the sequestration material(s).

Numbered Embodiment 223

The heat transfer system of numbered embodiments 131 to 221 wherein the system includes an oil separator downstream of the compressor, wherein said sequestration materials of numbered embodiments 131 to 220 are outside but downstream of the oil separator, such that the liquid lubricant is in contact with the sequestration material(s).

Numbered Embodiment 224

The heat transfer system of numbered embodiments 131 to 221 wherein said sequestration materials of numbered embodiments 131 to 220 are located in the refrigerant liquid that exits the condenser.

Numbered Embodiment 225

A method for transferring heat comprising evaporating refrigerant liquid to produce a refrigerant vapor, compressing in a compressor at least a portion of the refrigerant vapor and condensing refrigerant vapor, said method comprising:
(a) providing a refrigerant of numbered embodiments 1 to 22
(b) optionally but preferably providing lubricant for said compressor; and
(c) exposing at least a portion of said refrigerant and/or at least a portion of said lubricant to a Sequestration Material of numbered embodiments 131 to 220.

Numbered Embodiment 226

The method of numbered embodiment 225 wherein said exposing temperature is above about 10° C.

Numbered Embodiment 227

The heat transfer system of numbered embodiments 131 to 224 wherein a sequestration materials of numbered embodiments 131 to 220 are included together in a filter element.

Numbered Embodiment 228

The heat transfer system of numbered embodiments 132 to 224 wherein at least two sequestration materials of numbered embodiments 131 to 220 are included together in a filter element.

Numbered Embodiment 229

The heat transfer system of numbered embodiments 132 to 224 wherein a sequestration materials of numbered embodiments 131 to 220 are included together in a solid core Numbered Embodiment 230

The heat transfer system of numbered embodiments 131 to 224 wherein at least two sequestration materials of numbered embodiments 131 to 220 are included together in a solid core Numbered Embodiment 231

The heat transfer system of numbered embodiments 131 to 230 wherein the sequestration materials of numbered embodiments 131 to 220 are included together in a solid core and where in the sequestration materials are substantially homogeneously distributed throughout the solid core Numbered Embodiment 232

The heat transfer system of numbered embodiments 229 to 231 wherein the solid core is included in or comprises a filter element.

Numbered Embodiment 233

The heat transfer system of numbered embodiments 299 to 232 wherein Sequestration Material of numbered embodiments 131 to 220 is configured such that all of materials are included in a solid core.

Numbered Embodiment 234

The heat transfer system of numbered embodiments 131 to 233, said system comprising a sequestration material of numbered embodiments 131 to 220, in contact with at least a portion of a refrigerant of numbered embodiment 1 to 22, and/or with at least a portion of the lubricant of numbered embodiments 82 to 101, wherein the temperature of said sequestration material and/or the temperature of said refrigerant and/or the temperature of the lubricant when in said contact are at a temperature that is at least about 10° C.

Numbered Embodiment 235

The heat transfer system of numbered embodiments 131 to 234 wherein the system is a residential air conditioning system comprising a refrigerant of numbered embodiments 1 to 22 and a lubricant of numbered embodiments 82 to 101

Numbered Embodiment 236

The heat transfer system of numbered embodiments 131 to 235 wherein the system is a residential air conditioning system comprising a refrigerant of numbered embodiments 1 to 22, a lubricant of numbered embodiments 82 to 101 and a sequestration material of numbered embodiment 131 to 220.

Numbered Embodiment 237

The heat transfer system of numbered embodiments 131 to 235 wherein the system is a residential air conditioning system comprising a refrigerant of numbered embodiments 1 to 22, a lubricant of numbered embodiments 82 to 101 and a stabilizer of numbered embodiments 32 to 81.

Numbered Embodiment 238

The heat transfer system of numbered embodiments 131 to 235 wherein the system is a residential air conditioning system comprising a refrigerant of numbered embodiments 1 to 22, a lubricant of numbered embodiments 82 to 101, a sequestration material of numbered embodiment 131 to 220 and a stabilizer of numbered embodiments 32 to 81.

Numbered Embodiment 239

The heat transfer system of numbered embodiments 236 to 238 wherein the evaporator has an evaporator operating temperature of about −20° C. to about 20° C.

Numbered Embodiment 240

The heat transfer system of numbered embodiments 236 to 238 wherein the evaporator has an evaporator operating temperature of about 000° C. to about 20° C.

Numbered Embodiment 241

The heat transfer system of numbered embodiments 236 to 238 wherein the evaporator has an evaporator operating temperature of about 000° C. to about 10° C.

Numbered Embodiment 242

The heat transfer system of numbered embodiments 236 to 238 wherein the evaporator has an evaporator operating temperature of about 7° C.

Numbered Embodiment 243

The heat transfer system of numbered embodiments 236 to 238 wherein the evaporator has an evaporator operating temperature of about −20° C. to about 3° C.

Numbered Embodiment 244

The heat transfer system of numbered embodiments 236 to 238 wherein the evaporator has an evaporator operating temperature of about 0.5° C.

Numbered Embodiment 245

The heat transfer system of numbered embodiments 131 to 235 wherein the system is an air cooled chiller system comprising a refrigerant of any one of numbered embodiments 1 to 22 and a lubricant of any one of numbered embodiments 82 or 101.

Numbered Embodiment 246

The heat transfer system of numbered embodiment 245, additionally comprising a sequestration material of numbered embodiments 131 to 220.

Numbered Embodiment 247

The heat transfer system of any one of numbered embodiments 245 to 246, additionally comprising a stabiliser of numbered embodiments 32 to 81.

Numbered Embodiment 248

The heat transfer system of any one of numbered embodiments 245 to 247 wherein the evaporator has an evaporator operating temperature of about 000° C. to about 10° C.

Numbered Embodiment 249

The heat transfer system of any one of numbered embodiments 245 to 247 wherein the evaporator has an evaporator operating temperature of about 4.5° C.

Numbered Embodiment 250

The heat transfer system of any one of numbered embodiments 245 to 249 wherein the condenser operates with a condensing temperature in the range of from about 40° C. to about 70° C.

Numbered Embodiment 251

The heat transfer system of numbered embodiments 131 to 235 wherein the system is a residential air to water heat pump comprising a refrigerant of any one of numbered embodiments 1 to 22 and a lubricant of any one of numbered embodiments 82 to 101.

Numbered Embodiment 252

The heat transfer system of numbered embodiment 251, additionally comprising a sequestration material of numbered embodiments 131 to 220.

Numbered Embodiment 253

The heat transfer system of any one of numbered embodiments 251 to 252, additionally comprising a stabiliser of numbered embodiments 32 to 81.

Numbered Embodiment 254

The heat transfer system of any one of numbered embodiments 251 to 253 wherein the evaporator has an evaporator operating temperature of about −30° C. to about 5° C.

Numbered Embodiment 255

The heat transfer system of any one of numbered embodiments 251 to 253 wherein the evaporator has an evaporator operating temperature of about −20° C. to about 3° C.

Numbered Embodiment 256

The heat transfer system of any one of numbered embodiments 251 to 253 wherein the evaporator has an evaporator operating temperature of about 0.5° C.

Numbered Embodiment 257

The heat transfer system of any one of numbered embodiments 251 to 256 wherein the condenser operates with a condensing temperature in the range of from about 50° C. to about 90° C.

Numbered Embodiment 258

The heat transfer system of numbered embodiments 131 to 256 wherein the system is a low temperature heat transfer system comprising a refrigerant of any one of numbered embodiments 1 to 22 and a lubricant of any one of numbered embodiments 82 to 101.

Numbered Embodiment 259

The heat transfer system of numbered embodiment 258, additionally comprising a sequestration material of numbered embodiments 131 to 220.

Numbered Embodiment 260

The heat transfer system of any one of numbered embodiments 258 to 259, additionally comprising a stabiliser of numbered embodiments 32 to 81.

Numbered Embodiment 261

The heat transfer system of any one of numbered embodiments 258 to 260 wherein the evaporator has an evaporator operating temperature of about −35° C. to about −25° C.

Numbered Embodiment 262

The heat transfer system of any one of numbered embodiments 258 to 260 wherein the evaporator has an evaporator operating temperature of about −25° C. to about −12° C.

Numbered Embodiment 263

The heat transfer system of any one of numbered embodiments 258 to 260 wherein the evaporator has an evaporator operating temperature of about −23° C.

Numbered Embodiment 264

The heat transfer system of any one of numbered embodiments 258 to 263, wherein the heat transfer system is a low temperature chiller system.

Numbered Embodiment 265

The heat transfer system of numbered embodiment 264 wherein the evaporator has an evaporator operating temperature of about −25° C. to about −12° C.

Numbered Embodiment 266

The heat transfer system of numbered embodiment 264 wherein the evaporator has an evaporator operating temperature of about −23° C.

Numbered Embodiment 267

The heat transfer system of any one of numbered embodiments 258 to 266 wherein the low temperature heat transfer system comprises a compressor, a vapor injector, an evaporator, a condenser, and an expansion device, in fluid communication with each other.

Numbered Embodiment 268

The heat transfer system of any one of numbered embodiments 258 to 266 wherein the low temperature heat transfer system comprises a compressor, a liquid injector, an evaporator, a condenser, and an expansion device, in fluid communication with each other.

Numbered Embodiment 269

The heat transfer system of any one of numbered embodiments 258 to 266 wherein the low temperature heat transfer system comprises a compressor, a vapor injector, a liquid injector, an evaporator, a condenser, and an expansion device, in fluid communication with each other.

Numbered Embodiment 270

The heat transfer system of any one of numbered embodiments 258 to 269 wherein the low temperature heat transfer system has a degree of superheat at evaporator outlet of from about 0° C. to about 10° C.

Numbered Embodiment 271

The heat transfer system of numbered embodiment 270, wherein the system has a degree of superheat at evaporator outlet of from about 4° C. to about 6° C.

Numbered Embodiment 272

The heat transfer system of any one of numbered embodiments 258 to 271 wherein the low temperature heat transfer system has a degree of superheat in the suction line of from about 15° C. to about 50° C.

Numbered Embodiment 273

The heat transfer system of numbered embodiment 272 wherein the low temperature heat transfer system has a degree of superheat in the suction line of from about 25° C. to about 30° C.

Numbered Embodiment 274

The heat transfer system of any one of numbered embodiments 258 to 273 wherein the condenser operates with a condensing temperature in the range of from about 20° C. to about 70° C.

Numbered Embodiment 275

The heat transfer system of any one of numbered embodiments 258 to 273 wherein the condenser operates with a condensing temperature in the range of from about 20° C. to about 60° C.

Numbered Embodiment 276

The heat transfer system of any one of numbered embodiments 258 to 278 wherein the condenser operates with a condensing temperature in the range of from about 25° C. to about 45° C.

Numbered Embodiment 277

The heat transfer system of numbered embodiments 131 to 235 wherein the system is a medium temperature heat transfer system comprising a refrigerant of any one of numbered embodiments 1 to 22 and a lubricant of any one of numbered embodiments 82 or 101.

Numbered Embodiment 278

The heat transfer system of numbered embodiment 277, additionally comprising a sequestration material of numbered embodiments 131 to 220.

Numbered Embodiment 279

The heat transfer system of any one of numbered embodiments 277 to 278, additionally comprising a stabiliser of numbered embodiments 32 to 81.

Numbered Embodiment 280

The heat transfer system of any one of numbered embodiments 277 to 279 wherein the evaporator has an evaporator operating temperature of about −12° C. to about 0° C.

Numbered Embodiment 281

The heat transfer system of any one of numbered embodiments 277 to 280 wherein the evaporator has an evaporator operating temperature of about −10° C. to about −6.7° C.

Numbered Embodiment 282

The heat transfer system of any one of numbered embodiments 277 to 281 wherein the system is a medium temperature chiller system.

Numbered Embodiment 283

The heat transfer system of numbered embodiment 282 wherein the evaporator has an evaporator operating temperature of about −10° C. to about −6.7° C.

Numbered Embodiment 284

The heat transfer system of any one of numbered embodiments 277 to 283 wherein the system has a degree of superheat at the evaporator outlet of from about 000° C. to about 10° C.

Numbered Embodiment 285

The heat transfer system of any one of numbered embodiments 277 to 283 wherein the system has a degree of superheat at the evaporator outlet of from about 4° C. to about 6° C.

Numbered Embodiment 286

The heat transfer system of any one of numbered embodiments 277 to 285 wherein the system has a degree of superheat in the suction line of from about 5° C. to about 40° C.

Numbered Embodiment 287

The heat transfer system of any one of numbered embodiments 277 to 285 wherein the system has a degree of superheat in the suction line of from about 15° C. to about 30° C.

Numbered Embodiment 288

The heat transfer system of any one of numbered embodiments 277 to 287 wherein the condenser operates with a condensing temperature in the range of from about 20° C. to about 70° C.

Numbered Embodiment 289

The heat transfer system of any one of numbered embodiments 277 to 287 wherein the condenser operates with a condensing temperature in the range of from about 20° C. to about 60° C.

Numbered Embodiment 290

The heat transfer system of any one of numbered embodiments 277 to 287 wherein the condenser operates with a condensing temperature in the range of from about 25° C. to about 45° C.

Numbered Embodiment 291

A method for providing cooling comprising:
(a) evaporating a refrigerant of any one of numbered embodiments 1 to 22 in the vicinity of the body or article or fluid to be cooled at a temperature of from about −40° C. to about +10° C. to produce a refrigerant vapor;
(b) compressing said refrigerant vapor to produce a refrigerant at discharge temperature of less than about 135° C.; and
(c) condensing the refrigerant from said compressor at a temperature of from about 20° C. to about 70° C. to produce a refrigerant vapor.

Numbered Embodiment 292

A method of providing residential air conditioning in the cooling mode, said method comprising:
(a) evaporating a refrigerant of any one of numbered embodiments 1 to 22 at a temperature of from about 0° C. to about 10° C. to produce a refrigerant vapor;
(b) compressing said refrigerant vapor to produce a refrigerant at discharge temperature of less than about 135° C.; and
(c) condensing the refrigerant from said compressor at a temperature of from about 40° C. to about 70° C. to produce a refrigerant vapor.

Numbered Embodiment 293

A method of providing residential air conditioning in the cooling mode, said method comprising:
(a) evaporating a refrigerant of any one of numbered embodiments 1 to 22 at a temperature of from about 0° C. to about 10° C. to produce a refrigerant vapor and cooled air at a temperature of from about 10° C. to about 17° C.;
(b) compressing said refrigerant vapor to produce a refrigerant at discharge temperature of less than about 135° C.; and
(c) condensing the refrigerant from said compressor at a temperature of from about 40° C. to about 70° C. to produce a refrigerant vapor.

Numbered Embodiment 294

A method of providing residential air conditioning in the cooling mode, said method comprising:

(a) evaporating a refrigerant of any one of numbered embodiments 1 to 22, at a temperature of from about 0° C. to about 10° C. to produce a refrigerant vapor and cooled air at a temperature of from about 10° C. to about 17° C.;

(b) compressing said refrigerant vapor in a compressor lubricated with POE lubricant to produce a refrigerant at discharge temperature of less than about 135° C.;

(c) condensing the refrigerant from said compressor at a temperature of from about 40° C. to about 70° C. to produce a refrigerant vapor; and (d) exposing at least a portion of said refrigerant and/or at least a portion of said lubricant to a sequestration material of any one of numbered embodiments 131 to 220.

Numbered Embodiment 295

A method of providing chilled water to provide air conditioning in the cooling mode, said method comprising:

(a) evaporating a refrigerant of any one of numbered embodiments 1 to 22, at a temperature of from about 0° C. to about 10° C. to produce a refrigerant vapor;

(b) compressing said refrigerant vapor to produce a refrigerant at discharge temperature of less than about 135° C.; and (c) condensing the refrigerant from said compressor at a temperature of from about 40° C. to about 70° C. to produce a refrigerant vapor.

Numbered Embodiment 296

A method of providing chilled water to provide air conditioning in the cooling mode, said method comprising:

(a) evaporating a refrigerant of any one of numbered embodiments 1 to 22 at a temperature of from about 0° C. to about 10° C. to produce a refrigerant vapor and chilled water at a temperature of from about 5° C. to about 10° C.;

(b) compressing said refrigerant vapor to produce a refrigerant at discharge temperature of less than about 135° C.; and (c) condensing the refrigerant from said compressor at a temperature of from about 40° C. to about 70° C. to produce a refrigerant vapor.

Numbered Embodiment 297

A method of providing chilled water to provide air conditioning in the cooling mode, said method comprising:

(a) evaporating a refrigerant of any one of numbered embodiments 1 to 22 at a temperature of from about 0° C. to about 10° C. to produce a refrigerant vapor and chilled water at a temperature of from about 5° C. to about 10° C.;

(b) compressing said refrigerant vapor in a compressor lubricated with POE lubricant to produce a refrigerant at discharge temperature of less than about 135° C.;

(c) condensing the refrigerant from said compressor at a temperature of from about 40° C. to about 70° C. to produce a refrigerant vapor; and (d) exposing at least a portion of said refrigerant and/or at least a portion of said lubricant to a sequestration material of any one of numbered embodiments 131 to 220.

Numbered Embodiment 298

A low temperature refrigeration method for transferring heat, said method comprising:

(a) evaporating a refrigerant of any one of numbered embodiments 1 to 22, at a temperature of from about −40° C. to about −12° C. to produce a refrigerant vapor;

(b) compressing said refrigerant vapor to produce a refrigerant at discharge temperature of less than about 135° C.; and (c) condensing the refrigerant from said compressor at a temperature of from about 20° C. to about 60° C. to produce a refrigerant vapor.

Numbered Embodiment 299

A method for providing heating comprising:

(a) evaporating a refrigerant of any one of numbered embodiments 1 to 22 at a temperature of from about −30° C. to about +5° C. to produce a refrigerant vapor;

(b) compressing said refrigerant vapor to produce a refrigerant at discharge temperature of less than about 135° C.; and (c) condensing the refrigerant from said compressor in the vicinity of the body or article or fluid to be heated, said condensing occurring at a temperature of from about 40° C. to about 70° C. to produce a refrigerant vapor.

Numbered Embodiment 300

A method of providing residential air conditioning in the heating mode, said method comprising:

(a) evaporating a refrigerant of any one of numbered embodiments 1 to 22 at a temperature of from about −20° C. to about 3° C. to produce a refrigerant vapor;

(b) compressing said refrigerant vapor to produce a refrigerant at discharge temperature of less than about 135° C.; and (c) condensing the refrigerant from said compressor at a temperature of from about 40° C. to about 70° C. to produce a refrigerant vapor.

Numbered Embodiment 301

A method of providing residential air conditioning in the heating mode, said method comprising:

(a) evaporating a refrigerant of any one of numbered embodiments 1 to 22 at a temperature of from about 0.5° C. to produce a refrigerant vapor;

(b) compressing said refrigerant vapor to produce a refrigerant at discharge temperature of less than about 135° C.; and (c) condensing the refrigerant from said compressor at a temperature of from about 40° C. to about 70° C. to produce a refrigerant vapor and heated air at a temperature of from about 18° C. to about 24° C.

Numbered Embodiment 302

A method of providing residential air conditioning in the heating mode, said method comprising:

(a) evaporating a refrigerant of any one of numbered embodiments 1 to 22 at a temperature of from about 0° C. to about 10° C. to produce a refrigerant vapor;

(b) compressing said refrigerant vapor in a compressor lubricated with POE lubricant to produce a refrigerant at discharge temperature of less than about 135° C.;

(c) condensing the refrigerant from said compressor at a temperature of from about 40° C. to about 70° C. to produce a refrigerant vapor; and (d) exposing at least a portion of said refrigerant and/or at least a portion of said lubricant to a sequestration material of any one of numbered embodiments 131 to 220

Numbered Embodiment 303

A method of providing heating in a residential air to water heat pump, said method comprising:
(a) evaporating a refrigerant of any one of numbered embodiments 1 to 22 at a temperature of from about −30° C. to about 5° C. to produce a refrigerant vapor;
(b) compressing said refrigerant vapor to produce a refrigerant at discharge temperature of less than about 135° C.; and
(c) condensing the refrigerant from said compressor at a temperature of from about 50° C. to about 90° C. to produce a refrigerant vapor.

Numbered Embodiment 304

A method of providing heating in a residential air to water heat pump, said method comprising:
(a) evaporating a refrigerant of any one of numbered embodiments 1 to 22 at a temperature of from about −20° C. to about 3° C. to produce a refrigerant vapor;
(b) compressing said refrigerant vapor to produce a refrigerant at discharge temperature of less than about 135° C.; and
(c) condensing the refrigerant from said compressor at a temperature of from about 50° C. to about 90° C. to produce a refrigerant vapor.

Numbered Embodiment 305

A method of providing heating in a residential air to water heat pump, said method comprising:
(a) evaporating a refrigerant of any one of numbered embodiments 1 to 22 at a temperature of from about −30° C. to about 5° C. to produce a refrigerant vapor;
(b) compressing said refrigerant vapor to produce a refrigerant at discharge temperature of less than about 135° C.; and
(c) condensing the refrigerant from said compressor at a temperature of from about 50° C. to about 90° C. to produce a refrigerant vapor and heated water at a temperature of from about 50° C. to about 55° C.

Numbered Embodiment 306

A method of providing heating in a residential air to water heat pump, said method comprising:
(a) evaporating a refrigerant of any one of numbered embodiments 1 to 22 at a temperature of from about −30° C. to about 5° C. to produce a refrigerant vapor;
(b) compressing said refrigerant vapor in a compressor lubricated with POE lubricant to produce a refrigerant at discharge temperature of less than about 135° C.;
(c) condensing the refrigerant from said compressor at a temperature of from about 40° C. to about 70° C. to produce a refrigerant vapor; and
(d) exposing at least a portion of said refrigerant and/or at least a portion of said lubricant to a sequestration material of any one of numbered embodiments 131 to 220.

Numbered Embodiment 307

The use of a heat transfer composition comprising a refrigerant as defined in any one of numbered embodiments 23 to 110, in residential air conditioning.

Numbered Embodiment 308

The use of a heat transfer composition comprising a refrigerant as defined in any one of numbered embodiments 23 to 110, in a chiller.

Numbered Embodiment 309

The use of a refrigerant as defined in any one of numbered embodiments 1 to 22 as a retrofit refrigerant.

Numbered Embodiment 310

The use of a refrigerant as defined in any one of numbered embodiments 1 to 22 as a replacement refrigerant.

Numbered Embodiment 311

The use of a heat transfer composition as defined in any one of numbered embodiments 23 to 110 as a retrofit heat transfer composition.

Numbered Embodiment 312

The use of a heat transfer composition as defined in any one of numbered embodiments 23 to 110 as a replacement heat transfer composition.

Numbered Embodiment 313

A method of retrofitting an existing heat transfer system designed for and containing R-22 refrigerant, by replacing a portion of said R-22 refrigerant with a refrigerant as defined in any one of numbered embodiments 1 to 22.

Numbered Embodiment 314

The method of numbered embodiment 313, wherein said retrofitting does not require substantial engineering modification of the existing system.

Numbered Embodiment 315

The method of numbered 314, wherein said retrofitting does not require substantial engineering modification of the condenser, the evaporator and/or the expansion valve.

Numbered Embodiment 316

A method of any one of numbered embodiments 313 to 315 wherein the refrigerant of any one of numbered embodiments 1 to 22 exhibits operating characteristics compared with R-22 wherein the efficiency (COP) of the refrigerant of any one of numbered embodiments 1 to 22 and/or the heat transfer composition of any one of numbered embodiments 23 to 110 is from 95 to 105% of the efficiency of R-22 in heat transfer systems, in which the refrigerant and/or the heat transfer composition are to replace the R-22 refrigerant.

Numbered Embodiment 317

A method of any one of numbered embodiments 313 to 315 wherein the refrigerant of any one of numbered embodiments 1 to 22 exhibits operating characteristics compared with R-22 wherein the capacity of the refrigerant of any one of numbered embodiments 1 to 22 and/or the heat transfer composition of any one of numbered embodiments 23 to 110 is from 97 to 103% of the capacity of R-22 in heat transfer systems, in which the refrigerant and/or the heat transfer composition are to replace the R-22 refrigerant.

Numbered Embodiment 318

A method of any one of numbered embodiments 313 to 315 wherein the refrigerant of any one of numbered embodiments 1 to 22 exhibits operating characteristics compared with R-22 wherein the capacity of the refrigerant of any one of numbered embodiments 1 to 22 and/or the heat transfer composition of any one of numbered embodiments 23 to 110 is from 97 to 103% of the capacity of R-22 in heat transfer systems and wherein the efficiency (COP) is equal to or greater than the efficiency of R-22 in the heat transfer system, in which the refrigerant and/or the heat transfer composition are to replace the R-22 refrigerant.

Numbered Embodiment 319

A method of any one of numbered embodiments 313 to 315 wherein the refrigerant of any one of numbered embodiments 1 to 22 exhibits operating characteristics compared with R-22A wherein the efficiency (COP) of the refrigerant of any one of numbered embodiments 1 to x22x and/or the heat transfer composition of any one of numbered embodiments 23 to 110 is from 100 to 105% of the efficiency of R-22 in heat transfer systems, in which the refrigerant and/or the heat transfer composition are to replace the R-22 refrigerant.

Numbered Embodiment 320

A method of any one of numbered embodiments 313 to 319 wherein the heat transfer composition of numbered embodiments 23 to 110 exhibits the following characteristics compared with R-22:
the discharge temperature is not greater than 10° C. higher than that of R-22; and
the compressor pressure ratio is from 95 to 105% of the compressor pressure ratio of R-22 in heat transfer systems, in which the composition is used to replace the R-22 refrigerant.

Numbered Embodiment 321

A method of retrofitting an existing heat transfer system designed to contain or containing R-22 refrigerant or which is suitable for use with R-22 refrigerant, said method comprising replacing at least a portion of the existing R-22 refrigerant with a heat transfer composition comprising a refrigerant of any one of numbered embodiments 1 to 22.

Numbered Embodiment 322

The method of numbered embodiment 321, wherein the step of replacing comprises removing at least a substantial portion of the existing refrigerant and introducing a heat transfer composition of any one of numbered embodiments 23 to 110 without any substantial modification of the system to accommodate the refrigerant of the present invention.

Numbered Embodiment 323

The method of numbered embodiment 321, wherein the step of replacing comprises removing at least a substantial portion of the existing refrigerant and introducing a refrigerant of any one of numbered embodiments 1 to 22 without any substantial modification of the system to accommodate the refrigerant of the present invention.

Numbered Embodiment 324

The method of numbered embodiment 321, wherein the step of replacing comprises removing substantially all of the existing refrigerant and introducing a heat transfer composition of any one of numbered embodiments 23 to 110 without any substantial modification of the system to accommodate the refrigerant of the present invention.

Numbered Embodiment 325

The method of numbered embodiment 321, wherein the step of replacing comprises removing substantially all of the existing refrigerant and introducing a refrigerant of any one of numbered embodiments 1 to 22 without any substantial modification of the system to accommodate the refrigerant of the present invention.

Numbered Embodiment 326

The method of numbered embodiment 321, wherein the removing step comprises removing at least about 5% by weight of the R-22 from the existing system and replacing it with the heat transfer compositions of any one of numbered embodiments 23 to 110.

Numbered Embodiment 327

The method of numbered embodiment 321, wherein the removing step comprises removing at least about 10% by weight of the R-22 from the existing system and replacing it with the heat transfer compositions of any one of numbered embodiments 23 to 110.

Numbered Embodiment 328

The method of numbered embodiment 321, wherein the removing step comprises removing at least about 25% by weight of the R-22 from the existing system and replacing it with the heat transfer compositions of any one of numbered embodiments 23 to 110.

Numbered Embodiment 329

The method of numbered embodiment 321, wherein the removing step comprises removing at least about 50% by weight of the R-22 from the existing system and replacing it with the heat transfer compositions of any one of numbered embodiments 23 to 110.

Numbered Embodiment 330

The method of numbered embodiment 321, wherein the removing step comprises removing at least about 75% by weight of the R-22 from the existing system and replacing it with the heat transfer compositions of any one of numbered embodiments 23 to 110.

Numbered Embodiment 331

The use of a heat transfer composition of any one of numbered embodiments 23 to 110 to replace R-22 in a heat transfer system of any one of numbered embodiments 111 to 290.

Numbered Embodiment 332

A method of using a refrigerant of any one of numbered embodiments 1 to 22 to replace R-404A as a replacement in a heat transfer system designed to contain or suitable for use with R-404A refrigerant.

Numbered Embodiment 333

A refrigerant of numbered embodiments 1 to 22 for use in a heat transfer system comprising a reciprocating, rotary (including rolling piston and rotary vane), scroll, screw, or centrifugal compressor.

Numbered Embodiment 334

A heat transfer composition of numbered embodiments 23 to 110 for use in a heat transfer system comprising a reciprocating, rotary (including rolling piston and rotary vane), scroll, screw, or centrifugal compressor.

Numbered Embodiment 335

A refrigerant of numbered embodiments 1 to 22 for use in a heat transfer system comprising a capillary tube, a fixed orifice, a thermal expansion valve or an electronic expansion valve.

Numbered Embodiment 336

A heat transfer composition of numbered embodiments 23 to 110 for use in a heat transfer system comprising a capillary tube, a fixed orifice, a thermal expansion valve or an electronic expansion valve.

Numbered Embodiment 337

A refrigerant of numbered embodiments 1 to 22 for use in a heat transfer system wherein the evaporator and condenser together form a finned tube heat exchanger, a microchannel heat exchanger, a shell and tube, a plate heat exchanger, or a tube-in-tube heat exchanger.

Numbered Embodiment 338

A heat transfer composition of numbered embodiments 23 to 110 for use in a heat transfer system wherein the evaporator and condenser together form a finned tube heat exchanger, a microchannel heat exchanger, a shell and tube, a plate heat exchanger, or a tube-in-tube heat exchanger.

Numbered Embodiment 339

A method of cooling in a heat transfer system comprising an evaporator, a condenser and a compressor, the process comprising the steps of i) condensing a heat transfer composition of any one of numbered embodiments 23 to 110 and ii) evaporating the composition in the vicinity of body or article to be cooled; wherein the evaporator temperature of the heat transfer system is in the range of from about −40° C. to about −10° C.

Numbered Embodiment 340

A method of heating in a heat transfer system comprising an evaporator, a condenser and a compressor, the process comprising the steps of i) condensing a heat transfer composition of any one of numbered embodiments 23 to 110, in the vicinity of a body or article to be heated and ii) evaporating the composition; wherein the evaporator temperature of the heat transfer system is in the range of about −20° C. to about 3° C.

Numbered Embodiment 341

A method of heating in a heat transfer system comprising an evaporator, a condenser and a compressor, the process comprising the steps of i) condensing a heat transfer composition in any one of numbered embodiments 23 to 110, in the vicinity of a body or article to be heated and ii) evaporating the composition; wherein the evaporator temperature of the heat transfer system is in the range of about −30° C. to about 5° C.

Numbered Embodiment 342

A method of cooling in a heat transfer system comprising an evaporator, a condenser and a compressor, the process comprising the steps of i) condensing a heat transfer composition of any one of numbered embodiments 23 to 110 and ii) evaporating the composition in the vicinity of body or article to be cooled wherein the heat transfer system is a refrigeration system.

Numbered Embodiment 343

The use of a heat transfer composition as defined in any one of numbered embodiments 23 to 110 for use in air conditioning, heat pumps, chillers and low and/or medium temperature refrigeration systems.

Numbered Embodiment 344

The method of numbered embodiment 343, wherein the chiller is a positive displacement chiller, more particularly an air cooled or water cooled direct expansion chiller, which is either modular or conventionally singularly packaged.

Numbered Embodiment 345

The method of numbered embodiment 343 wherein the heat transfer system is a residential air conditioning system.

Numbered Embodiment 346

The method of numbered embodiment 345 wherein the condenser operates with a condensing temperature in the range of from about 40° C. to about 70° C. in cooling mode.

Numbered Embodiment 347

The method of numbered embodiment 345 wherein the condenser operates with a condensing temperature in the range of from about 35° C. to about 50° C.

Numbered Embodiment 348

The use of numbered embodiment 343 wherein the heat transfer composition is provided for use in an air conditioning application selected from mobile air conditioning; stationary air conditioning; industrial air conditioning; commercial air conditioning systems.

Numbered Embodiment 349

The use of numbered embodiment 348, wherein the heat transfer composition is provided for use in an air conditioning application selected from air conditioning in buses and trains; residential air conditioning, ducted split or a ductless split air conditioning system; packaged rooftop units and a variable refrigerant flow (VRF) systems).

Numbered Embodiment 350

The use of numbered embodiment 343 wherein the heat transfer composition is provided for use in a heat pump selected from a mobile heat pumps; residential heat pumps; and commercial air source, water source or ground source heat pump systems.

Numbered Embodiment 351

The use of numbered embodiment 350 wherein the heat transfer composition is provided for use in a heat pump selected from a electrical vehicle heat pumps; air residential air to water heat pump/hydronic systems.

Numbered Embodiment 352

The use of a heat transfer composition of numbered embodiments 23 to 110 in a system which is suitable for use with the R-404 refrigerant.

Numbered Embodiment 353

The use of a heat transfer composition of numbered embodiments 23 to 110 in a system which is suitable for use with the R-22 refrigerant.

The invention claimed is:

1. A refrigerant comprising at least about 97% by weight of the following four compounds, with each compound being present in the following relative percentages: 36.8 to 72% by weight trifluoroiodomethane ($CF_3I$);
    2 to 36% by weight of tetrafluoropropene selected from trans-1,3,3,3-tetrafluoropropene (HFO-1234ze(E), 2,3,3,3-tetrafluoropropene (HFO-1234yf) and combinations of these;
    15 to 31% by weight difluoromethane (HFC-32); and
    1 to 4.5% by weight pentafluoroethane (HFC-125).

2. The refrigerant of claim 1 consisting essentially of the following four compounds, with each compound being present in the following relative percentages:
    36.8 to 64.8% by weight trifluoroiodomethane ($CF_3I$);
    8 to 36% by weight trans-1,3,3,3-tetrafluoropropene (HFO-1234ze(E));
    17 to 23% by weight difluoromethane (HFC-32); and
    1 to 4.2% by weight pentafluoroethane (HFC-125).

3. The refrigerant of claim 1 consisting essentially of the following four compounds, with each compound being present in the following relative percentages:
    about 58% by weight trifluoroiodomethane ($CF_3I$);
    about 16% by weight trans-1,3,3,3-tetrafluoropropene (HFO-1234ze(E));
    22±1% by weight difluoromethane (HFC-32); and
    4±0.5% by weight pentafluoroethane (HFC-125).

4. The refrigerant of claim 1 consisting of the following four compounds, with each compound being present in the following relative percentages:
    about 58% by weight trifluoroiodomethane ($CF_3I$);
    about 16% by weight trans-1,3,3,3-tetrafluoropropene (HFO-1234ze(E));
    22±1% by weight difluoromethane (HFC-32); and
    4±0.5% by weight pentafluoroethane (HFC-125).

5. The refrigerant of claim 1 consisting essentially of the following four compounds, with each compound being present in the following relative percentages:
    about 42 to about 60% by weight trifluoroiodomethane ($CF_3I$);
    about 12 to about 30% by weight trans-1,3,3,3-tetrafluoropropene (HFO-1234ze(E));
    about 18 to about 20% by weight difluoromethane (HFC-32); and
    2 to 4.2% by weight pentafluoroethane (HFC-125), wherein said refrigerant is non-flammable and has a GWP of 400 or less.

6. The refrigerant of claim 1 consisting of the following four compounds, with each compound being present in the following relative percentages:
    about 42 to about 60% by weight trifluoroiodomethane ($CF_3I$);
    about 12 to about 30% by weight trans-1,3,3,3-tetrafluoropropene (HFO-1234ze(E));
    about 18 to about 20% by weight difluoromethane (HFC-32); and
    2 to 4.2% by weight pentafluoroethane (HFC-125), wherein said refrigerant is non-flammable and has a GWP of 400 or less.

7. The refrigerant of claim 1 comprising at least about 98.5% by weight of the following four compounds, with each compound being present in the following relative percentages:
    46 to 72% by weight trifluoroiodomethane ($CF_3I$);
    2 to 28% by weight 1,1,1,2-tetrafluoropropene (HFO-1234yf);
    15 to 21.5% by weight difluoromethane (HFC-32); and
    1 to 4.5% by weight pentafluoroethane (HFC-125).

8. The refrigerant of claim 1 comprising at least about 98.5% by weight of the following four compounds, with each compound being present in the following relative percentages:
    about 50 to about 68% by weight trifluoroiodomethane ($CF_3I$);
    about 6 to about 24% by weight 1,1,1,2-tetrafluoropropene (HFO-1234yf);
    about 18 to about 21% by weight difluoromethane (HFC-32); and
    2 to 4.5% by weight pentafluoroethane (HFC-125).

9. The refrigerant of claim 1 comprising at least about 98.5% by weight of the following four compounds, with each compound being present in the following relative percentages:
    about 53% by weight trifluoroiodomethane ($CF_3I$);
    about 23% by weight 1,1,1,2-tetrafluoropropene (HFO-1234yf);
    20±1% by weight difluoromethane (HFC-32); and
    4±0.5% by weight pentafluoroethane (HFC-125).

10. The refrigerant of claim 1 consisting essentially of the following four compounds, with each compound being present in the following relative percentages:
about 53% by weight trifluoroiodomethane (CF$_3$I);
about 23% by weight 1,1,1,2-tetrafluoropropene (HFO-1234yf);
20±1% by weight difluoromethane (HFC-32); and
4±0.5% by weight pentafluoroethane (HFC-125).

11. The refrigerant of claim 1 consisting essentially of the following four compounds, with each compound being present in the following relative percentages:
about 50 to about 68% by weight trifluoroiodomethane (CF$_3$I);
about 6 to about 24% by weight 1,1,1,2-tetrafluoropropene (HFO-1234yf);
about 18 to about 21% by weight difluoromethane (HFC-32); and
2 to 4.5% by weight pentafluoroethane (HFC-125), wherein said refrigerant is non-flammable and has a GWP of 400 or less.

12. A heat transfer composition comprising the refrigerant of claim 1.

13. The heat transfer composition of claim 12, wherein the refrigerant comprises greater than 40% by weight of the heat transfer composition.

14. The heat transfer composition of claim 13 further comprising a stabilizer selected from an alkylated naphthalene, a diene-based compound, a phenol compound and combinations of two or more of these and further comprising a lubricant selected from the group consisting of polyol esters (POEs), mineral oil, alkylbenzenes (ABs) and polyvinyl ethers (PVE).

15. A method for transferring heat of the type comprising evaporating refrigerant liquid to produce a refrigerant vapor, compressing in a compressor at least a portion of the refrigerant vapor and condensing refrigerant vapor, said method comprising:
(a) providing a refrigerant comprising at least about 97% by weight of the following four compounds, with each compound being present in the following relative percentages:
36.8 to 72% by weight trifluoroiodomethane (CF$_3$I);
2 to 36% by weight of tetrafluoropropene selected from trans-1,3,3,3-tetrafluoropropene (HFO-1234ze(E), 2,3,3,3-tetrafluoropropene (HFO-1234yf) and combinations of these;
15 to 31% by weight difluoromethane (HFC-32); and
1 to 4.5% by weight pentafluoroethane (HFC-125);
(b) evaporating said refrigerant at a temperature of from about −40° C. to about +10° C.

16. The method of claim 15 further comprising exposing at least a portion of said refrigerant and/or at least a portion of said lubricant to a sequestration material comprising:
i. activated alumina, or
ii. a zeolite molecular sieve comprising copper, silver, lead or a combination thereof, or
iii. an anion exchange resin, or
iv. a moisture-removing material, preferably a moisture-removing molecular sieve, or
v. a combination of two or more of the above.

17. The method of claim 15 wherein said evaporating step occurs in a heat transfer system comprising a low temperature refrigeration system, a medium temperature refrigeration system, and/or transport refrigeration system.

18. A heat transfer system the type comprising an evaporator, a compressor, and a refrigerant in the system, said system comprising:
(a) said refrigerant comprising at least about 97% by weight of the following four compounds, with each compound being present in the following relative percentages:
36.8 to 72% by weight trifluoroiodomethane (CF$_3$I);
2 to 36% by weight of tetrafluoropropene selected from trans-1,3,3,3-tetrafluoropropene (HFO-1234ze(E), 2,3,3,3-tetrafluoropropene (HFO-1234yf) and combinations of these;
15 to 31% by weight difluoromethane (HFC-32); and
1 to 4.5% by weight pentafluoroethane (HFC-125); and
(b) a sequestration material comprising:
i. activated alumina, and
ii. a zeolite molecular sieve comprising copper, silver, lead or a combination thereof, and
iii. an anion exchange resin, and
iv. a moisture-removing material, preferably a moisture-removing molecular sieve.

19. The heat transfer system of claim 18 wherein said system further comprises an oil separator and wherein said sequestration material is located in said oil separator.

20. The heat transfer system of claim 18 wherein said heat transfer system comprises a low temperature refrigeration system, a medium temperature refrigeration system, and/or transport refrigeration system.

* * * * *